(12) United States Patent
Kanai et al.

(10) Patent No.: US 7,460,781 B2
(45) Date of Patent: Dec. 2, 2008

(54) PHOTOGRAPHING SYSTEM

(75) Inventors: Fujio Kanai, Kanagawa (JP); Mitsuru Mura, Kanagawa (JP); Toshiaki Ueda, Saitama (JP)

(73) Assignee: Sony Corporation (JP)

( * ) Notice: Subject to any disclaimer, the term of this patent is extended or adjusted under 35 U.S.C. 154(b) by 491 days.

(21) Appl. No.: 10/547,374

(22) PCT Filed: Mar. 5, 2004

(86) PCT No.: PCT/JP2004/002916

§ 371 (c)(1),
(2), (4) Date: Aug. 29, 2005

(87) PCT Pub. No.: WO2004/082667

PCT Pub. Date: Sep. 23, 2004

(65) Prior Publication Data

US 2006/0165405 A1 Jul. 27, 2006

(30) Foreign Application Priority Data

Mar. 11, 2003 (JP) .............................. 2003-065766

(51) Int. Cl.
  *G03B 17/00* (2006.01)
(52) U.S. Cl. .................................... 396/263; 348/211.3
(58) Field of Classification Search ............... 396/263; 348/211.3
  See application file for complete search history.

(56) References Cited

U.S. PATENT DOCUMENTS 4,821,032 A * 4/1989 Shimada et al. ........ 340/825.21
4,860,101 A * 8/1989 Pshtissky et al. ............ 348/518
5,164,827 A * 11/1992 Paff ........................... 348/143
6,188,431 B1 * 2/2001 Oie .......................... 348/211.5

(Continued)

FOREIGN PATENT DOCUMENTS

EP 1 094 359 4/2001

(Continued)

OTHER PUBLICATIONS

International Search Report mailed Jun. 29, 2004.

*Primary Examiner*—W. B. Perkey
*Assistant Examiner*—Michael A Strieb
(74) *Attorney, Agent, or Firm*—Rader Fishman & Grauer PLLC; Ronald P. Kananen

(57) ABSTRACT

The invention easily photographs a subject from plural directions collectively. When a picture photographing instruction and a moving picture photographing instruction are inputted in a master digital still camera 3 set as a master of photographing for a subject 2, the invention transmits picture photographing instruction data D13 and moving picture photographing instruction data D18 to slave digital still cameras 4A to 4N, subjects the subject 2 to picture photographing and moving picture photographing according to the picture photographing instruction data D13 and the moving picture photographing instruction data D18 with the slave digital still cameras 4A to 4N, and generates and records slave picture-photographed image data D25 and slave moving-picture-photographed image data D26 corresponding to a photographed image of the subject 2. Consequently, it is possible to photograph photographing directions different from one another collectively according to simple operation of inputting a picture photographing instruction and a moving picture photographing instruction to the master digital still camera 3. As a result, it is possible to easily photograph the subject 2 from plural directions collectively.

23 Claims, 24 Drawing Sheets

1 PHOTOGRAPHING SYSTEM

U.S. PATENT DOCUMENTS

| | | |
|---|---|---|
| 6,463,215 B1 | 10/2002 | O'Connolly et al. |
| 2003/0133018 A1 | 7/2003 | Ziemkowski |

FOREIGN PATENT DOCUMENTS

| | | |
|---|---|---|
| JP | 63-019986 | 1/1988 |
| JP | 11-164282 | 6/1999 |
| JP | 2001-103466 | 4/2001 |
| JP | 2001-111866 | 4/2001 |
| JP | 2001-166374 | 6/2001 |
| JP | 2003-274251 | 9/2003 |
| JP | 2004-112770 | 4/2004 |

* cited by examiner (A) MASTER PICTURE PHOTOGRAPHING PROCESSING PROCEDURE IN MASTER DIGITAL STILL CAMERA (B) SLAVE PICTURE PHOTOGRAPHING PROCESSING PROCEDURE IN SLAVE DIGITAL STILL CAMERA (A) MASTER MOVING PICTURE PHOTOGRAPHING PROCESSING PROCEDURE IN MASTER DIGITAL STILL CAMERA (B) SLAVE MOVING PICTURE PHOTOGRAPHING PROCESSING PROCEDURE IN SLAVE DIGITAL STILL CAMERA (A) PICTURE-PHOTOGRAPHED IMAGE ACQUISITION PROCESSING PROCEDURE IN MASTER DIGITAL STILL CAMERA (B) PICTURE-PHOTOGRAPHED IMAGE PROVISION PROCESSING PROCEDURE IN SLAVE DIGITAL STILL CAMERA (A) MOVING-PICTURE-PHOTOGRAPHED IMAGE ACQUISITION PROCESSING PROCEDURE IN MASTER DIGITAL STILL CAMERA (B) MOVING-PICTURE-PHOTOGRAPHED IMAGE PROVISION PROCESSING PROCEDURE IN SLAVE DIGITAL STILL CAMERA (A) MASTER PICTURE PHOTOGRAPHING PROCESSING PROCEDURE IN MASTER DIGITAL STILL CAMERA (B) SLAVE PICTURE PHOTOGRAPHING PROCESSING PROCEDURE IN SLAVE DIGITAL STILL CAMERA (A) MASTER MOVING PICTURE PHOTOGRAPHING PROCESSING PROCEDURE IN MASTER DIGITAL STILL CAMERA (B) SLAVE MOVING PICTURE PHOTOGRAPHING PROCESSING PROCEDURE IN SLAVE DIGITAL STILL CAMERA (A) MASTER MOVING-PICTURE-PHOTOGRAPHED IMAGE SHARING PROCESSING PROCEDURE IN MASTER DIGITAL STILL CAMERA (B) SLAVE MOVING-PICTURE-PHOTOGRAPHED IMAGE SHARING PROCESSING PROCEDURE IN SLAVE DIGITAL STILL CAMERA (A) PICTURE PHOTOGRAPHING CONTROL PROCESSING PROCEDURE IN MASTER PERSONAL COMPUTER (B) SLAVE PICTURE PHOTOGRAPHING PROCESSING PROCEDURE IN SLAVE DIGITAL STILL CAMERA (A) MOVING PICTURE PHOTOGRAPHING CONTROL PROCESSING PROCEDURE IN MASTER PERSONAL COMPUTER (B) SLAVE MOVING PICTURE PHOTOGRAPHING PROCESSING PROCEDURE IN SLAVE DIGITAL STILL CAMERA

PHOTOGRAPHING SYSTEM

TECHNICAL FIELD

The present invention relates to a photographing system and is suitably applied to, for example, a photographing system having plural digital still cameras.

BACKGROUND ART

A conventional photographing system (i.e., an image remote transmission and reception system) connects a camera to a reception/display apparatus via a network, transmits a first image at a wide-angle fixed focus, which is generated from subject light in the camera, and a second image, which is obtained by magnifying and zooming a part of the first image, to the reception/display apparatus, and displays a combined image of the first and the second images to thereby remotely operate a photographing direction for magnification and zooming for obtaining the second image with respect to the camera while showing the first image at the wide-angle fixed focus using the reception/display apparatus (see, for example, a patent document 1).

Patent document 1: Japanese Patent Application Laid-Open No. 2001-103466 (page 10, page 14, FIG. 1, FIG. 3, and FIG. 10).

However, in the photographing system with such a constitution, although it is possible to connect plural cameras to the reception/display apparatus via the network, since photographing direction of the plural cameras are controlled by the reception/display apparatus individually, photographing by the respective cameras is also controlled individually.

Therefore, in such a photographing system, when a subject is photographed by the plural cameras from plural directions, complicated operation for, while controlling the photographing direction of the respective cameras in order, also controlling photographing with respect to the photographing direction in order is required. Thus, there is a problem in that it is difficult to photograph the subject from the plural directions easily.

DISCLOSURE OF THE INVENTION

The invention has been devised taking into account the points described above and aims at proposing a photographing system that can easily photograph a subject from plural directions collectively.

In order to solve such a problem, in the invention, in a photographing system established by connecting plural photographing apparatus by communication, when a photographing instruction for a subject is inputted by a photographing apparatus set as a master of photographing for the subject among the plural photographing apparatuses, photographing instruction data is transmitted to the remaining photographing apparatuses set as slaves of the photographing apparatus set as the master, the photographing instruction data transmitted from the photographing apparatus set as a master is received by the remaining photographing apparatuses set as slaves, and the subject is photographed according to the received photographing instruction data, whereby slave photographed image data corresponding to a photographed image of the subject is generated and recorded.

Therefore, it is possible to photograph collectively photographing directions different from one another with the remaining photographing apparatuses set as slaves according to simple operation of inputting a photographing instruction to the photographing apparatus set as a master.

BEST MODE FOR CARRYING OUT THE INVENTION

An embodiment of the invention will be explained in detail with reference to the drawings.

(1) FIRST EMBODIMENT

Figure 1:
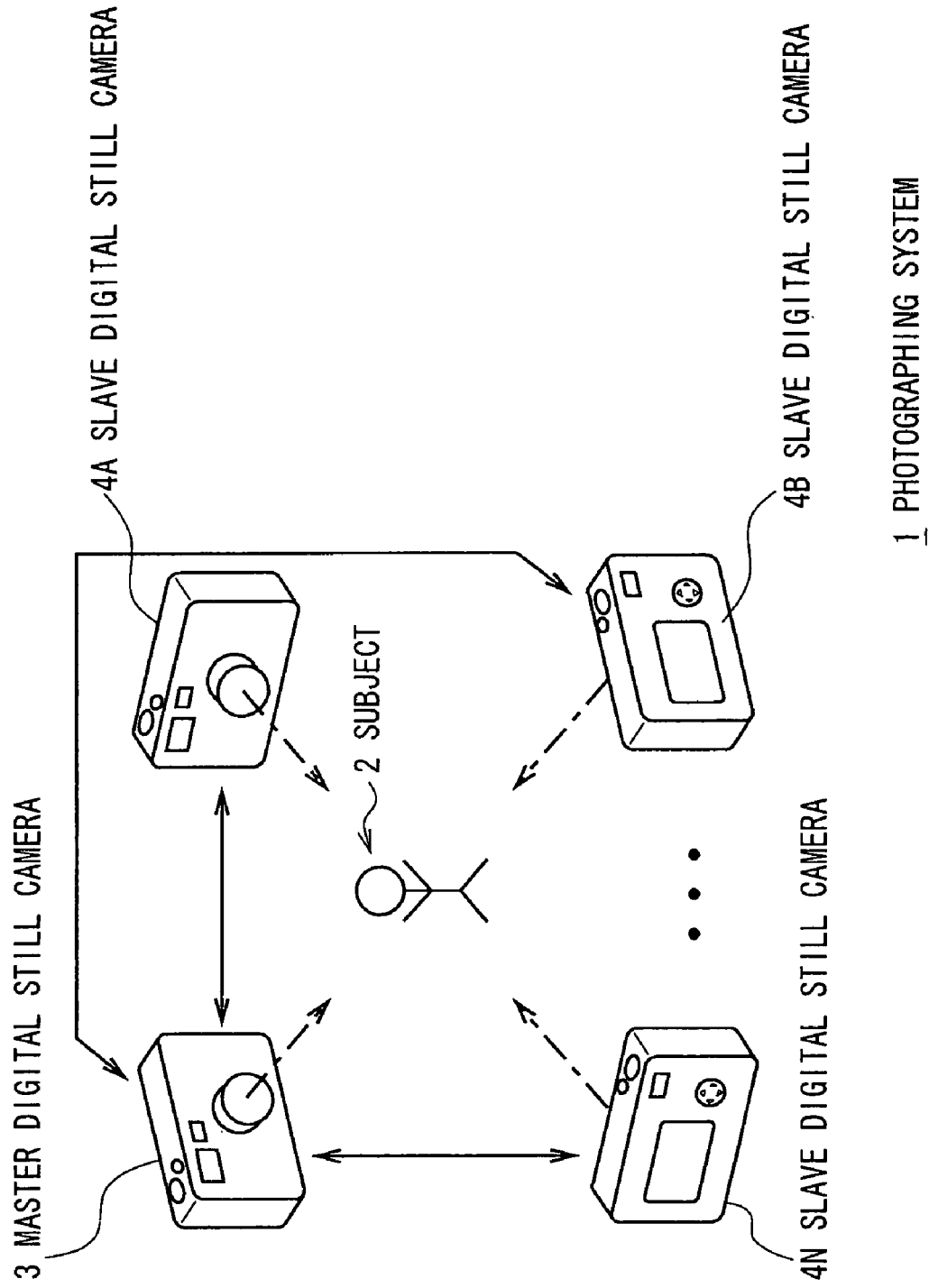
FIG. 1 is a schematic diagram showing a first embodiment of an overall constitution of a photographing system according to the invention.

In FIG. 1, reference numeral 1 denotes a photographing system according to a first embodiment as a whole. The photographing system is constituted by wirelessly connecting, to one digital still camera 3 serving as a master (hereinafter referred to as master digital still camera) of photographing for a subject 2 such as a person, other plural digital still cameras 4A to 4N for photographing a subject 2, which serve as slaves of the master digital still camera 3, (hereinafter referred to as slave digital still cameras) according to Bluetooth or the like that is a near field radio communication technique.

In this case, when a photographing instruction is inputted, the master digital still camera 3 photographs the subject 2 in response to the photographing instruction to thereby generate photographed image data corresponding to a photographed image of the subject 2 (hereinafter referred to as master photographed image data) and record the photographed image data. At the same time, the master digital still camera 3 transmits the photographing instruction to the plural slave digital still cameras 4A to 4N.

When the photographing instruction transmitted from the master digital still camera 3 is received, the plural slave digital still cameras 4A to 4N photograph the subject 2 according to the received photographing instruction to thereby generate photographed image data corresponding to a photographed image of the subject 2 (hereinafter referred to as slave photographed image data) and record the photographed image data.

Then, when the photographing of the subject 2 ends, the master digital still camera 3 acquires the slave photographed image data, which is generated by photographing the subject 2, from the plural slave digital still camera 4A to 4N.

In this way, the photographing system 1 can photograph the subject 2 from plural directions collectively using the master digital still camera 3 and the slave digital still cameras 4A to 4N simply by causing a user to input a photographing instruction to the master digital still camera 3 and can acquire plural kinds of slave photographed image data, which is generated by the slave digital still cameras 4A to 4N as a result of the photographing, with the master digital still camera 3.

For example, since the master digital still camera 3 and the plural slave digital still cameras 4A to 4N have same external constitutions, respectively, an external constitution of the master digital still camera 3 will be hereinafter explained as a typical external constitution.

Figure 2:
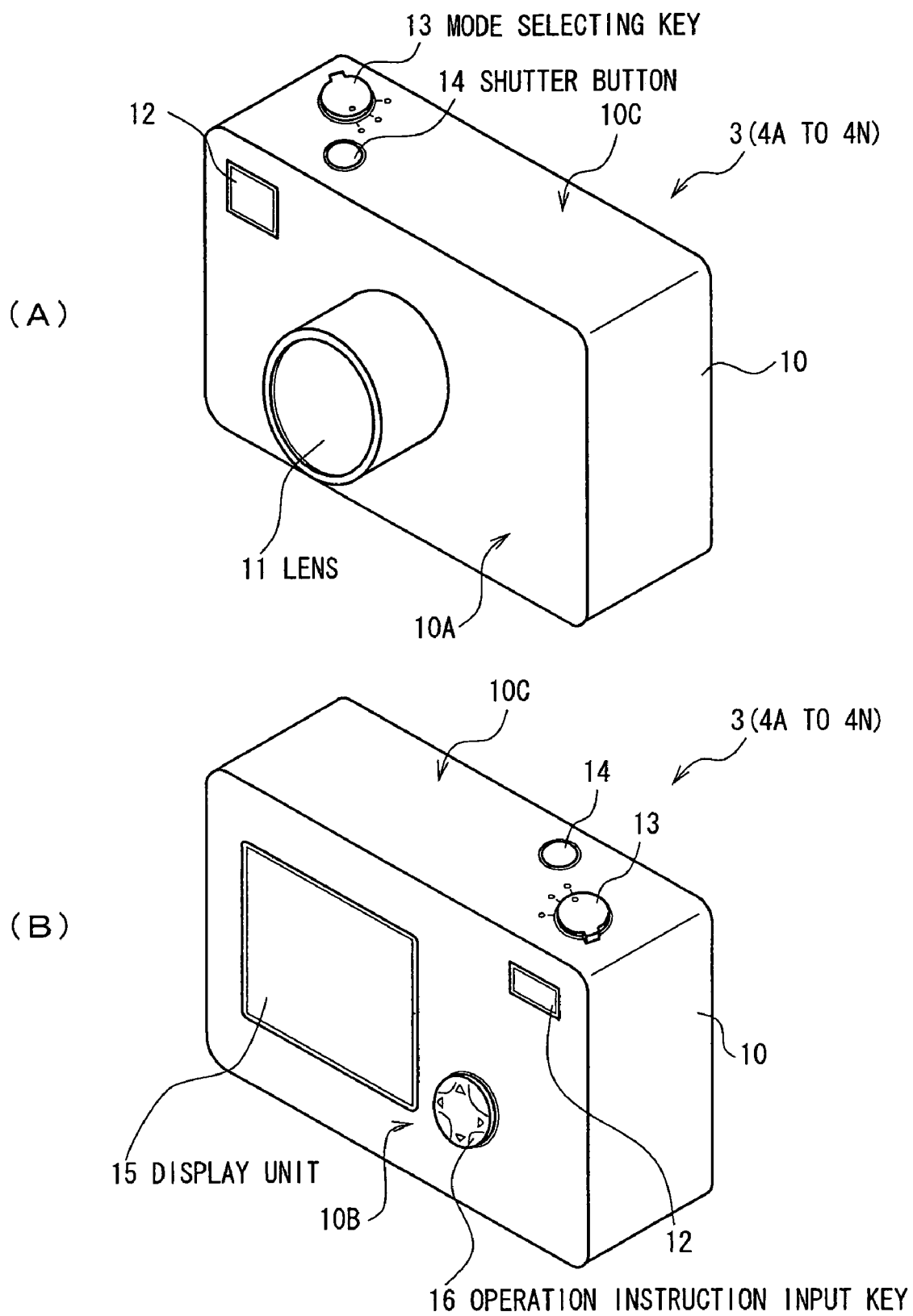
FIG. 2, consisting of FIG. 2A and FIG. 2B, is a schematic diagram showing an external constitution of a master digital still camera.

As shown in FIGS. 2(A) and 2(B), the master digital still camera 3 has a box-like housing 10. A lens 11 for receiving photographing light arriving from the subject 2 is provided in the center of a front surface 10A of the housing 10. In addition, a view finder 12 is provided near the lens 11 to extend from the front surface 10A to a rear surface 10B of the housing 10.

At one end of an upper surface 10C of the housing 10, a mode selecting key 13 for selecting a picture photographing mode and a moving picture photographing mode, which are types of usable photographing modes, and a reproduction mode for reproducing master photographed image data and slave photographed image data, which are generated by photographing the subject 2, is provided. In addition, a shutter button 14 for inputting a photographing instruction for the subject 2 is also provided. When the shutter button 14 is depressed in a state in which a desired photographing mode is selected via the mode selecting key 13, the master digital still camera 3 can subject the subject 2 to picture photographing and moving picture photographing.

Moreover, a display unit 15 consisting of a liquid crystal display and an operation instruction input key 16 for inputting various operation instructions are provided on the rear surface 10B of the housing 10. The master digital still camera 3 can display a menu screen (not shown), which has plural icons for inputting various instructions, on the display unit 15 according to the reproduction mode selected via the mode selecting key 13. In addition, when various instructions are inputted via the icons on the menu screen using the operation instruction input key 16 in this state, the master digital still camera 3 can display a master photographed image, a slave photographed image, and the like based on master photographed image data and slave photographed image data, which are obtained by photographing the subject 2, on the display unit 15 instead of the menu screen according to the inputted instruction.

Although the master digital still camera 3 and the slave digital still cameras 4A to 4N basically have substantially the same circuit constitutions, respectively, the master digital still camera 3 and the slave digital still cameras 4A to 4N have slightly different constitutions depending on which of a master photographing function as a master of photographing for the subject 2 or a slave photographing function as a slave to the master digital still camera 3 is realized. Therefore, first, a circuit constitution of the master digital still camera 3 will be hereinafter explained.

Figure 3:
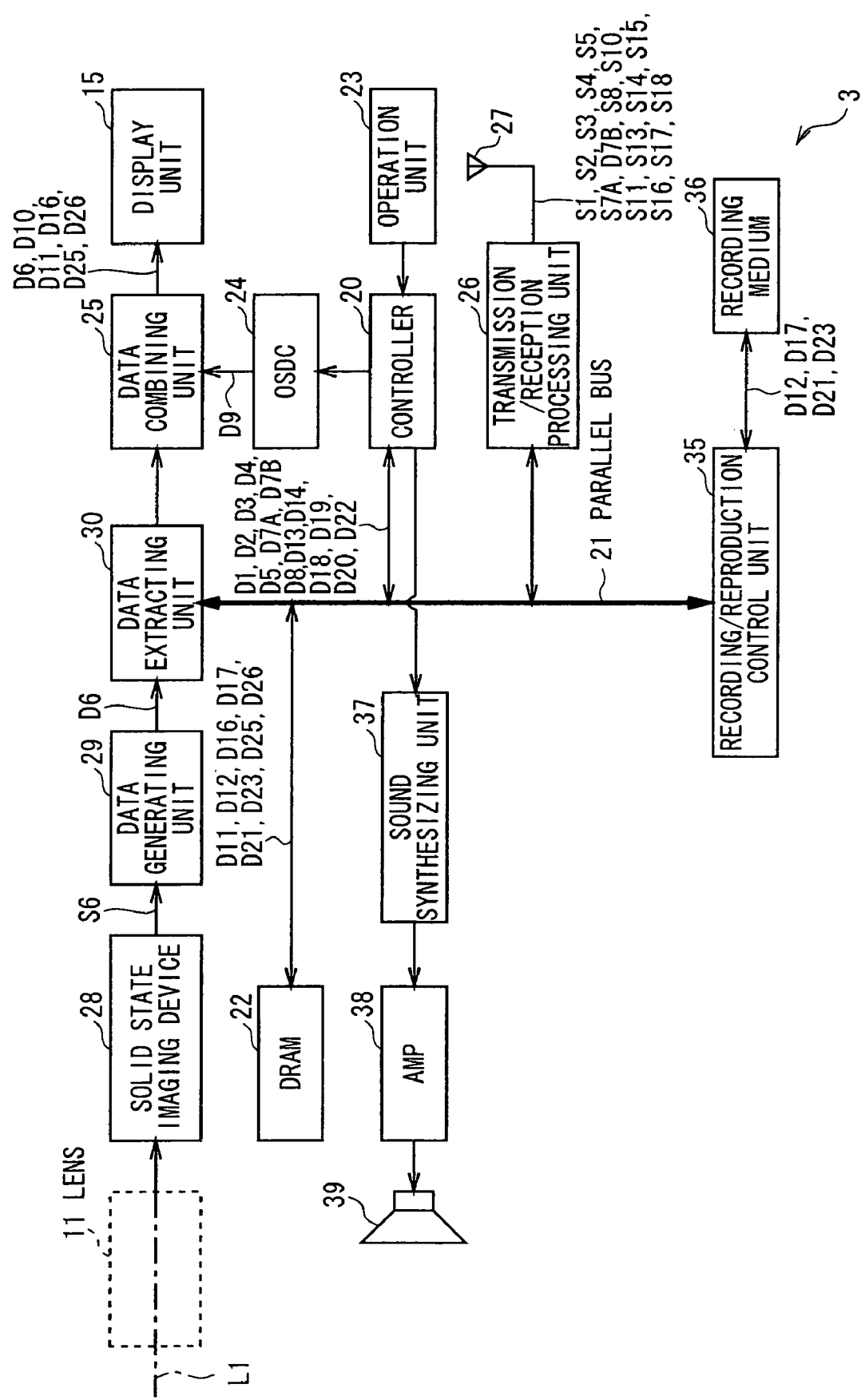
FIG. 3 is a block diagram showing a circuit constitution of a master digital still camera.

As shown in FIG. 3, in the master digital still camera 3, a DRAM (Dynamic Random Access Memory) 22 is connected to a controller (hereinafter referred to as a master controller) 20, which has a CPU (Central Processing Unit), a nonvolatile memory such as a SRAM (Static Random Access Memory), a ROM (Read Only Memory), and the like, via a parallel bus 21. In addition, an operation unit 23 consisting of the mode selecting key 13, the shutter button 14, the operation instruction input key 16, and the like is connected to the master controller 20.

The master controller 20 expands various application programs stored in the internal ROM in advance such as a master registration processing program, a master photographing processing program, a photographed image acquisition processing program, and a photographed image reproduction processing program on the DRAM 22 according to various instructions inputted via the operation unit 23 and controls respective circuit units of the master digital still camera 3 totally. Through this control, the master controller 20 executes master registration processing for the slave digital still cameras 4A to 4N, master photographing processing for the subject 2, photographed image acquisition processing for acquiring slave photographed image data from the slave digital still cameras 4A to 4N, photographed image reproduction processing for reproducing master photographed image data and slave photographed image data, and the like.

When the reproduction mode is selected according to operation of the operation unit 23, the master controller 20 sends menu screen data stored in the internal ROM in advance to the display unit 15 via an on-screen display controller (hereinafter referred to as OSDC) 24 and a data combining unit 25 sequentially to thereby display a menu screen based on the menu screen data on the display unit 15.

When a slave registration instruction is inputted on the menu screen via the operation unit 23 in a state in which one or plural slave digital still cameras 4A to 4N are present in a radio communication range of the master digital still camera 3 (hereinafter referred to master radio communication range), the master controller 20 starts master registration processing for the slave digital still cameras 4A to 4N.

Then, the master controller 20 generates slave registration request data D1 for requesting the slave digital still cameras 4A to 4N to perform registration as a slave to the master digital still camera 3 and sends the slave registration request data D1 to a transmission/reception processing unit 26 connected via the parallel bus 21 to thereby subject the slave registration request data D1 to transmission processing in the transmission/reception processing unit 26. The master controller 20 transmits obtained slave registration request signal S1 to the slave digital still cameras 4A to 4N in the master radio communication range from an antenna 27.

As a result, when a slave registration approval signal S2 for approving registration of subordination of the slave digital still cameras 4A to 4N to the master digital still camera 3 is transmitted to the master controller 20, the master controller 20 receives the slave registration approval signal S2 with the antenna 27, takes the slave registration approval signal S2 into the transmission/reception processing unit 26, and subjects the slave registration approval signal S2 to reception processing in the transmission/reception processing unit 26. Then, the master controller 20 captures obtained slave registration approval data D2.

Consequently, the master controller 20 recognizes the slave digital still cameras 4A to 4N, which have approved registration of subordination to the master digital still camera 3, on the basis of the slave registration approval data D2.

Then, the master controller 20 reads out identification information for master registration peculiar to the master digital still camera 3 stored in advance from the internal ROM. The master controller 20 sends this identification information for master registration to the transmission/reception processing unit 26 as master registration data D3 for registering the master digital still camera 3 in the slave digital still cameras 4A to 4N as a master of photographing for the subject 2. The master controller 20 subjects the master registration data D3 to transmission processing and transmits obtained master registration signal S3 to the slave digital still cameras 4A to 4N from the antenna 27.

As a result, from the slave digital still cameras 4A to 4N, identification information for slave registration peculiar to the slave digital still cameras 4A to 4N is transmitted to the master controller 20 as a slave registration signal S4 for registering the slave digital still cameras 4A to 4N as slaves to the master digital still camera 3. Then, the master controller 20 receives this slave registration signal S4 with the antenna 27 and subjects the slave registration signal S4 to reception processing in the transmission/reception processing unit 26. Then, the master controller 20 captures obtained slave registration data D4.

Consequently, the master controller 20 stores the identification information for slave registration, which is obtained on the basis of the slave registration data D4, in the internal nonvolatile memory. In this way, the master controller 20 registers the slave digital still cameras 4A to 4N operating subordinately to the master digital still camera 3 (hereinafter referred to as slave registration) and ends the master registration processing.

Incidentally, as a result of transmitting the slave registration request signal S1 to the slave digital still cameras 4A to 4N, if a slave registration rejection signal S5 for rejecting registration of subordination to the master digital still camera 3 is transmitted to the master controller 20 from the slave digital still cameras 4A to 4N, the master controller 20 receives this slave registration rejection signal S5 with the antenna 27 and subjects the slave registration rejection signal S5 to reception processing in the transmission/reception processing unit 26. Then, the master controller 20 captures obtained slave registration rejection data D5.

Consequently, the master controller 20 recognizes the slave digital still cameras 4A to 4N, which have rejected registration of subordination to the master digital still camera 3, on the basis of the slave registration rejection data D5, and ends the master registration processing.

Incidentally, thereafter, when the master controller 20 executes the master photographing process or executes the photographed image acquisition processing or the like, the master controller 20 transmits various signals with the identification information for slave registration attached to the signals to thereby cause the slave digital still cameras 4A to 4N, to which the signals are transmitted, to identify and receive the various signals transmitted thereto surely. In addition, the master controller 20 causes the slave digital still cameras 4A to 4N to attach the identification information for master registration to various signals transmitted from the slave digital still cameras 4A to 4N to thereby identify and receive the various signals surely.

After registering the one or plural slave digital still cameras 4A to 4N as slaves, when a photographing condition setting instruction for setting photographing conditions for the slave digital still cameras 4A to 4N on the menu screen is inputted via the operation unit 23, the master controller 20 starts photographing condition setting processing according to the photographing condition setting instruction and reads out photographing condition setting screen data stored in advance from the internal ROM.

Then, the master controller 20 sends the photographing condition setting screen data to the display unit 15 via the OSDC 24 and the data combining unit 25 sequentially to thereby display a photographing condition setting screen based on the photographing condition setting screen data on the display unit 15 instead of the menu screen.

In this state, on the photographing condition setting screen the master controller 20 causes the slave digital still cameras 4A to 4N to select photographing conditions in photographing pictures of the subject 2 (hereinafter referred to as picture photographing conditions) in association with picture photographing of the subject 2 by the master digital still camera 3.

In other words, the master controller 20 is adapted to cause the slave digital still cameras 4A to 4N to select a photographing point, which is timing for photographing pictures of the subject 2 with the slave digital still cameras 4A to 4N, as picture photographing conditions. Actually, the master controller 20 causes the slave digital still cameras 4A to 4N to select whether the slave digital still cameras 4A to 4N photograph pictures of the subject 2 substantially simultaneously with a photographing instruction input point when a photographing instruction is inputted in the master digital still camera 3 (i.e., a point when the shutter button 14 is depressed in the master digital still camera 3: hereinafter referred to as a master photographing instruction input point) or photograph pictures of the subject 2 at a delayed point after elapse of predetermined delay time from the master photographing instruction input point (hereinafter referred to as picture photographing point).

In addition, when the slave digital still cameras 4A to 4N select that the slave digital still cameras 4A to 4N photograph pictures of the subject 2 at the picture photographing point after elapse of predetermined delay time from the master photographing instruction input point, the master controller 20 causes the slave digital still cameras 4A to 4N to select delay time from the master photographing instruction input point to the picture photographing point (hereinafter referred to as picture photographing delay time) arbitrarily (e.g., about several seconds to several tens of seconds) according to the selection of picture photographing.

Moreover, on the photographing condition setting screen, the master controller 20 causes the slave digital still cameras 4A to 4N to select photographing conditions in photographing moving pictures for the subject 2 (hereinafter referred to as moving picture photographing conditions) in association with moving picture photographing for the subject 2 by the master digital still camera 3.

In other words, the master controller 20 is adapted to cause the slave digital still cameras 4A to 4N to select a photographing point, which is timing for starting moving picture photographing for the subject 2 with the slave digital still cameras 4A to 4N, as moving picture photographing conditions. Actually, the master controller 20 causes the slave digital still cameras 4A to 4N to select whether the slave digital still cameras 4A to 4N start moving picture photographing for the subject 2 substantially simultaneously with a master photographing instruction input point or start moving picture photographing for the subject 2 at a delayed point after elapse of predetermined delay time from the master photographing instruction input point (hereinafter referred to as moving picture photographing point).

Then, when the slave digital still cameras 4A to 4N select that the slave digital still cameras 4A to 4N start moving picture photographing for the subject 2 substantially simultaneously with the master photographing instruction input point, the master controller 20 causes the slave digital still cameras 4A to 4N to select time of moving picture photographing for the subject 2 (hereinafter referred to as moving picture photographing delay time) arbitrarily (e.g., about several seconds to several tens of seconds) according to the selection of moving picture photographing.

In addition, when the slave digital still cameras 4A to 4N select that the slave digital still cameras 4A to 4N start moving picture photographing for the subject 2 at the moving picture photographing point after elapse of predetermined delay time from the master photographing instruction input point, the master controller 20 causes the slave digital still cameras 4A to 4N to select delay time from the master photographing instruction input point to the moving picture photographing point (hereinafter referred to as moving picture photographing delay time) arbitrarily (e.g., about several seconds to several tens of seconds) according to the selection of picture photographing. At the same time, the master controller 20 causes the slave digital still cameras 4A to 4N to select moving picture photographing time arbitrarily for the subject 2 (e.g., about several seconds to several tens of seconds).

When the picture photographing conditions and the moving picture photographing conditions for the respective slave digital still cameras 4A to 4N are selected in this way, the master controller 20 stores information on the picture photographing conditions (hereinafter referred to as picture photographing condition information) and information on the moving picture photographing conditions (hereinafter referred to as moving picture photographing condition information) in the internal nonvolatile memory and associates the picture photographing condition information and the moving picture photographing condition information with the identification information for slave registration.

Consequently, in the internal nonvolatile memory the master controller 20 generates a registration information data table in which it is possible to detect the respective slave digital still cameras 4A to 4N, which are registered as slaves to operate subordinately to the master digital still camera 3, and the picture photographing conditions and moving picture photographing conditions in causing the relevant respective slave digital still cameras 4A to 4N to photograph pictures and moving pictures of the subject 2 subordinately.

When the picture photographing mode is selected by the operation unit 23, the master controller 20 starts master photographing processing for picture photographing for the subject 2 (hereinafter referred to as master picture photographing processing) and transmits imaging light L1 arriving from the subject 2 through the lens 11 and receives the imaging light L1 with a solid state imaging device 28 consisting of a CCD (Charge Coupled Device) or the like.

The solid state imaging device 28 photoelectrically converts the imaging light L1, which is being received, sequentially at predetermined periods to thereby generate an analog imaging output signal S6 corresponding to the imaging light L1 and sends the imaging output signal S6 to a data generating unit 29.

After subjecting the imaging output signal S6 given from the solid state imaging device 28 sequentially to analog/digital conversion, the data generating unit 29 applies predetermined data processing to the imaging output signal S6 to thereby generate imaged moving image data D6. The data generating unit 29 sends the generated imaged moving image data D6 to the display unit 15 via the data extracting unit 30 and the data combining unit 25 sequentially to thereby display an imaged moving image based on the imaged moving image data D6 on the display unit 15.

At this point, the master controller 20 performs search to find whether the slave digital still cameras 4A to 4N, which are already registered as slaves and in a subordinately operable state, are present in the master radio communication range. In addition, the master controller 20 generates search data D7A for causing the slave digital still cameras 4A to 4N to start slave photographing processing for picture photographing (hereinafter referred to as slave picture photographing processing) for the subject 2. The master controller 20 sends this search data D7A to the transmission/reception processing unit 26, subjects the search data D7A to transmission processing, and transmits obtained search signal S7A from the antenna 27.

As a result, the slave picture photographing processing is started in response to the search signal S7A, and a subordinate operability notification signal S8, which notifies together with the presence of the slave digital still cameras 4A to 4N, that the slave digital still cameras 4A to 4N are operable subordinately to the master digital still camera 3, is returned from the subordinately operable slave digital still cameras 4A to 4N present in the master radio communication range. Then, the master controller 20 receives this subordinate operability notification signal S8 with the antenna 27 and subjects the subordinate operability notification signal S8 to reception processing in the transmission/reception processing unit 26. Then, the master controller captures obtained subordinate operability notification data D8.

Consequently, the master controller 20 recognizes the subordinately operable slave digital still cameras 4A to 4N present in the master radio communication range on the basis of the subordinate operability notification data D8.

In addition, the master controller 20 generates slave camera notification screen data D9 for notifying a user of the subordinately operable slave digital still cameras 4A to 4N present in the master radio communication range on the basis of the subordinate operability notification data D8. The master controller 20 sends the generated slave camera notification screen data D9 to the data combining unit 25 via the OSDC 24.

Figure 4:
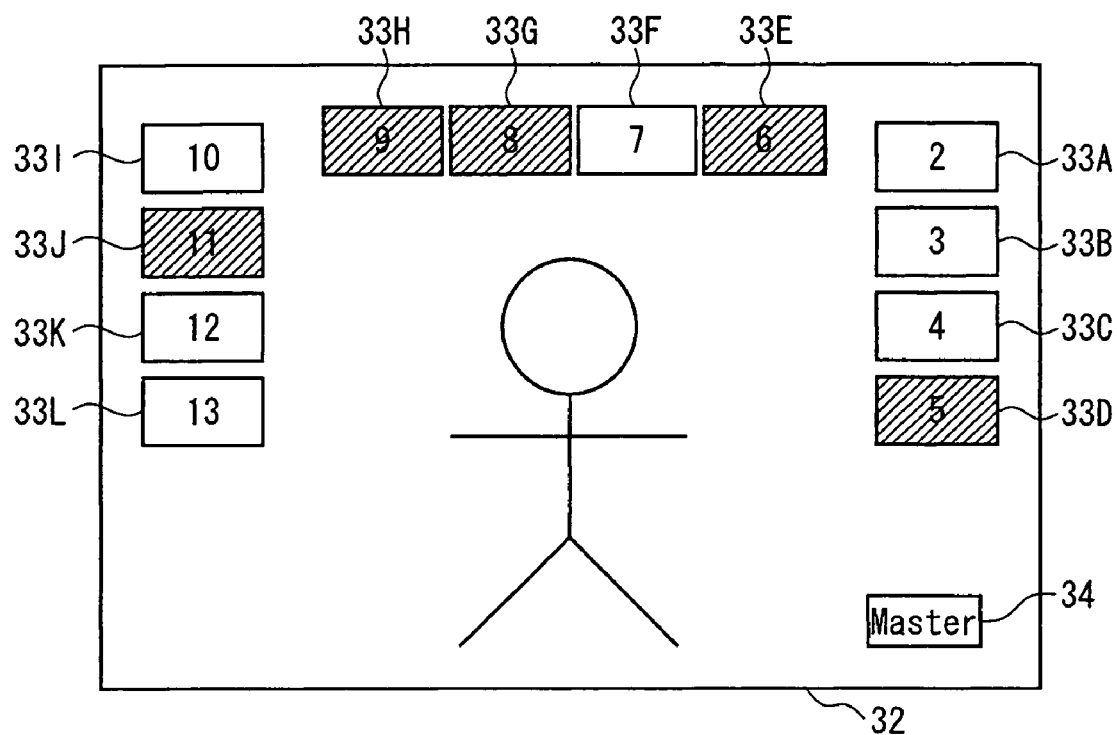
FIG. 4 is a schematic diagram showing a constitution of a combined screen for notification to slave cameras.

The data combining unit 25 combines the slave camera notification screen data D9 with the imaged moving image data D6 given from the data generating unit 29 via the data extracting unit 30. The data combining unit 25 sends obtained combined screen data for slave camera notification D10 to the display unit 15 to thereby display a combined screen 32 for slave camera notification shown in FIG. 4 based on the combined screen data D10 for slave camera notification on the display unit 15.

The combined screen 32 for slave camera notification is constituted by superimposing a slave camera notification screen based on the slave camera notification screen data D9 on the imaged moving image based on the imaged moving image data D6.

In this case, in the slave camera notification screen superimposed on the imaged moving image on the combined screen 32 for slave camera notification, plural camera notification icons 33A to 33L representing all the slave digital still cameras 4A to 4N registered as slaves, respectively, are provided in a peripheral portion thereof. In addition, a master photographing execution notification icon 34 for notifying the slave digital still cameras 4A to 4N registered as slaves that the master digital still camera 3 photographs the subject 2 independently is provided.

In the combined screen 32 for slave camera notification, among the respective camera notification icons 33A to 33L, the camera notification icons 33A to 33C, 33F, 33I, 33K, and 33L for the slave digital still cameras 4A to 4N present in the master radio communication range and the camera notification icons 33D, 33E, 33G, 33H, and 33J for the slave digital still cameras 4A to 4N not present in the master radio communication range are selected in display states (different colors, lighting and light-out, etc.) different from each other.

In the combined screen 32 for slave camera notification, the slave camera notification screen transmits the imaged moving image in portions other than the portions where the camera notification icons 33A to 33L and the master photographing function execution notification icon 34 are provided.

Therefore, the master controller 20 can notify a user of the slave digital still cameras 4A to 4N, which can operate subordinately to the master digital camera 3, in picture photographing for the subject 2 while causing the user to visually recognize an imaging state for the subject 2 with the combined screen 32 for slave camera notification.

Incidentally, while executing the master picture photographing processing, the master controller 20 can transmit the search signal S7A periodically to thereby always grasp the slave digital still cameras 4A to 4N subordinately operable in the master radio communication range (including the subordinately operable slave digital still cameras 4A to 4N that enter the own radio communication range later than a point when the search signal S7A is transmitted first) and can notify a user of the grasped subordinately operable slave digital still cameras 4A to 4N.

A photographing instruction is inputted from the operation unit 23 according to depressing operation of the shutter button 14 in a state in which the subject 2 is imaged in this way. Then, the master controller 20 extracts imaged still image data equivalent to one imaged still image, which is generated at a point of input of a master photographing instruction, among temporally-continuous plural imaged still image data constituting the imaged moving image data D6, which is given from the data generating unit 29 as master picture-photographed image data D11, in the data extracting unit 30. The master controller 20 stores the extracted master picture-photographed image data D11 in the DRAM 22.

Then, the master controller 20 reads out the master picture-photographed image data D11 from the DRAM 22 and captures the master picture-photographed image data D11. The master controller 20 subjects the master picture-photographed image data D11 to compression coding in accordance with a compression coding system such as JPEG (Joint Photographic Experts Group) and stores obtained picture image compression-coded data in the DRAM 22 again.

At this point, the master controller 20 generates picture file header data in which a file name for recording management for the master picture-photographed image data D11, master picture photographing date and time information at a point when the master picture-photographed image data D11 is extracted (i.e., information on date and time of a master photographing instruction input point that is a point when the subject 2 is subjected to picture photographing), and the like are stored.

Then, the master controller 20 generates master picture file data D12 with the picture file header data attached to a top of the picture image compression-coded data stored in the DRAM 22. The master controller 20 transfers the generated master picture file data D12 from the DRAM 22 to a recording/reproduction control unit 35 via the parallel bus 21.

Consequently, the master controller 20 records the master picture file data D12 in a recording medium 36 such as a memory stick (registered trademark), which is detachably inserted in the master digital still camera 3, using the recording/reproduction control unit 35.

In addition, when a photographing instruction is inputted from the operation unit 23 according to depressing operation of the shutter button 14, the master controller 20 reads out the picture photographing condition information for the slave digital still cameras 4A to 4N, which are present in the master radio communication range at that point, from the internal nonvolatile memory at a master photographing instruction input point. The master controller 20 generates picture photographing instruction data D13 in which the read out picture photographing condition information is stored together with the master picture photographing date and time information. At the same time, the master controller 20 sends this picture photographing instruction data D13 to the transmission/reception processing unit 26 and subjects the picture photographing instruction data D13 to transmission processing. Then, the master controller 20 transmits an obtained picture photographing instruction signal S10 to the slave digital still cameras 4A to 4N in the master radio communication range from the antenna 27.

Consequently, the master controller 20 causes the subordinately operable slave digital still cameras 4A to 4N present in the master radio communication range to photograph pictures of the subject 2 substantially simultaneously with the master photographing instruction input point or at a picture photographing point after elapse of the picture photographing delay time from the master photographing instruction input point, respectively, in accordance with the picture photographing conditions.

After causing the slave digital still cameras 4A to 4N to photograph pictures of the subject 2 subordinately in this way, for example, the reproduction mode is selected via the operation unit 23 to instruct end of the master picture photographing processing. Then, the master controller 20 generates slave picture photographing end data D14 for causing the slave digital still cameras 4A to 4N present in the master radio communication range to end the slave picture photographing processing.

The master controller 20 sends the slave picture photographing end data D14 to the transmission/reception processing unit 26 and subjects the slave picture photographing end data D14 to transmission processing. The master controller 20 transmits an obtained slave picture photographing end signal S11 to the subordinately operable slave digital still cameras 4A to 4N present in the master radio communication range from the antenna 27. Then, the master controller 20 ends the master picture photographing processing.

When the moving picture photographing mode is selected via the operation unit 23, the master controller 20 starts master photographing processing for moving picture photographing (hereinafter referred to as master moving picture photographing processing) for the subject 2. Until a photographing instruction is inputted from the operation unit 23 according to depressing operation of the shutter button 14, as in the case of the master picture photographing processing described above, the master controller 20 controls the solid state imaging device 28, the data generating unit 29, the data extracting unit 30, the data combining unit 25, the display unit 15, the OSDC 24, the transmission/reception unit 26, and the antenna 27.

Consequently, the master controller 20 starts imaging for the subject 2 and searches for the subordinately operable slave digital still cameras 4A to 4N present in the master radio communication range. In addition, the master controller 20 sends search data D7B for causing the slave digital still cameras 4A to 4N to start slave photographing processing for moving picture photographing for the subject 2 (hereinafter referred to as slave moving picture photographing processing) to the transmission/reception processing unit 26 and subjects the search data D7B to transmission processing. Then, the master controller 20 transmits an obtained search signal S7B from the antenna 27.

As a result, the master controller 20 receives a subordinate operability notification signal S8, which is returned in response to the reception of the search signal S7B as the slave moving picture photographing processing is started, with the antenna 27 from the slave digital still camera 4A to 4N subordinately operable in the master radio communication range. Then, the master controller 20 generates slave camera notification screen data D9 on the basis of subordinate operability notification data D8 obtained by subjecting the subordinate operability notification signal S8 to reception processing in the transmission/reception unit 26.

The master controller 20 combines the slave camera notification screen data D9 with the imaged moving image data D6 to generate combined screen data for slave camera notification D10. The master controller 20 displays the combined screen 32 for slave camera notification, which is described above with reference to FIG. 4, on the display unit 15 to thereby notify a user of the slave digital still cameras 4A to 4N, which can operate subordinately to the master digital still camera 3 at the time of moving picture photographing for the subject 2, while causing the user to visually recognize an imaging state for the subject 2.

Incidentally, while executing the master moving picture photographing processing, as in the case in which the master picture photographing processing described above, the master controller 20 transmits the search signal S7B periodically to thereby always grasp the slave digital still cameras 4A to 4N subordinately operable in the master radio communication range (including the subordinately operable slave digital still cameras 4A to 4N that enter the own radio communication range later than a point when the search signal S7B is transmitted first) and notifies a user of the grasped subordinately operable slave digital still cameras 4A to 4N.

When a photographing instruction is inputted from the operation unit 23 according to depressing operation of the shutter button 14 in this state, the master controller 20 controls the data extracting unit 30 in accordance with moving picture photographing time (e.g., about several seconds to several tens of seconds) for moving picture photographing for the subject 2 set arbitrarily in the master digital still camera 3 in advance by the user.

Consequently, the master controller 20 extracts in the data extracting unit 30, plural imaged still image data equivalent to temporally continuous plural imaged still images, which are generated from a master photographing instruction input point to a point after elapse of moving picture photographing time (hereinafter referred to as moving picture photographing end point), among temporally continuous plural imaged still image data constituting the imaged moving image data D6, which is given from the data generating unit 29, as master moving-picture-photographed image data D16. The master controller 20 stores the extracted master moving-picture-photographed image data D16 in the DRAM 22.

Then, the master controller 20 reads out the master moving-picture-photographed image data D16 from the DRAM 22 and captures the master moving-picture-photographed image data D16. The master controller 20 subjects the master moving-picture-photographed image data D16 to compression coding in accordance with a compression coding system such as MPEG (Moving Picture Experts Group) and stores obtained moving picture compression-coded data in the DRAM 22 again.

At this point, the master controller 20 generates moving picture file header data in which a file name for recording management for the master moving-picture-photographed image data D16, master moving picture photographing date and time information at a point when the extraction of the master moving-picture-photographed image data D16 is started (i.e., information on date and time of a master photographing instruction input point that is a point when moving picture photographing for the subject 2 is started), and the like are stored.

Moreover, the master controller 20 generates master moving picture file data D17 with the moving picture file header data attached to a top of the moving picture image compression-coded data stored in the DRAM 22. The master controller 20 transfers the generated master moving picture file data D17 from the DRAM 22 to the recording/reproduction control unit 35 to thereby record the master moving picture file data D17 in the recording medium 36 using the recording/reproduction control unit 35.

In addition, when a photographing instruction is inputted from the operation unit 23 according to depressing operation of the shutter button 14, the master controller 20 reads out the moving picture photographing condition information for the slave digital still cameras 4A to 4N, which are present in the master radio communication range at that instant, from the internal nonvolatile memory at a point of the master photographing instruction input. The master controller 20 generates moving picture photographing instruction data D18 in which the read out moving picture photographing condition information is stored together with the master moving picture photographing date and time information. At the same time, the master controller 20 sends this moving picture photographing instruction data D18 to the transmission/reception processing unit 26 and subjects the moving picture photographing instruction data D18 to transmission processing.

Then, the master controller 20 transmits an obtained moving picture photographing instruction signal S13 to the slave digital still cameras 4A to 4N in the master radio communication range from the antenna 27.

Consequently, the master controller 20 causes the subordinately operable slave digital still cameras 4A to 4N present in the master radio communication range to start moving picture photographing for the subject 2 substantially simultaneously with the master photographing instruction input point or at a moving picture photographing start point after elapse of the moving picture photographing delay time from the master photographing instruction input point in accordance with the moving picture photographing conditions. Then, the master controller 20 causes the subject 2 to photograph moving pictures until the moving picture photographing end point after elapse of the moving picture photographing time.

After causing the slave digital still cameras 4A to 4N to photograph moving pictures of the subject 2 subordinately in this way, for example, the reproduction mode is selected via the operation unit 23 to instruct end of the master picture photographing processing. Then, the master controller 20 generates slave moving picture photographing end data D19 for causing the slave digital still cameras 4A to 4N present in the master radio communication range to end the slave moving picture photographing processing.

The master controller 20 sends the slave moving picture photographing end data D19 to the transmission/reception processing unit 26 and subjects the slave moving picture photographing end data D19 to transmission processing. The master controller 20 transmits an obtained slave moving picture photographing end signal S14 to the subordinately operable slave digital still cameras 4A to 4N present in the master radio communication range from the antenna 27. Then, the master controller 20 ends the master moving picture photographing processing.

When the reproduction mode is selected according to operation of the operation unit 23, for example, after the end of the master picture photographing processing, the master controller 20 sends menu screen data to the display unit 15 via the OSDC 24 and the data combining unit 25 sequentially to thereby display a menu screen based on the menu screen data on the display unit 15.

An acquisition instruction for a picture-photographed image is inputted on the menu screen via the operation unit 23 in this state. Then, the master controller 20 starts photographed image acquisition processing (hereinafter referred to as picture-photographed image acquisition processing) to thereby read out picture photographing condition information for the slave digital still cameras 4A to 4N, which are caused to photograph pictures of the subject 2 subordinately at the time of the master picture photographing processing, from the internal nonvolatile memory. The master controller 20 generates picture-photographed image request data D20 in which the read out picture photographing condition information is stored together with master picture photographing date and time information at a point when the subject 2 is subjected to picture photographing by the master digital still camera 3 independently (i.e., a master photographing instruction input point).

The master controller 20 sends the picture-photographed image data request data D20 to the transmission/reception processing unit 26 and subjects the picture-photographed image request data D20 to transmission processing. Then, the master controller 20 transmits an obtained picture-photographed image request signal S15 from the antenna 27.

As a result, a picture file signal S16 equivalent to slave picture file data D21, which is generated as a result of photographing pictures of the subject 2 subordinately in association with picture photographing of the master digital still camera 3, is transmitted to the master controller 20 from the slave digital still cameras 4A to 4N present in the master radio communication range. Then, the master controller 20 receives this picture file signal S16 with the antenna 27 and subjects the picture file signal S16 in the transmission/reception processing unit 26. The master controller 20 records obtained slave picture file data D21 in the recording medium 36 via the recording/reproduction control unit 35.

In this way, the master controller 20 can collect and acquire the slave picture file data D21, which are generated by causing the plural slave digital still cameras 4A to 4N to photograph pictures of the subject 2 subordinately, from the slave digital still cameras 4A to 4N, respectively, and store the collected and acquired slave picture file data D21 in the recording medium 36 together with the master picture file data D12 generated by photographing pictures of the subject 2 with the master digital still camera 3.

When the reproduction mode is selected according to operation of the operation unit 23, for example, after the end of the master moving picture photographing processing, the master controller 20 sends menu screen data to the display unit 15 via the OSDC 24 and the data combining unit 25 sequentially to thereby display a menu screen based on the menu screen data on the display unit 15.

An acquisition instruction for a moving-picture-photographed image is inputted on the menu screen via the operation unit 23 in this state. Then, the master controller 20 starts photographed image acquisition processing (hereinafter referred to as moving-picture-photographed image acquisition processing) to thereby read out picture photographing condition information for the slave digital still cameras 4A to 4N which are caused to photograph moving pictures of the subject 2 subordinately at the time of the master moving picture photographing processing, from the internal nonvolatile memory. The master controller 20 generates moving-picture-photographed image request data D22 in which master moving picture photographing date and time information at a point when the subject 2 is subjected to picture photographing by the master digital still camera 3 independently (i.e., a master photographing instruction input point) is stored together with the read out moving picture photographing condition information.

The master controller 20 sends the moving-picture-photographed image request data D22 to the transmission/reception processing unit 26 and subjects the moving-picture-photographed image request data D22 to transmission processing. Then, the master controller 20 transmits an obtained moving-picture-photographed image request signal S17 from the antenna 27.

As a result, a slave moving picture file signal S18 equivalent to slave moving picture file data D23, which is generated as a result of photographing moving pictures of the subject 2 subordinately in association with moving picture photographing of the master digital still camera 3, is transmitted to the master controller 20 from the slave digital still cameras 4A to 4N present in the master radio communication range. Then, the master controller 20 receives this slave moving picture file signal S18 with the antenna 27 and subjects the slave moving picture file signal S18 in the transmission/reception processing unit 26. The master controller 20 records obtained slave moving picture file data D23 in the recording medium 36 via the recording/reproduction control unit 35.

In this way, the master controller 20 can collect and acquire the slave moving picture file data D23, which are generated by causing the plural slave digital still cameras 4A to 4N to photograph moving pictures of the subject 2 subordinately, from the slave digital still cameras 4A to 4N, respectively, and store the collected and acquired slave moving picture file data D23 in the recording medium 36 together with the master moving picture file data D17 generated by photographing moving pictures of the subject 2 with the master digital still camera 3.

Moreover, in a state in which the reproduction mode is selected according to operation of the operation unit 23, whereby a menu screen is displayed on the display unit 15, when a reproduction instruction for a picture-photographed image is inputted on the menu screen, the master controller 20 starts photographed image reproduction processing (hereinafter referred to as picture-photographed image reproduction processing).

In this case, the master controller 20 searches for master picture photographing date and time information and slave picture photographing date and time information, which are stored in the master picture file data D12 and the slave picture file data D21 in the recording medium 36, via the recording/reproduction control unit 35.

Consequently, the master controller 20 reproduces in order in time series, data ranging from the master picture file data D12 or the slave picture file data D21, in which oldest master picture photographing date and time information or slave picture photographing date and time information is stored, to the master picture file data D12 or the slave picture file data D21, in which latest master picture photographing date and time information or slave picture photographing date and time information is stored, from the recording medium 36 with the recording/reproduction control unit 35. The master controller 20 transfers the master picture file data D12 and the slave picture file data D21 reproduced in order to the DRAM 22 sequentially.

In addition, the master controller 20 extracts picture image compression-coded data from the master picture file data D12 and the slave picture file data D21 sequentially transferred to the DRAM 22 and captures the picture image compression-coded data. The master controller 20 decodes the captured picture image compression-coded data according to the compression coding system such as JPEG and stores obtained master picture-photographed image data D11 and slave picture-photographed image data D25 in the DRAM 22 again.

Moreover, the master controller 20 sends from the DRAM 22, the master picture-photographed image data D11 or the slave picture-photographed image data D25 obtained by oldest picture photographing among the master picture-photographed image data D11 and the slave picture-photographed image data D25 stored again to the display unit 15 via the parallel bus 21, the data extracting unit 30, and the data combining unit 25 sequentially to thereby display a master picture-photographed image or a slave picture-photographed image based on the master picture-photographed image data D11 or the slave picture-photographed image data D25 on the display unit 15.

In this case, when a picture-photographed image switching instruction is inputted via the operation unit 23, the master controller 20 reads out the master picture-photographed image data D11 and the slave picture-photographed image data D25 from the DRAM 22 in accordance with a time series of picture photographing corresponding to master picture photographing date and time information and slave picture photographing date and time information. The master controller 20 sends the master picture-photographed image data D11 and the slave picture-photographed image data D25 to the display unit 15 via the parallel bus 21, the data extracting unit 30, and the data combining unit 25 sequentially. Consequently, the master controller 20 displays a master picture-photographed image and a slave picture-photographed image based on the master picture-photographed image data D11 and the slave picture-photographed image data D25 on the display unit 15 while sequentially switching the master picture-photographed image and the slave picture-photographed image.

In this way, the master controller 20 is adapted to cause a user to view the master picture-photographed image and the slave picture-photographed image based on the master picture-photographed image data D11 and the slave picture-photographed image data D25, which are generated by photographing pictures of the subject 2 with the master digital still camera 3 and the slave digital still cameras 4A to 4N, freely via the display unit 15.

In addition, in a state in which the reproduction mode is selected according to operation of the operation unit 23, whereby a menu screen is displayed on the display unit 15, when a reproduction instruction for a moving-picture-photographed image is continuously inputted on the menu screen via the operation unit 23, the master controller 20 starts photographed image reproduction processing (hereinafter referred to as moving-picture-photographed image reproduction processing).

In this case, the master controller 20 searches for master moving picture photographing date and time information and the slave moving picture photographing date and time information, which are stored in the master moving picture file data D17 and the slave moving picture file data D23 in the recording medium 36, via the recording/reproduction control unit 35.

Consequently, the master controller 20 reproduces in order in time series, data ranging from the master moving picture file data D17 or the slave moving picture file data D23, in which oldest master moving picture photographing date and time information or slave moving picture photographing date and time information is stored, to the master moving picture file data D17 or the slave moving picture file data D23, in which latest master moving picture photographing date and time information or slave moving picture photographing date and time information is stored, from the recording medium 36 with the recording/reproduction control unit 35. The master controller 20 transfers the master moving picture file data D17 and the slave moving picture file data D23 reproduced in order to the DRAM 22 sequentially.

In addition, the master controller 20 extracts and captures moving picture image compression-coded data from the master moving picture file data D17 and the slave moving picture file data D23 sequentially transferred to the DRAM 22. The master controller 20 decodes the captured moving picture image compression-coded data according to the compression coding system such as MPEG and stores obtained master moving-picture-photographed image data D16 and slave moving-picture-photographed image data D26 in the DRAM 22 again.

Moreover, the master controller 20 sends from the DRAM 22, the master moving-picture-photographed image data D16 or the slave moving-picture-photographed image data D26 obtained by oldest picture photographing, among the master moving-picture-photographed image data D16 and the slave moving-picture-photographed image data D26 stored again, to the display unit 15 via the parallel bus 21, the data extracting unit 30, and the data combining unit 25 sequentially to thereby display a master moving-picture-photographed image or a slave moving-picture-photographed image based on the master moving-picture-photographed image data D16 or the slave moving-picture-photographed image data D26 on the display unit 15.

In this case, when a moving-picture-photographed image switching instruction is inputted via the operation unit 23, the master controller 20 reads out the master moving-picture-photographed image data D16 and the slave moving-picture-photographed image data D26 from the DRAM 22 in accordance with a time series of moving-picture photographing corresponding to master moving picture photographing date and time information and slave moving picture photographing date and time information. The master controller 20 sends the master moving-picture-photographed image data D16 and the slave moving-picture-photographed image data D26 to the display unit 15 via the parallel bus 21, the data extracting unit 30, and the data combining unit 25 sequentially. Consequentially, the master controller 20 displays a master moving-picture-photographed image and a slave moving-picture-photographed image based on the master moving-picture-photographed image data D16 and the moving-slave picture-photographed image data D26 on the display unit 15 while sequentially switching the master moving-picture-photographed image and the slave moving picture-photographed image.

In this way, the master controller 20 is adapted to cause a user to view the master moving-picture-photographed image and the slave moving-picture-photographed image based on the master moving-picture-photographed image data D16 and the slave moving-picture-photographed image data D26, which are generated by photographing moving pictures of the subject 2 with the master digital still camera 3 and the slave digital still cameras 4A to 4N, freely via the display unit 15.

Incidentally, for example, when a capacity of a battery (not shown) for driving the master digital still camera 3 falls to be lower than a defined value set in advance to make it difficult to maintain driving or when, in executing various kinds of processing, an instruction prohibited by the processing is inputted via the operation unit 23, the master controller 20 is adapted to send an alarm sound generation instruction to a sound synthesizing unit 37 and send a sound signal corresponding to an alarm sound or the like, which is synthesized according to the alarm sound generation instruction in the sound synthesizing unit 37, to a speaker 39 via an amplifier 38 to thereby output the alarm sound or the like from the speaker 39 and call a user's attention.

Note that, in the case of the first embodiment, in a state in which none of the subordinately operable slave digital still cameras 4A to 4N is present in the master radio communication range, the master controller 20 can subject the subject 2 to picture photographing and moving picture photographing independently from the slave digital still cameras 4A to 4N.

Consequently, the master controller 20 uses the master digital still camera 3 not only in association with the slave digital still cameras 4A to 4N but also independently to improve convenience of use.

On the other hand, in FIG. 5 in which components corresponding to those in FIG. 3 are denoted by identical reference numerals and signs, in the slave digital still cameras 4A to 4N, a controller (hereinafter referred to as slave controller) 40, which has a CPU, a nonvolatile memory such as an SRAM, a ROM, and the like, expands various application programs such as a slave registration processing program, a slave photographing processing program, and a photographed image provision processing program, which are stored in the internal ROM in advance, on the DRAM 22 according to various instructions inputted via the operation unit 23 to control the respective circuit units of the slave digital still cameras 4A to 4N totally. Through this control, the slave controller 40 executes slave registration processing for the master digital still camera 3, slave picture photographing processing, slave moving picture photographing processing, and photographed image provision processing for providing the master digital still camera 3 with the slave picture-photographed image data D25 and the slave moving-picture-photographed image data D26, and the like processing.

The slave controller 40 receives a slave registration request signal S1 transmitted from the master digital still camera 3 with the antenna 27. Then, the slave controller 40 subjects the slave registration request signal S1 to reception processing in the transmission/reception processing unit 26 and captures obtained slave registration request data D1 to thereby start slave registration processing for the master digital still camera 3 in accordance with the captured slave registration request data D1.

In this case, the slave controller 40 sends slave registration inquiry screen data stored in the internal ROM in advance, to the display unit 15 via the OSDC 24 and the data combining unit 25 sequentially to thereby display a slave registration inquiry screen, which has icons for selecting an approval instruction and a rejection instruction for slave registration for the master digital still camera 3, respectively, on the display unit 15 on the basis of the slave registration inquiry screen data.

In this state, an approval instruction is inputted on the slave registration inquiry screen via the operation unit 23. Then, the slave controller 40 generates slave registration approval data D2 for approving slave registration for the master digital still camera 3 according to the approval instruction, sends this slave registration approval data D2 to the transmission/reception processing unit 26, and subjects the slave registration approval data D2 to transmission processing. Then, the slave controller 40 transmits an obtained slave registration approval signal S2 to the master digital still camera 3 from the antenna 27.

As a result, when the slave controller 40 receives a master registration signal S3 transmitted from the master digital still camera 3 with the antenna 27, the slave controller 40 subjects the master registration signal S3 to reception processing in the transmission/reception processing unit 26 and captures obtained master registration data D3.

Consequently, the slave controller 40 stores identification information for master registration peculiar to the master digital still camera 3, which is obtained on the basis of the master registration data D3, in the internal nonvolatile memory. The slave controller 40 registers the master digital still camera 3 as a master for the own slave digital still cameras 4A to 4N.

The slave controller 40 reads out identification information for slave registration peculiar to the own slave digital still cameras 4A to 4N stored in advance, from the internal nonvolatile memory, sends this identification information for slave registration to the transmission/reception processing unit 26 as slave registration data D4, and subjects the slave registration data D4 to transmission processing. Then, the slave controller 40 transmits an obtained slave registration signal S4 to the master digital still camera 3 from the antenna 27.

Consequently, the slave controller 40 registers the own slave digital still cameras 4A to 4N as slaves to the master digital still camera 3 and ends the slave registration processing.

Incidentally, when a rejection instruction is inputted on the slave registration inquiry screen via the operation unit 23, the slave controller 40 generates slave registration rejection data D5 for rejecting slave registration for the master digital still camera 3, sends this slave registration rejection data D5 to the transmission/reception processing unit 26, and subjects the slave registration rejection data D5 to transmission processing. Then, the slave controller 40 transmits obtained slave registration rejection signal S5 to the master digital still camera 3 from the antenna 27 to thereby end the slave registration processing.

When the slave controller 40 receives a search signal S7A, which is transmitted from the master digital still camera 3 according to execution of the master picture photographing processing, with the antenna 27, the slave controller 40 subjects the search signal S7A to reception processing in the transmission/reception processing unit 26 and captures obtained search data D7A.

Consequently, the slave controller 40 starts slave picture photographing processing for slave picture photographing for the subject 2 in accordance with the search data D7A.

In this case, the slave controller 40 generates subordinate operability notification data D8, sends this subordinate operability notification data D8 to the transmission/reception processing unit 26, and subjects the subordinate operability notification data D8 to transmission processing. Then, the slave controller 40 transmits an obtained subordinate operability notification signal S8 to the master digital still camera 3 from the antenna 27.

The slave controller 40 transmits imaging light L2 arriving from the subject 2 through the lens 11 and receives the imaging light L2 with the solid state imaging device 28.

Consequently, the solid state imaging device 28 photoelectrically converts the imaging light L1, which is being received, sequentially at predetermined periods to thereby generate an analog imaging output signal S20 corresponding to the imaging light L2 and sends the generated imaging output signal S20 to the data generating unit 29.

After subjecting the imaging output signal S20 given from the solid state imaging device 28 sequentially to analog/digital conversion, the data generating unit 29 applies predetermined data processing to the imaging output signal S20 to thereby generate imaged moving image data D30. The data generating unit 29 sends the generated imaged moving image data D30 to the display unit 15 via the data extracting unit 30 and the data combining unit 25 sequentially to thereby display an imaged moving image based on the imaged moving image data D30 on the display unit 15.

Moreover, the slave controller 40 generates slave photographing notification screen data D31 for notifying a user that the own slave digital still cameras 4A to 4N photograph pictures of the subject 2 subordinately in association with picture photographing for the subject 2 by the master digital still camera 3. The slave controller 40 sends the generated slave photographing notification screen data D31 to the data combining unit 25 via the OSDC 24.

Figure 6:
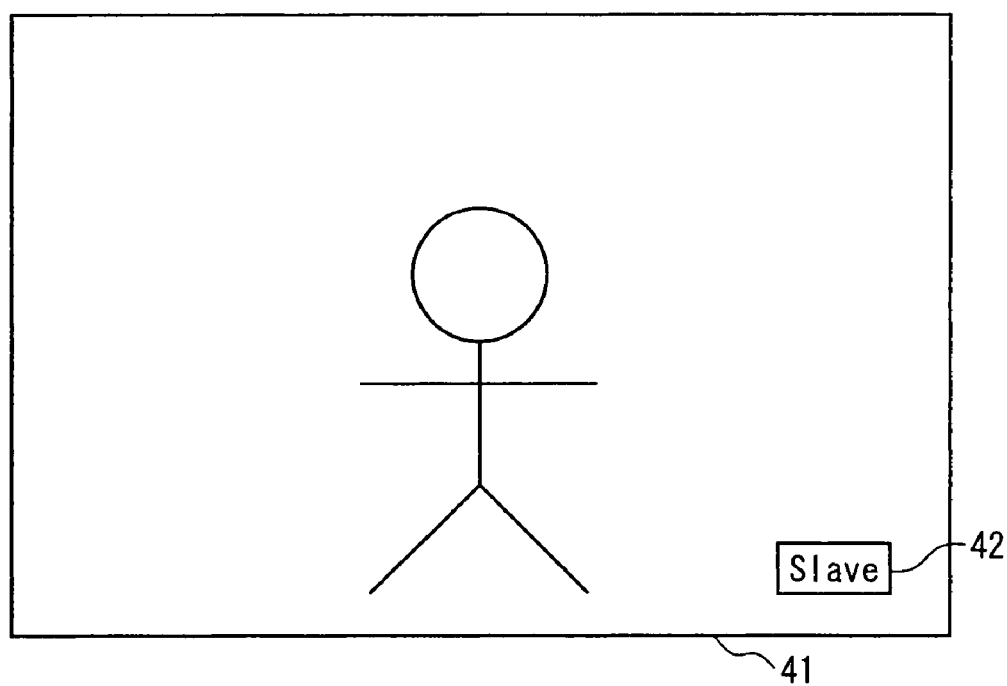
FIG. 6 is a schematic diagram showing a constitution of a combined screen for notification of slave photographing.

The data combining unit 25 combines the slave photographing notification screen data D31 with the imaged moving image data D30 given from the data generating unit 29 via the data extracting unit 30 and sends obtained combined screen data for slave photographing notification D32 to the display unit 15 to thereby display a combined screen for slave photographing notification 41 shown in FIG. 6 based on the combined screen data for slave photographing notification D32 on the display unit 15.

The combined screen for slave photographing notification 41 is constituted by superimposing a slave photographing notification screen based on the slave photographing notification screen data D31 on an imaged moving image based on the imaged moving image data D30.

In this case, the slave photographing notification screen, which is superimposed on the imaged moving image in the combined screen for slave photographing notification 41, is provided with, at one corner thereof, a slave photographing execution notification icon 42 that notifies that the own slave digital still cameras 4A to 4N photograph pictures and moving pictures of the subject 2 subordinately in association with picture photographing and moving image photographing for the subject 2 by the master digital still camera 3, using display colors different from one another.

In the combined screen for slave photographing notification 41, the slave photographing notification screen transmits the imaged moving image in portions other than a portion where the slave photographing execution notification icon 42 is provided.

Therefore, the slave controller 40 notifies a user that the own slave digital still cameras 4A to 4N photograph pictures subordinately in association with picture photographing by the master digital still camera 3 while causing the user to visually recognize an imaging state for the subject 2 with the combined screen for slave photographing notification 41.

The slave controller 40 receives with the antenna 27, a picture photographing instruction signal S10 transmitted from the master digital still camera 3 in a state in which the subject 2 is photographed in this way. Then, the slave controller 40 subjects the picture photographing instruction signal S10 in the transmission/reception processing unit 26 to reception processing and captures obtained picture photographing instruction data D13.

At this point, the slave controller 40 extracts master picture photographing date and time information and picture photographing condition information stored in the picture photographing instruction data D13 to thereby control the data extracting unit 30 in accordance with picture photographing conditions based on a master picture photographing date and time.

Consequently, the slave controller 40 extracts imaged still image data equivalent to one imaged still image, which is generated at a point substantially the same as a master photographing instruction input point (i.e., a point when the shutter button 14 is depressed in the master digital still camera 3), or imaged still image data equivalent to one imaged still image, which is generated at a picture photographing point after elapse of picture photographing delay time from the master photographing instruction input point, among temporally-continuous plural imaged still image data constituting the imaged moving image data D30, which is given from the data generating unit 29, in the data extracting unit 30 as slave-picture-photographed image data D25. The slave controller 20 stores the extracted slave-picture-photographed image data D25 in the DRAM 22.

The slave controller 40 reads out the slave picture-photographed image data D25 and captures the slave picture-photographed image data D25 from the DRAM 22. The slave controller 40 subjects the slave picture-photographed image data D25 to compression coding in accordance with the compression coding system such as JPEG, and stores obtained picture image compression-coded data in the DRAM 22 again.

At this point, the slave controller 40 generates picture file header data in which a file name for recording management for the slave picture-photographed image data D25, slave picture photographing date and time information at a point when the slave picture-photographed image data D25 is extracted (i.e., at a point when the subject 2 is subjected to picture photographing), and the like are stored.

Then, the slave controller 40 generates slave picture file data D21 with the picture file header data attached to a top of the picture image compression-coded data stored in the DRAM 22. The slave controller 40 transfers the generated slave picture file data D21 from the DRAM 22 to a recording/reproduction control unit 35.

Consequently, the slave controller 40 records the slave picture file data D21 in the recording medium 36 using the recording/reproduction control unit 35.

In this way, every time the subject 2 is subjected to picture photographing by the master digital still camera 3, the slave controller 40 subjects the subject 2 to picture photographing substantially simultaneously with a master photographing instruction input point or at a picture photographing point after elapse of picture photographing delay time from the master photographing instruction input point in association with the picture photographing for the subject 2 by the master digital still camera 3.

The slave controller 40 receives a slave picture photographing end signal S11 transmitted from the master digital still camera 3 with the antenna 27. Then, in the transmission/reception processing unit 26 the slave controller 40 subjects the slave picture photographing end signal S11 to reception processing and captures obtained slave picture photographing end data D14 to thereby end the slave picture photographing processing in accordance with the slave picture photographing end data D14.

Moreover, the slave controller 40 receives a search signal S7B, which is transmitted from the master digital still camera 3 according to execution of the master moving picture photographing processing, with the antenna 27. Then, the slave controller 40 subjects the search signal S7B to reception processing in the transmission/reception processing unit 26 and captures obtained search data D7B.

Consequently, the slave controller 40 starts slave moving picture photographing processing for slave moving picture photographing for the subject 2 in accordance with the search data D7B.

In this case, the slave controller 40 transmits subordinate operability notification data D8 from the antenna 27 to the master digital still camera 3 as a subordinate operability notification signal S8 using the transmission/reception processing unit 26 in the same manner as the case in which the slave picture photographing processing is executed.

The slave controller 40 starts photographing for the subject 2 and combines slave photographing notification screen data D31 with imaged moving image data D30. The slave controller 40 sends obtained combined screen data D32 for slave photographing notification to the display unit 15 and displays the combined screen 41 for slave photographing notification, which is described above with reference to FIG. 6, to thereby notify a user that the own slave digital still cameras 4A to 4N photograph moving pictures subordinately in association with moving picture photographing by the master digital still camera 3 while causing the user to visually recognize an imaging state for the subject 2.

The slave controller 40 receives a moving picture photographing instruction signal S13, which is transmitted from the master digital still camera 3, with the antenna 27 in a state in which the subject 2 is imaged. Then, the slave controller 40 subjects the moving picture photographing instruction signal S13 to reception processing in the transmission/reception processing unit 26 and captures obtained moving picture photographing instruction data D18.

At this point, the slave controller 40 extracts master moving picture photographing starting date and time information and moving picture photographing condition information stored in the moving picture photographing instruction data D18 to thereby control the data extracting unit 30 in accordance with moving picture photographing conditions based on a master moving picture photographing starting date and time.

Consequently, the slave controller 40 extracts plural imaged still image data equivalent to temporally continuous plural imaged still images, which are generated from substantially the same point as a master photographing instruction input point to a moving picture photographing end point after elapse of moving picture photographing time, or plural imaged still image data equivalent to temporally continuous plural imaged still images, which are generated from a moving picture photographing start point after elapse of moving picture photographing delay time based on the master photographing instruction input point to a moving picture photographing end point after elapse of moving picture photographing time, among temporally continuous plural imaged still image data constituting the imaged moving image data D30, which is given from the data generating unit 29, as slave moving-picture-photographed image data D26 in the data extracting unit 30. The slave controller 40 stores the extracted slave moving-picture-photographed image data D26 in the DRAM 22.

Then, the slave controller 40 reads out the slave moving-picture-photographed image data D26 from the DRAM 22 and captures the master moving-picture-photographed image data D26. The slave controller 40 subjects the slave moving-picture-photographed image data D26 to compression coding in accordance with the compression coding system such as MPEG (Moving Picture Experts Group) and stores obtained moving picture compression-coded data in the DRAM 22 again.

At this point, the slave controller 40 generates moving picture file header data in which a file name for recording management for the slave moving-picture-photographed image data D26, slave moving picture photographing date and time information at a point when the extraction of the slave moving-picture-photographed image data D26 is started (i.e., a point when moving picture photographing for the subject 2 is started), and the like are stored.

The slave controller 40 generates slave moving picture file data D23 with the moving picture file header data attached to a top of the moving picture image compression-coded data stored in the DRAM 22. The slave controller 40 transfers the generated slave moving picture file data D23 from the DRAM 22 to the recording/reproduction control unit 35.

Consequently, the slave controller 40 records the slave moving picture file data D23 in the recording medium 36 using the recording/reproduction control unit 35.

In this way, every time the subject 2 is subjected to moving picture photographing by the master digital still camera 3, the slave controller 40 starts moving picture photographing for the subject 2 substantially simultaneously with a master photographing instruction input point or at a moving picture photographing start point after elapse of moving picture photographing delay time from the master photographing instruction input point in association with the moving picture photographing for the subject 2 by the master digital still camera 3. The slave controller 40 subjects the subject 2 to moving picture photographing over moving picture photographing time.

The slave controller 40 receives a slave moving picture photographing end signal S14 transmitted from the master digital still camera 3 with the antenna 27. Then the slave controller 40 subjects the slave moving picture photographing end signal S14 to reception processing in the transmission/reception processing unit 26 and captures obtained slave moving picture photographing end data D19. Consequently, the slave controller 40 ends the slave moving picture photographing processing in accordance with the slave moving picture photographing end data D19.

After the slave picture photographing processing ends, the slave controller 40 receives a picture-photographed image request signal S15 transmitted form the master digital still camera 3 with the antenna 27. Then, the slave controller 40 subjects the picture-photographed image request signal S15 to reception processing in the transmission/reception processing unit 26 and captures obtained picture-photographed image request data D20. Consequently, the slave controller 40 starts photographed image provision processing for providing slave picture-photographed image data D25 (hereinafter referred to as picture-photographed image provision processing) according to the picture-photographed image request data D20.

In this case, the slave controller 40 extracts master picture photographing date and time information and picture photographing condition information stored in the picture-photographed image request data D20. The slave controller 40 searches for slave picture photographing date and time information stored in slave picture file data D21 in the recording medium 36 with the recording/reproduction control unit 35 in accordance with the extracted master picture photographing date and time information and picture photographing condition information. Consequently, the slave controller 40 specifies the slave picture file data D21 that is generated by photographing pictures of the subject 2 subordinately in association with picture photographing by the master digital still camera 3.

Then, the slave controller 40 reads out the specified slave picture file data D21 from the recording medium 36 with the recording/reproduction control unit 35, sends the slave picture file data D21 to the transmission/reception processing unit 26, and subjects the slave picture file data D21 to transmission processing. Consequently, the slave controller 40 transmits an obtained slave picture file signal S16 to the master digital still camera 3 from the antenna 27.

Consequently, the slave controller 40 provides the master digital still camera 3 with slave picture-photographed image data D25, which is generated by photographing pictures of the subject 2 subordinately in association with picture photographing for the subject 2 by the master digital still camera 3, as the slave picture file data D21 surely.

Moreover, after the slave moving picture photographing processing ends, the slave controller 40 receives a moving-picture-photographed image request signal S17 transmitted from the master digital still camera 3 with the antenna 27. Then, the slave controller 40 subjects the moving-picture-photographed image request signal 17 to reception processing in the transmission/reception processing unit 26 and captures obtained moving-picture-photographed image request data D22. Consequently, the slave controller 40 starts photographed image provision processing for providing slave moving-picture-photographed image data D26 (hereinafter referred to as moving-picture-photographed image provision processing) according to the moving-picture-photographed image request data D22.

In this case, the slave controller 40 extracts master moving picture photographing start date and time information and moving picture photographing condition information stored in the moving-picture-photographed image request data D22. The slave controller 40 searches for slave moving picture photographing start date and time information stored in slave moving picture file data D23 in the recording medium 36 with the recording/reproduction control unit 35 in accordance with the extracted master moving picture photographing start date and time information and moving picture photographing condition information. Consequently, the slave controller 40 specifies the slave moving picture file data D23 that is generated by photographing moving pictures of the subject 2 subordinately in association with moving picture photographing by the master digital still camera 3.

Then, the slave controller 40 reads out the specified slave moving picture file data D23 from the recording medium 36 with the recording/reproduction control unit 35, sends this slave moving picture file data D23 to the transmission/reception processing unit 26, and subjects the slave moving picture file data D23 to transmission processing. Consequently, the slave controller 40 transmits an obtained slave moving picture file signal S18 to the master digital still camera 3 from the antenna 27.

Consequently, the slave controller 40 provides the master digital still camera 3 with slave moving-picture-photographed image data D26, which is generated by photographing moving pictures of the subject 2 subordinately in association with moving picture photographing for the subject 2 by the master digital still cameral 3, as the slave moving picture file data D23 surely.

Note that, in the case of this first embodiment, when the slave controller 40 subjects the subject 2 to picture photographing and moving picture photographing subordinately at a picture photographing point and a moving picture photographing start point after elapse of picture photographing delay time and after elapse of moving picture photographing delay time from a master photographing instruction input point, the slave controller 40 blinks the slave photographing execution notification icon 42 in the combined screen for slave photographing notification 41, which is described above with reference to FIG. 6, with a predetermined color and at a predetermined period from the master photographing instruction input point to the picture photographing point and the moving picture photographing start point after elapse of the picture photographing delay time and the moving picture photographing delay time.

In addition, when the slave controller 40 subjects the subject 2 to moving picture photographing subordinately in association with moving picture photographing for the subject 2 by the master digital still camera 3, the slave controller 40 blinks the slave photographing execution notification icon 42 in the combined screen for slave photographing notification 41 with a predetermined color and at a predetermined period different from those for notification of picture photographing delay time and moving picture delay time from a moving picture photographing start point to a moving picture photographing end point after elapse of moving picture photographing time.

The slave digital still cameras 4A to 4N photograph pictures and moving pictures of the subject 2 automatically in association with picture photographing and moving picture photographing for the subject 2 by the master digital still camera 3. However, when the slave digital still cameras 4A to 4N photograph pictures and moving pictures of the subject 2 subordinately, for example, in a state in which the slave digital still cameras 4A to 4N are held by a user, the slave controller 40 can inform the user that the slave digital still cameras 4A to 4N are in a period after receiving a picture photographing instruction and a moving picture photographing instruction from the master digital still camera 3 until the slave digital still cameras 4A to 4N actually photograph pictures and moving pictures of the subject 2 (i.e., a picture photographing delay time and moving picture photographing delay time) or in a period in which the slave digital still cameras 4A to 4N photograph moving pictures of the subject 2 (i.e., moving picture photographing time). In addition, the slave controller 40 can inform the user that the slave digital still cameras 4A to 4N are also in a state of picture photographing and moving picture photographing in association with picture photographing and moving picture photographing by the master digital still camera 3.

Therefore, the slave controller 40 can cause the user to confirm a photographing direction, a photographing angle, and the like at the time of picture photographing and moving picture photographing. In addition, the slave controller 40 can cause the user to concentrate on the picture photographing and the moving picture photographing to reduce occurrence of camera shake as much as possible. As a result, it is possible to subject the subject 2 to picture photographing and moving picture photographing surely.

In addition, in the case of the first embodiment, in the slave controller 40, when the own shutter button 14 is depressed, the slave digital still cameras 4A to 4N can photograph pictures and moving pictures of the subject 2 independently from the master digital still camera 3 in response to the depression of the shutter button 14 regardless of whether the slave digital still cameras 4A to 4N operate outside the master radio communication range or operate in the master radio communication range.

Consequently, the slave controller 40 actuates the slave digital still cameras 4A to 4N not only subordinately to the master digital still camera 3 but also independently to improve convenience of use.

Figure 7:
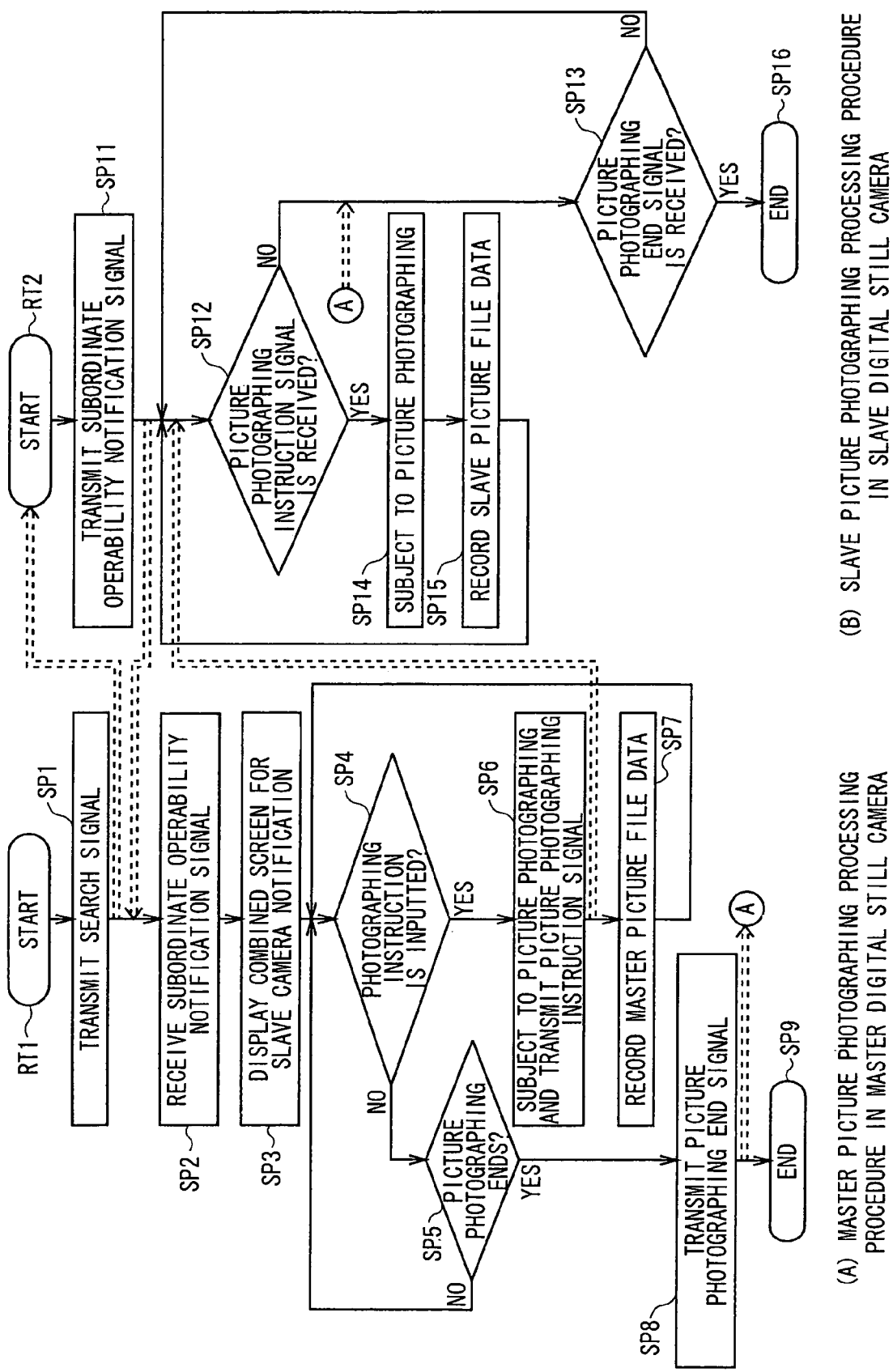
FIG. 7 is a flowchart showing a procedure for picture photographing processing in the photographing system according to the first embodiment.

A picture photographing processing procedure by the master digital still camera 3 and the plural slave digital still camera 4A to 4N in the photographing system 1 is summarized as described below. As shown in FIG. 7(A), first, when the picture photographing mode is selected via the operation unit 23, the master controller 20 of the master digital still camera 3 executes the master picture photographing processing in accordance with the master photographing processing program. Consequently, the master controller 20 enters a master picture photographing processing procedure RT1 from a start step and shifts to the following step SP1.

In step SP1, the master controller 20 starts imaging for the subject 2, transmits a search signal S7A, and shifts to the following step SP2.

At this point, as shown in FIG. 7(B), the slave controller 40 of each of the subordinately operable plural slave digital still cameras 4A to 4N present in the master radio communication range executes the slave picture photographing processing in accordance with the slave photographing processing program in response to reception of the search signal S7A transmitted from the master digital still camera 3. Consequently, the slave controller 40 enters a slave picture photographing processing procedure RT2 form a start step and shifts to the following step SP11.

In step SP11, the slave controller 40 starts imaging for the subject 2, transmits a subordinate operability notification signal S8 to the master digital still camera 3, displays the combined screen for slave photographing notification 41 on the display unit 15, and shifts to step SP12.

At this point, in step SP2, the master controller 20 receives the subordinate operability notification signal S8 transmitted from each of the slave digital still cameras 4A to 4N and shifts to the following step SP3.

In step SP3, the master controller 20 displays the combined screen 32 for slave camera notification on the display unit 15 to thereby inform a user of the slave digital still cameras 4A to 4N, which photograph pictures of the subject 2 subordinately in association with picture photographing for the subject 2 by the master digital still camera 3, and shifts to the following step SP4.

In step SP4, the master controller 20 judges whether a photographing instruction is inputted for picture photographing.

If a negative result is obtained in this step SP4, this indicates that the shutter button 14 has not been depressed because the user judges that a perfect moment for a good shot of the subject 2 has not come yet. At this point, the master controller 20 shifts to step SP5.

In step SP5, the master controller 20 judges whether end of the master picture photographing processing is instructed.

When a negative result is obtained in this step SP5, this indicates that, for example, the picture photographing mode is still selected and it is still likely that the master digital still camera 3 subjects the subject 2 to picture photographing. At this point, the master controller 20 returns to step SP4.

Consequently, thereafter, until positive results are obtained in step SP4 and step SP5, the master controller 20 repeats the processing in steps SP4 and SP5 cyclically to thereby wait for a photographing instruction to be inputted for picture photographing or end of the master picture photographing processing to be instructed.

When a positive result is obtained in step SP4, this indicates that, for example, the shutter button 14 is depressed because the user judges that a perfect moment for a good shot of the subject 2 has come. At this point, the master controller 20 shifts to step SP6.

In step SP6, the master controller 20 extracts imaged still image data equivalent to one imaged still image generated at a master photographing instruction input point among plural imaged still image data constituting imaged moving image data D6, which are generated while the subject 2 is imaged, as master picture-photographed image data D11. The master controller 20 transmits picture photographing instruction data D13, which stores master picture photographing date and time information at the master photographing instruction input point and picture photographing condition information for the slave digital still cameras 4A to 4N subordinately operable in the master radio communication range, to the slave digital still cameras 4A to 4N in the master radio communication range as a picture photographing instruction signal S10. Then, the master controller 20 shifts to the following step SP7.

Then, in step SP7, the master controller 20 subjects the extracted master picture-photographed image data D11 to compression coding to form the data in a file format according to input of a photographing instruction to thereby generate master picture file data D12. The master controller 20 records the generated master picture file data D12 in the recording medium 36 and returns to step SP4.

Thereafter, the master controller 20 repeats the processing in steps SP4, SP5, SP6, and SP7 cyclically until a positive result is obtained in step SP5 to thereby photograph pictures of the subject 2 independently from the plural slave digital still cameras 4A to 4N every time the photographing instruction is inputted.

On the other hand, in step SP12, the slave controller 40 judges whether the picture photographing instruction signal S10 transmitted from the master digital still camera 3 is received.

When a negative result is obtained in this step SP12, this indicates that, for example, the master digital still camera 3 has not instructed picture photographing yet because the user judges that a perfect moment for a good shot of the subject 2 has not come yet. At this point, the slave controller 40 shifts to step SP13.

In step SP13, the slave controller 40 judges whether the slave picture photographing end signal S11 transmitted from the master digital still camera 3 is received.

When a negative result is obtained in this step SP13, this indicates that the master digital still camera 3 has not informed the slave still cameras of end of the slave picture photographing processing following end of the master picture photographing processing yet because it is still likely that the master digital still camera 3 picture photographing to the subject 2. At this point, the slave controller 40 returns to step SP12.

Consequently, thereafter, until positive results are obtained in step SP12 and step SP13, the slave controller 40 repeats the processing in steps SP12 and SP13 cyclically to thereby wait for picture photographing to be instructed by the master digital still camera 3 or end of the slave picture photographing processing to be notified by the master digital still camera 3.

When a positive result is obtained in step SP12, this indicates that, for example, the shutter button 14 is depressed in the master digital still camera 3 because the user judges that a perfect moment for a good shot of the subject 2 has come, whereby picture photographing is instructed by the master digital still camera 3. At this point, the slave controller 40 shifts to step SP14.

In step SP14, the slave controller 40 extracts imaged still image data equivalent to one imaged still image generated at a point substantially the same as a master photographing instruction input point or a picture photographing point after elapse of picture photographing delay time from the master photographing instruction input point, among plural imaged still image data constituting imaged moving image data D30, which are generated while the subject 2 is imaged, as slave picture-photographed image data D25 in accordance with master picture photographing date and time information and picture photographing condition information obtained on the basis of the picture photographing instruction signal S10. Then, the slave controller 40 shifts to the following step SP15.

Then, in step SP15, the slave controller 40 subjects the extracted slave picture-photographed image data D25 to compression coding to form the data in a file format to thereby generate slave picture file data D21. The slave controller 40 records the generated slave picture file data D21 in the recording medium 36 and returns to step SP12.

In this way, the slave controller 40 repeats the processing in steps SP12, SP13, SP14, and SP15 cyclically until a positive result is obtained in step SP13. Consequently, every time the subject 2 is subjected to picture photographing by the master digital still camera 3, the slave controller 40 subjects the subject 2 to picture photographing substantially simultaneously with a master photographing instruction input point or at a picture photographing point after elapse of picture photographing delay time from the master photographing instruction input point.

Incidentally, when a positive result is obtained in step SP5, this indicates that end of the master picture photographing processing is instructed via the operation unit 23 because the user has photographed pictures of the subject 2 to the user's satisfaction. At this point, the master controller 20 shifts to step SP8.

In step SP8, the master controller 20 transmits a slave picture photographing end signal S11 to the subordinately operable slave digital still cameras 4A to 4N present in the master radio communication range. Then, the master controller 20 shifts to the following step SP9 and ends the master picture photographing processing procedure RT1.

When a positive result is obtained in step SP13, this indicates that end of the slave picture photographing processing is notified by the master digital still camera 3 following the end of the master picture photographing processing. At this point, the slave controller 40 shifts to the following step SP16 and ends the slave picture photographing processing procedure RT2. In this way, the entire picture photographing processing procedure in the photographing system 1 ends.

As it is evident from FIG. 1, in the photographing system 1, it is possible to photograph pictures of the subject 2 such as a person or an exhibit staying at one place from plural directions substantially simultaneously using the master digital still camera 3 and the plural slave digital still camera 4A to 4N. In addition, it is also possible to photograph pictures of the subject 2 from plural directions at time intervals with the master digital still camera 3 and the plural slave digital still cameras 4A to 4N, respectively. Therefore, it is possible to take different facial expressions, external appearances, and the like from plural directions with respect to the subject 2 as picture photographed images substantially simultaneously and at different instances freely.

In addition, in the photographing system 1, since the master digital still camera 3 and the plural slave digital still cameras 4A to 4N are connected wirelessly, it is possible to arrange the digital still cameras relatively freely with respect to the subject 2.

Figure 8:
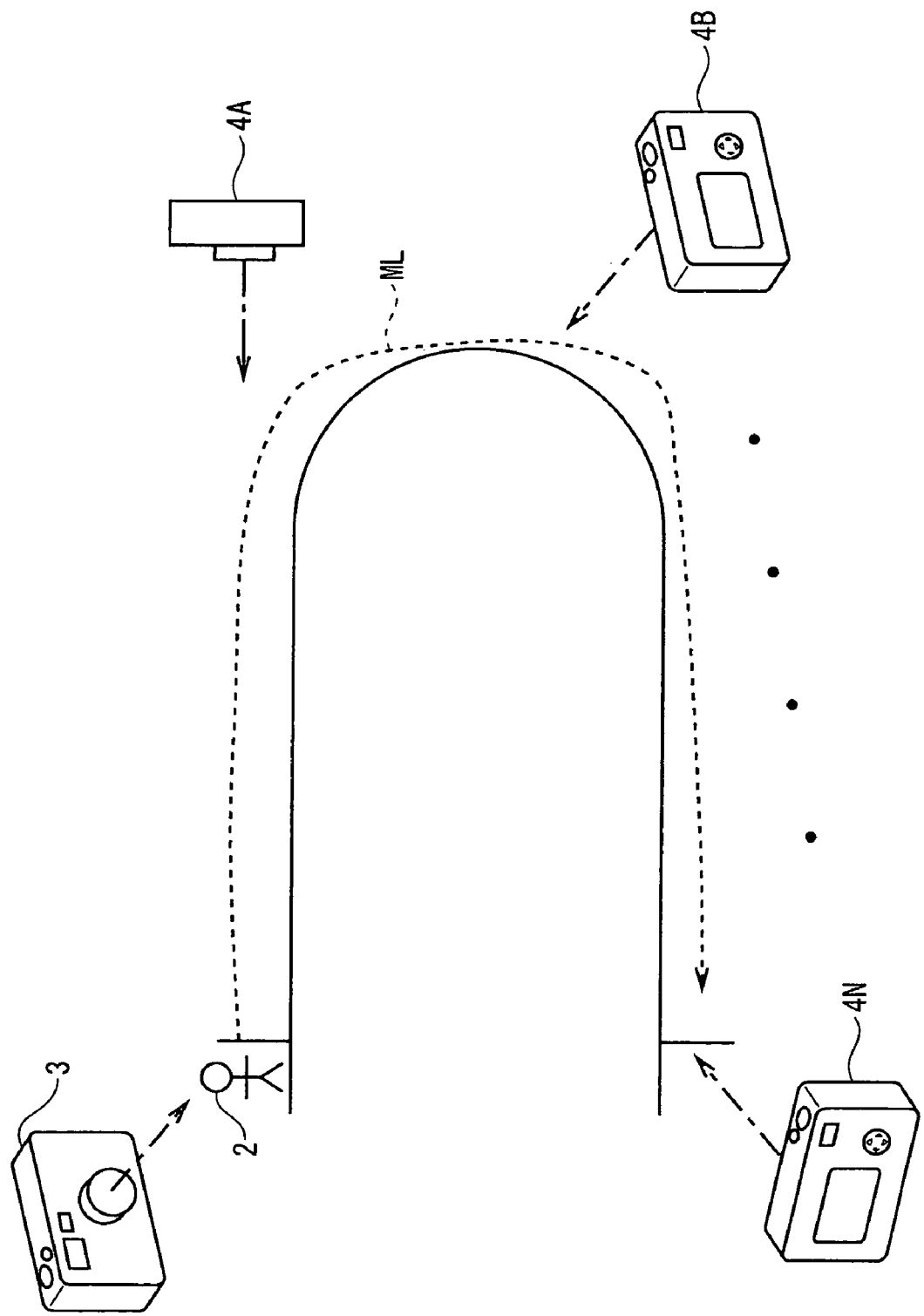
FIG. 8 is a schematic diagram served for explanation of picture photographing and moving picture photographing for a moving subject.

Therefore, in the photographing system 1, as shown in FIG. 8, when a person or a moving body such as a car is the subject 2, the master digital still camera 3 and the plural slave digital still cameras 4A to 4N are arranged along a moving locus ML of the subject 2, whereby it is also possible to photograph pictures of the moving subject 2 from plural directions substantially simultaneously and at time intervals with the master digital still camera 3 and the plural slave digital still cameras 4A to 4N. Therefore, it is also possible take a moving state of the subject 2 as picture photographed images together with facial expressions, external appearances, and the like substantially simultaneously and at different instances freely.

Figure 9:
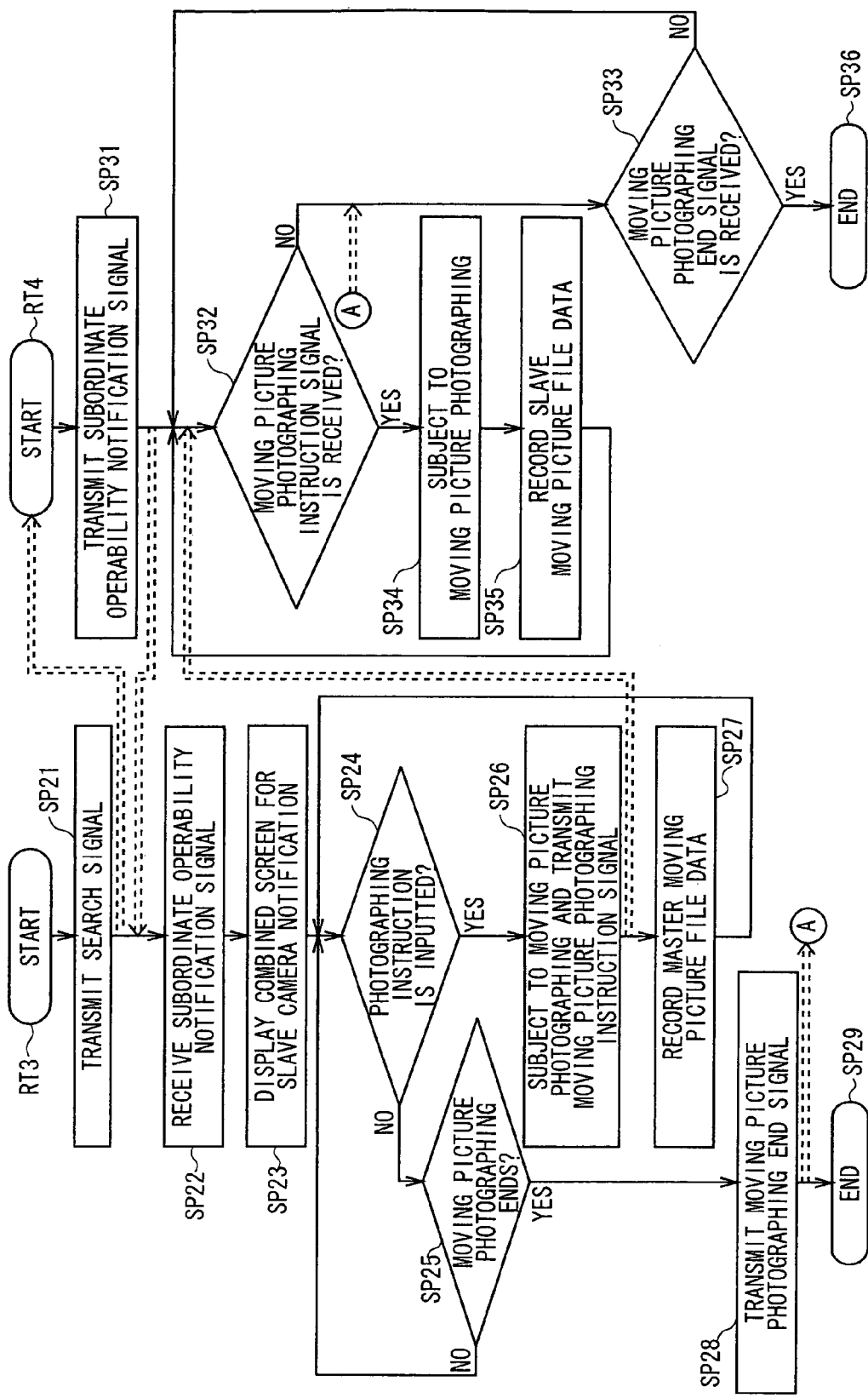
FIG. 9 is a flowchart showing a procedure for moving picture photographing processing in the photographing system according to the first embodiment.

A moving picture photographing processing procedure by the master digital still camera 3 and the plural slave digital still cameras 4A to 4N in the photographing system 1 is summarized as described below. As shown in FIG. 9(A), first, when the moving picture photographing mode is selected via the operation unit 23, the master controller 20 of the master digital still camera 3 executes master moving picture photographing processing in accordance with a master photographing processing program. Consequently, the master controller 20 enters a master moving picture photographing processing procedure RT3 from a start step and shifts to the following step SP21.

In step SP21, the master controller 20 starts imaging for the subject 2, transmits a search signal S7B, and shifts to the following step SP22.

At this point, as shown in FIG. 9(B), the slave controller 40 of each of the subordinately operable plural slave digital still cameras 4A to 4N present in the master radio communication range executes slave moving picture photographing processing in accordance with a slave photographing processing program in response to reception of the search signal S7B transmitted from the master digital still camera 3. Consequently, the slave controller 40 enters a slave moving picture photographing processing RT4 from a start step and shifts to the following step SP31.

In step SP31, the slave controller 40 starts imaging for the subject 2, transmits a subordinate operability notification signal S8 to the master digital still camera 3, displays the combined screen for slave photographing notification 41 on the display unit 15, and shifts to step SP32.

At this point, in step SP22, the master controller 20 receives the subordinate operability notification signal S8 transmitted from each of the slave digital still cameras 4A to 4N and shifts to the following step SP23.

In step SP23, the master controller 20 displays the combined screen 32 for slave camera notification on the display unit 15. Consequently, the master controller 20 notifies the user of presence of the slave digital still cameras 4A to 4N that photograph moving pictures of the subject 2 subordinately in association with moving picture photographing for the subject 2 by the master digital still camera 3. Then, the master controller 20 shifts to step SP24.

In step SP24, the master controller 20 judges whether a photographing instruction is inputted for the moving picture photographing.

When a negative result is obtained in this step SP24, this indicates that, for example, the shutter button 14 has not been depressed because the user judges that a perfect moment for a good shot of moving picture photographing for the subject 2 has not come yet. At this point, the master controller 20 shifts to step SP25.

In step SP25, the master controller 20 judges whether end of the moving picture photographing processing is instructed.

When a negative result is obtained in this step SP25, this indicates that the moving picture photographing mode is still selected and it is still likely that the master digital still camera 3 subjects the subject 2 to moving picture photographing. At this point, the master controller 20 returns to step SP24.

Consequently, thereafter, until positive results are obtained in step SP24 or step SP25, the master controller 20 repeats the processing in steps SP24 and SP25 cyclically to thereby wait for a photographing instruction to be inputted for moving picture photographing or end of the moving picture photographing processing to be instructed.

When a positive result is obtained in step SP24, this indicates that, for example, the shutter button 14 is depressed because the user judges that a perfect moment for a good shot of the subject 2 has come. At this point, the master controller 20 shifts to step SP26.

In step SP26, the master controller 20 extracts plural imaged still image data equivalent to temporally continuous plural imaged still image generated from a master photographing instruction input point to a moving picture photographing end point after elapse of moving picture photographing time among plural imaged still image data constituting imaged moving image data D6, which are generated while the subject 2 is imaged, as master moving-picture-photographed image data D16. The master controller 20 transmits moving picture photographing instruction data D18, which stores master moving picture photographing start date and time information at the master photographing instruction input point and picture photographing condition information, to the slave digital still cameras 4A to 4N in the master radio communication range as a moving picture photographing instruction signal S13. Then, the master controller 20 shifts to the following step SP27.

Then, in step SP27, the master controller 20 subjects the extracted master moving-picture-photographed image data D16 to compression coding to form the data in a file format according to input of a photographing instruction to thereby generate master moving picture file data D17. The master controller 20 records the generated master moving picture file data D17 in the recording medium 36 and returns to step SP24.

Thereafter, the master controller 20 repeats the processing in steps SP24, SP25, SP26, and SP27 cyclically until a positive result is obtained in step SP25 to thereby photograph moving pictures of the subject 2 independently from the plural slave digital still cameras 4A to 4N every time the photographing instruction is inputted.

On the other hand, in step SP32, the slave controller 40 judges whether the moving picture photographing instruction signal S13 transmitted from the master digital still camera 3 is received.

When a negative result is obtained in this step SP32, this indicates that, for example, the master digital still camera 3 has not instructed moving picture photographing yet because the user judges that a perfect moment for a good shot for moving picture photographing of the subject 2 has not come yet. At this point, the slave controller 40 shifts to step SP33.

In step SP33, the slave controller 40 judges whether the slave moving picture photographing end signal S14 transmitted from the master digital still camera 3 is received.

When a negative result is obtained in this step SP33, this indicates that the master digital still camera 3 has not informed the slave still cameras of end of the slave moving picture photographing processing following end of the master moving picture photographing processing yet because it is still likely that the master digital still camera 3 subjects the subject 2 to moving picture photographing. At this point, the slave controller 40 returns to step SP32.

Consequently, thereafter, until positive results are obtained in step SP32 or step SP33, the slave controller 40 repeats the processing in steps SP32 and SP33 cyclically to thereby wait for moving picture photographing of the subject 2 to be instructed by the master digital still camera 3 or end of the slave moving picture photographing processing to be notified by the master digital still camera 3.

When a positive result is obtained in step SP32, this indicates that, for example, the shutter button 14 is depressed in the master digital still camera 3 because the user judges that a perfect moment for a good shot for moving picture photographing of the subject 2 has come, whereby moving picture photographing is instructed by the master digital still camera 3. At this point, the slave controller 40 shifts to step SP34.

In step SP34, in accordance with master moving picture photographing date and time information and moving picture photographing condition information obtained on the basis of the moving picture photographing instruction signal S13, the slave controller 40 extracts as slave moving-picture-photographed image data D26, plural imaged still image data equivalent to temporally continuous plural imaged still image generated from a point substantially the same as a master photographing instruction input point to a moving picture photographing end point after elapse of moving picture photographing time or generated from a moving picture photographing start point after elapse of moving picture photographing delay time based on the master photographing instruction input point to a moving picture photographing end point after elapse of moving picture photographing time among plural imaged still image data constituting imaged moving image data D30, which are generated while the subject 2 is imaged. Then, the slave controller 40 shifts to the following step SP35.

Then, in step SP35, the slave controller 40 subjects the slave moving picture-photographed image data D26 to compression coding to form the data in a file format to thereby generate slave moving picture file data D23. The slave controller 40 records the generated slave moving picture file data D23 in the recording medium 36 and returns to step SP32.

In this way, the slave controller 40 repeats the processing in steps SP32, SP33, SP34, and SP35 cyclically until a positive result is obtained in step SP33. Consequently, every time the subject 2 is subjected to moving picture photographing by the master digital still camera 3, the slave controller 40 starts moving picture photographing for the subject 2 substantially simultaneously with a master photographing instruction input point or at a moving picture photographing start point after elapse of moving picture photographing delay time from the master photographing instruction input point in association with the moving picture photographing for the subject 2 by the master digital still camera 3. The slave controller 40 subjects the subject 2 to moving picture photographing over moving picture photographing time.

Incidentally, when a positive result is obtained in step SP25, this indicates that end of the master moving picture photographing processing is instructed via the operation unit 23 because the user has photographed moving pictures of the subject 2 to the user's satisfaction. At this point, the master controller 20 shifts to step SP28.

In step SP28, the master controller 20 transmits a slave moving picture photographing end signal S14 to the subordinately operable slave digital still cameras 4A to 4N present in the master radio communication range. Then, the master controller 20 shifts to the following step SP29 and ends the master moving picture photographing processing procedure RT3.

When a positive result is obtained in step SP33, this indicates that end of the slave moving picture photographing processing is notified by the master digital still camera 3 following the end of the master moving picture photographing processing. At this point, the slave controller 40 shifts to the following step SP36 and ends the slave moving picture photographing processing procedure RT4. In this way, the entire picture photographing processing procedure in the photographing system 1 ends.

As it is evident from FIG. 1, in the photographing system 1, it is possible to photograph moving pictures of the subject 2 such as a person staying at one place from plural directions substantially simultaneously using the master digital still camera 3 and the plural slave digital still camera 4A to 4N. In addition, it is also possible to photograph moving pictures of the subject 2 from plural directions at time intervals with the master digital still camera 3 and the plural slave digital still cameras 4A to 4N, respectively. Therefore, it is possible to take a change of different facial expressions and the like from plural directions with respect to the subject 2 as moving picture photographed images substantially simultaneously and at different instances freely.

In the photographing system 1, as shown in FIG. 8, when a person or a moving body such as a car is the subject 2, it is also possible to photograph moving pictures of the subject 2 along a moving locus ML of the subject 2 from plural directions substantially simultaneously and at time intervals with the master digital still camera 3 and the plural slave digital still cameras 4A to 4N.

Figure 10:
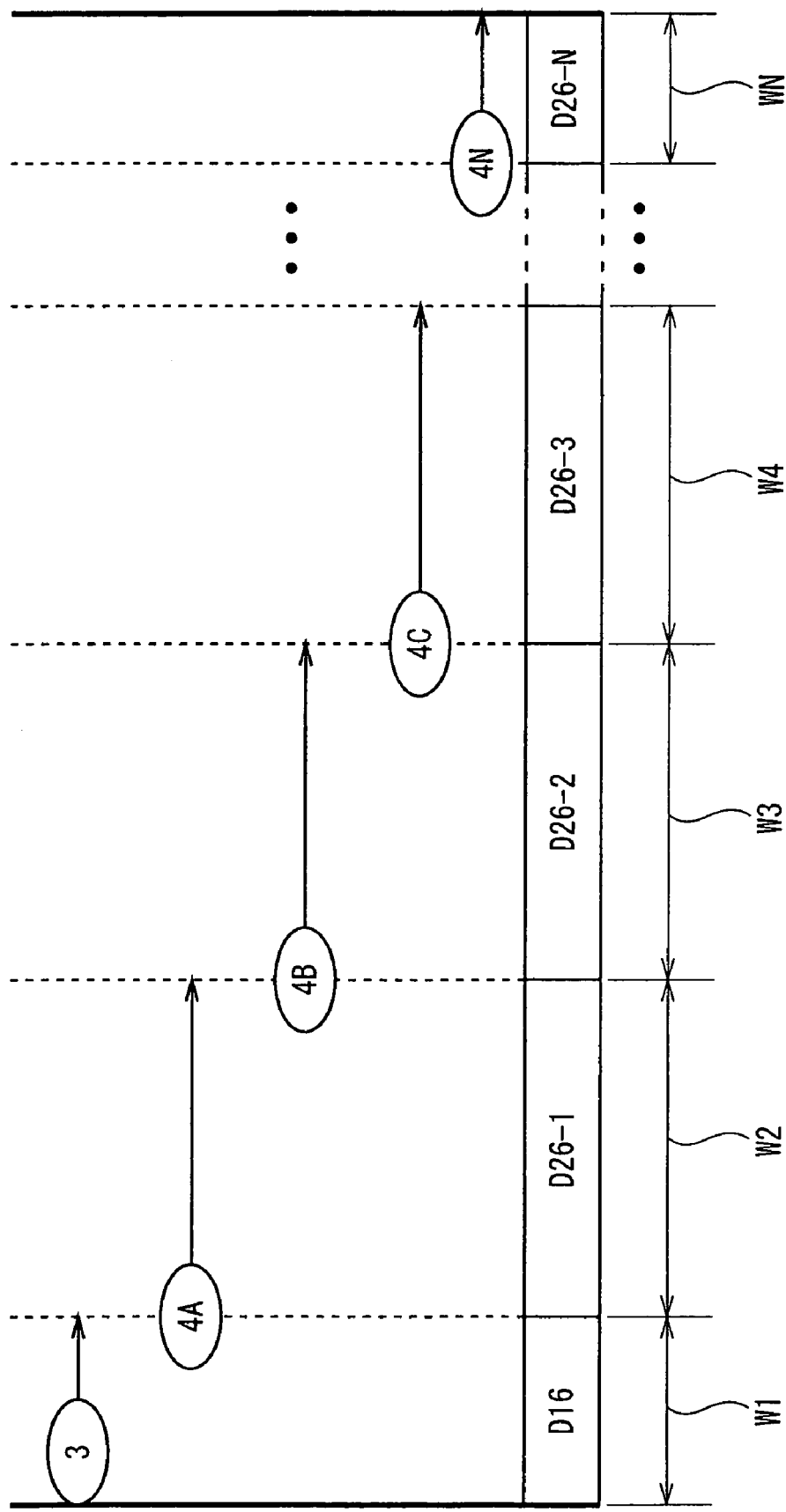
FIG. 10 is a schematic diagram served for explanation of continuous moving picture photographing for a moving subject.

In the photographing system 1, in photographing moving pictures for the subject 2, the master digital still camera 3 and the plural slave digital still cameras 4A to 4N are arranged to intersperse along the moving locus ML of the subject 2. In addition, moving picture photographing conditions for the plural digital still cameras 4A to 4N are set appropriately according to arrangement positions of the digital still cameras 4A to 4N, moving speed and the moving locus ML of the subject 2, and the like on the basis of moving image photographing conditions (i.e., moving picture photographing time set in advance) for the master digital still camera 3. Consequently, for example, as shown in FIG. 10, it is possible to divide the moving locus of the subject 2 into plural sections W1, W2, W3, W4, . . . , WN such that, first, the moving subject 2 is subjected to moving picture photographing by the master digital still camera 3, moving picture photographing for the subject 2 is started by the first slave digital still camera 4A continuously from a point when the moving picture photographing ends, moving picture photographing for the subject 2 is started by the second slave digital still camera 4B continuously from a point when the moving picture photographing by the first slave digital still camera 4A ends, and moving picture photographing for the subject 2 is started by the third slave digital still camera 4C continuously from a point when the moving picture photographing by the second slave digital still camera 4B ends. Thus, it is possible to photograph moving pictures of the subject 2 continuously so as to succeed moving picture photographing sequentially with the master digital still camera 3 and the plural slave digital still cameras 4A to 4N for each of the sections W1, W2, W3, W4, . . . , and WN.

In this way, in the photographing system 1, it is possible to photograph moving pictures of the moving subject 2 in order from the plural directions without a break with the master digital still camera 3 and the plural slave digital still cameras 4A to 4N. As a result, it is possible to take a moving state of the subject 2 as a moving photographed image that continues over a relatively long time together with a change in facial expressions and the like.

In this photographing system 1, the master digital still camera 3 collects and acquires slave moving-picture-photographed image data D26-1, D26-2, D26-3, D26-4, . . . , and D26-N from the plural slave digital still cameras 4A to 4N. In reproducing a moving-picture-photographed image, the master moving-picture-photographed image data D16 and the slave moving-image-photographed image data D26-1, D26-2, D26-3, D26-4, . . . , D26-N are reproduced in order in time series in accordance with master moving picture photographing start date and time information and slave moving picture start date and time information. Consequently, it is possible to show a state of movement of the subject 2 for a relatively long time according to elapse of time as if the moving picture is a movie obtained by photographing one scene with plural video cameras and by editing scenes in time series.

Figure 11:
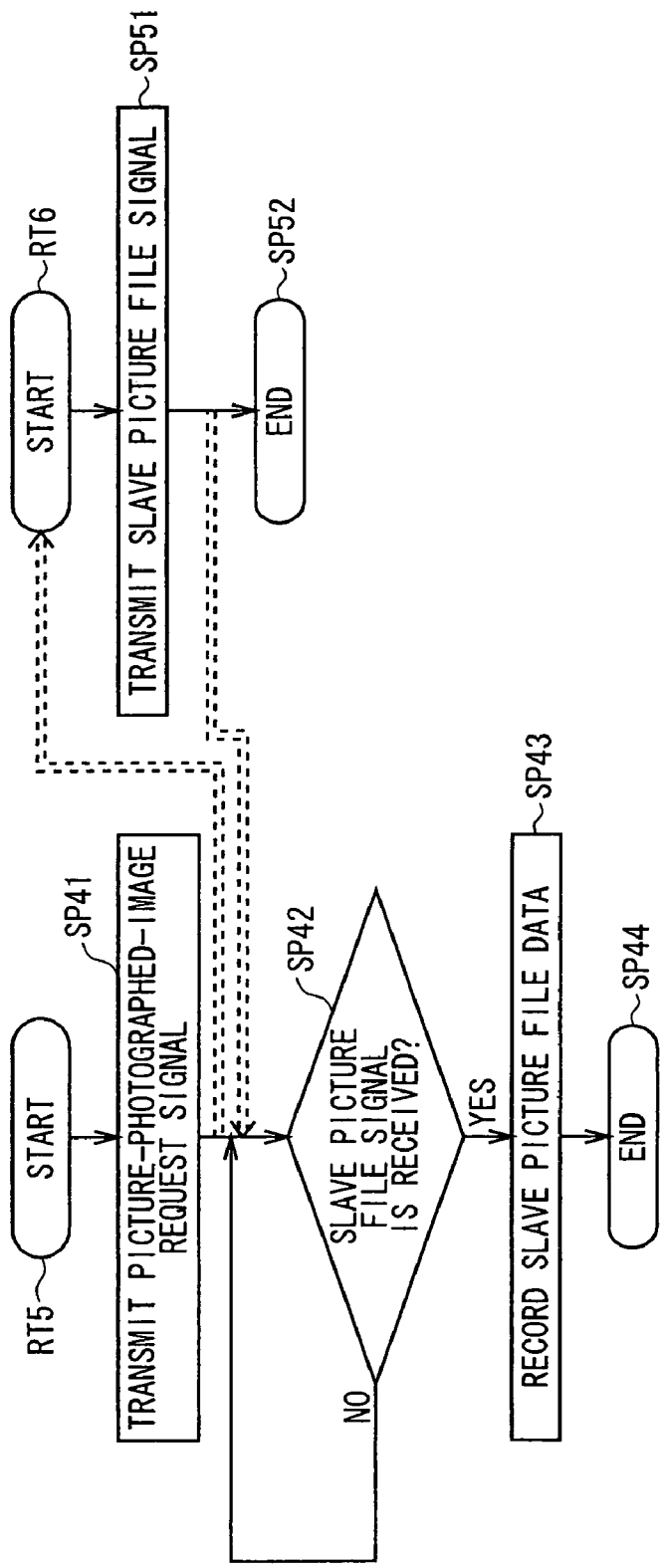
FIG. 11 is a flowchart showing a procedure for picture-photographed image acquisition processing in the photographing system according to the first embodiment.

On the other hand, a picture-photographed image acquisition processing procedure by the master digital still camera 3 and the plural slave digital still cameras 4A to 4N in the photographing system 1 is summarized as described below. As shown in FIG. 11(A), first, when an acquisition instruction for a picture-photographed image is inputted on a menu screen via the operation unit 23, the master controller 20 of the master digital still camera 3 executes picture-photographed image acquisition processing in accordance with a photographed image acquisition processing program. Consequently, the master controller 20 enters a picture-photographed image acquisition processing procedure RT5 from a start step and shifts to the following step SP41.

In step SP41, the master controller 20 transmits a picture-photographed image request signal S15 to the slave digital still cameras 4A to 4N, which are caused to photograph pictures of the subject 2 subordinately at the time of master picture photographing processing, and shifts to the following step SP42.

At this point, as shown in FIG. 11(B), the slave controller 40 of each of the slave digital still cameras 4A to 4N present in the master radio communication range executes picture-photographed image provision processing in accordance with a photographed image provision processing program in response to reception of the picture-photographed image request signal S15 transmitted from the master digital still camera 3. Consequently, the slave controller 40 enters a picture-photographed image provision processing procedure RT6 from a start step and shifts to the following step SP51.

In step SP51, the slave controller 40 specifies slave picture file data D21, which should be provided to the master digital still camera 3, among plural slave picture file data D21 in the recording medium 36 in accordance with master picture photographing date and time information and picture photographing condition information that are obtained on the basis of the picture-photographed image request signal S15. The slave controller 40 transmits the specified slave picture file data D21 to the master digital still camera 3 as a slave picture file signal S16. Then, the slave controller 40 shifts to the following step SP52 and ends the picture-photographed image provision processing procedure RT6.

At this point, in step SP42, the master controller 20 judges whether the slave picture file signal S16 transmitted from the slave digital still cameras 4A to 4N is received.

When a negative result is obtained in this step SP42, this indicates that the slave digital still cameras 4A to 4N are still specifying the slave picture file data D21 that should be provided to the master digital still camera 3. At this point, the master controller 20 waits for reception of the slave picture file signal S16 transmitted from each of the slave digital still cameras 4A to 4N.

When a positive result is obtained in this step SP42, this indicates that the master controller 20 has received the slave picture file signal S16 transmitted from each of the slave digital still cameras 4A to 4N because the slave picture file data D21, which should be provided to the master digital still camera 3, is specified by the slave digital still cameras 4A to 4N. At this point, the master controller 20 shifts to the following step SP43.

In step SP43, the master controller 20 records the received slave picture file signal S16 in the recording medium 36 as slave picture file data D21. Then, the master controller 20 shifts to the following step SP44 and ends the picture-photographed image acquisition processing procedure RT5. In this way, the entire picture-photographed image acquisition processing procedure in the photographing system 1 ends.

Figure 12:
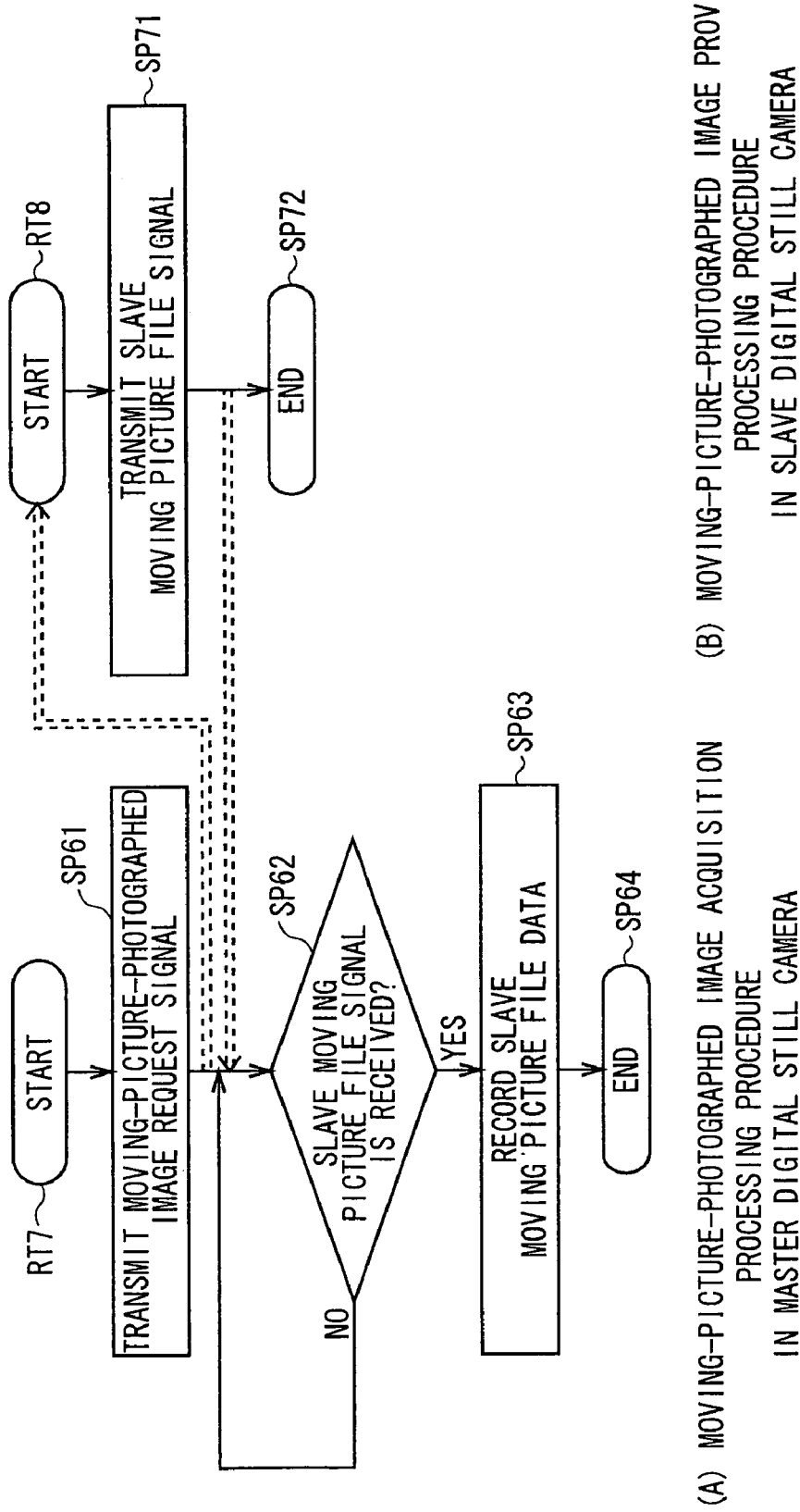
FIG. 12 is a flowchart showing a procedure for moving-picture-photographed image acquisition processing in the photographing system according to the first embodiment.

A moving-picture-photographed image acquisition processing procedure by the master digital still camera 3 and the plural slave digital still cameras 4A to 4N in the photographing system 1 is summarized as described below. As shown in FIG. 12(A), first, when an acquisition instruction for a moving-picture-photographed image is inputted on a menu screen via the operation unit 23, the master controller 20 of the master digital still camera 3 executes moving-picture-photographed image acquisition processing in accordance with a photographed image acquisition processing program. Consequently, the master controller 20 enters a moving-picture-photographed image acquisition processing procedure RT7 from a start step and shifts to the following step SP61.

In step SP61, the master controller 20 transmits a moving-picture-photographed image request signal S17 to the slave digital still cameras 4A to 4N, which are caused to photograph moving pictures of the subject 2 subordinately at the time of master moving picture photographing processing, and shifts to the following step SP62.

At this point, as shown in FIG. 12(B), the slave controller 40 of each of the slave digital still cameras 4A to 4N present in the master radio communication range executes moving-picture-photographed image provision processing in accordance with a photographed image provision processing program in response to reception of the moving-picture-photographed image request signal S17 transmitted from the master digital still camera 3. Consequently, the slave controller 40 enters a moving-picture-photographed image provision processing procedure RT8 from a start step and shifts to the following step SP71.

In step SP71, the slave controller 40 specifies slave moving picture file data D23, which should be provided to the master digital still camera 3, among plural slave moving picture file data D23 in the recording medium 36 in accordance with master moving picture photographing date and time information and moving picture photographing condition information that are obtained on the basis of the moving-picture-photographed image request signal S17. The slave controller 40 transmits the specified slave moving picture file data D23 to the master digital still camera 3 as a slave moving picture file signal S18. Then, the slave controller 40 shifts to the following step SP72 and ends the moving-picture-photographed image provision processing procedure RT8.

At this point, in step SP62, the master controller 20 judges whether the slave moving picture file signal S18 transmitted from the slave digital still cameras 4A to 4N is received.

When a negative result is obtained in this step SP62, this indicates that the slave digital still cameras 4A to 4N are still specifying the slave moving picture file data D23 that should be provided to the master digital still camera 3. At this point, the master controller 20 waits for reception of the slave moving picture file signal S18 transmitted from each of the slave digital still cameras 4A to 4N.

When a positive result is obtained in this step SP62, this indicates that the master controller 20 has received the slave moving picture file signal S18 transmitted from each of the slave digital still cameras 4A to 4N because the slave moving picture file data D23, which should be provided to the master digital still camera 3, is specified by the slave digital still cameras 4A to 4N. At this point, the master controller 20 shifts to the following step SP63.

In step SP63, the master controller 20 records the received slave moving picture file signal S18 in the recording medium 36 as slave moving picture file data D23. Then, the master controller 20 shifts to the following step SP64 and ends the moving-picture-photographed image acquisition processing procedure RT7. In this way, the entire moving-picture-photographed image acquisition processing procedure in the photographing system 1 ends.

In the photographing system 1 with the constitution described above, when picture photographing processing is performed, the master digital still camera 3 subjects the subject 2 to picture photographing at a master photographing instruction input point when a photographing instruction is inputted according to depressing operation of the shutter button 14. At the same time, the master digital still camera 3 transmits a picture photographing instruction signal S10 to each of the subordinately operable plural slave digital still cameras 4A to 4N present in the master radio communication range (steps SP1 to SP7 and steps SP11 to SP13).

Then, in the photographing system 1, in association with picture photographing for the subject 2 by the master digital still camera 3, each of the plural slave digital still cameras 4A to 4N, which has received the picture photographing instruction signal S10, subjects the subject 2 to picture photographing in a direction in which the subject 2 faces the own lens 11 substantially simultaneously with a master photographing instruction input point or at a picture photographing point after elapse of picture photographing delay time from the master photographing instruction input point in accordance with picture photographing conditions selected in advance (steps SP14 and SP15).

In the photographing system 1, when moving picture photographing processing is performed, the master digital still camera 3 starts moving picture photographing for the subject 2 and subjects the subject 2 to moving picture photographing at a master photographing instruction input point when a photographing instruction is inputted according to depressing operation of the shutter button 14. At the same time, the master digital still camera 3 transmits a moving picture photographing instruction signal S13 to each of the subordinately operable plural slave digital still cameras 4A to 4N present in the master radio communication range (steps SP21 to SP27 and steps SP31 to SP33).

Then, in the photographing system 1, in association with moving picture photographing for the subject 2 by the master digital still camera 3, each of the plural slave digital still cameras 4A to 4N, which has received the moving picture photographing instruction signal S13, starts moving picture photographing for the subject 2 in a direction in which the subject 2 faces the own lens 11 substantially simultaneously with a master photographing instruction input point and/or at a moving picture photographing point after elapse of moving picture photographing delay time based on the master photographing instruction input point in accordance with picture photographing conditions selected in advance, and subjects the subject 2 to moving picture photographing until a moving picture photographing end point after elapse of moving picture photographing time (steps SP32 to SP35).

Therefore, in this photographing system 1, it is possible to photograph, according to simple operation of depressing the shutter button 14 in one master digital still camera 3, pictures and moving pictures of the subject 2 with the master digital still camera 3 and the plural slave digital still cameras 4A to 4N.

In such a photographing system 1, the lenses 11 of the master digital still camera 3 and the plural slave digital still cameras 4A to 4N never overlap one another physically. Thus, it is possible to photograph pictures and moving pictures of the subject 2 collectively from plural directions by the master digital still camera 3 and the plural slave digital still cameras 4A to 4N with the lenses 11 inevitably directed to directions different from one another.

In this photographing system 1, when picture-photographed image acquisition processing is performed, the master digital still camera 3 transmits a picture-photographed image request signal S15 to the plural slave digital still cameras 4A to 4N present in the master radio communication range (step SP41).

In the photographing system 1, each of the plural slave digital still cameras 4A to 4N, which has received the picture-photographed image request signal S15, transmits slave picture file data D21, which is generated by subjecting the subject 2 to picture photographing subordinately in association with picture photographing for the subject 2 by the master digital still camera 3, to the master digital still camera 3 as a slave picture file signal S16. Consequently, the master digital still camera 3 receives the slave picture file signal S16 and stores the slave picture file signal S16 in the recording medium 36 as the slave picture file data D21 (steps SP42 and SP43 and step SP51).

In the photographing system 1, when moving-picture-photographed image acquisition processing is performed, the master digital still camera 3 transmits a moving-picture-photographed image request signal S17 to the plural slave digital still cameras 4A to 4N present in the master radio communication range (step SP61).

In the photographing system 1, each of the plural slave digital still cameras 4A to 4N, which has received the moving-picture-photographed image request signal S17, transmits slave moving picture file data D23, which is generated by subjecting the subject 2 to moving picture photographing subordinately in association with moving picture photographing for the subject 2 by the master digital still camera 3, to the master digital still camera 3 as a slave moving picture file signal S18. Consequently, the master digital still camera 3 receives the slave moving picture file signal S18 and records the slave moving picture file signal S18 in the recording medium 36 as the slave moving picture file data D23 (steps SP62 and SP63 and step SP71).

Usually, a digital still camera in which a recording medium is detachably inserted does not have a function of holding picture file data and moving picture file data in the inside thereof without using the recording medium. Thus, in order to acquire with another digital still camera, picture data file and moving picture data file generated by subjecting the subject 2 to picture photographing and moving picture photographing, it is necessary to borrow a recording medium itself used in the another digital still camera and insert the recording medium or re-record, in the digital still camera using an information processing apparatus such as a personal computer, the picture file data and the moving picture file data, which are generated by the another digital still camera.

However, according to the photographing system 1 described above, the master digital still camera 3 can acquire the slave picture file data D21 and the slave moving picture file data D23, which are generated by the plural slave digital still cameras 4A to 4N, and record the slave picture file data D21 and the slave moving picture file data D23 in the recording medium 36 of the master digital still camera 3 easily without requiring complicated procedures such as lending and borrowing of the recording medium 36 itself and re-recording using an information processing apparatus.

According to the constitution described above, when the subject 2 is subjected to picture photographing and moving picture photographing by the master digital still camera 3 serving as a master, at that point, the master digital still camera 3 transmits the picture photographing instruction signal S10 and the moving picture photographing instruction signal S13 to each of the plural slave digital still cameras 4A to 4N. Each of the plural slave digital still cameras 4A to 4N, which has received the picture photographing instruction signal S10 and the moving picture photographing instruction signal S13, subjects the subject 2 to picture photographing and moving picture photographing in association with picture photographing for the subject 2 by the master digital still camera 3. Consequently, according to simple operation of subjecting the subject 2 to picture photographing and moving picture photographing with one master digital still camera 3, it is possible to cause the other plural ones of the slave digital still cameras 4A to 4N to photograph pictures and moving pictures of the subject 2 in association with the operation. As a result, it is possible to realize a photographing system that can easily photograph a subject from plural directions collectively.

Such a photographing system 1 causes, in association with picture photographing and moving picture photographing for the subject 2 by the master digital still camera 3, each of the plural slave digital still cameras 4A to 4N to subject the subject 2 to picture photographing and moving picture photographing substantially simultaneously with the picture photographing and the moving picture photographing by the master digital still camera 3 or with some delay. Consequently, it is possible take facial expressions or the like of the subject 2 as a picture-photographed image and a moving-picture-photographed image easily from plural directions substantially simultaneously. In addition, it is also possible to easily take a change of facial expressions, movement, or the like of the subject 2 following elapse of time as a picture-photographed image and a moving-picture-photographed image.

In the photographing system 1, when a specific object such as a person is subjected to picture photographing and moving picture photographing by the master digital still camera 3, unless a user of the plural slave digital still cameras 4A to 4N is specifically informed of the subject 2, the user is not informed of timing for subjecting the subject 2 to picture photographing and moving picture photographing with the plural slave digital still cameras 4A to 4N in association with the picture photographing and the moving picture photographing for the subject 2 by the master digital still camera 3. As a result, each of the lenses 11 of the slave digital still cameras 4A to 4N may face a direction different from a photographing direction for the subject 2.

In the photographing system 1, if picture photographing and moving picture photographing is executed in association with the picture photographing and the moving picture photographing for the subject 2 by the master digital still camera 3 in a state in which the lenses 11 of the slave digital still cameras 4A to 4N face directions different from the photographing direction for the subject 2, a state and the like around the subject 2 are also subjected to picture photographing and moving picture photographing according to the picture photographing and the moving picture photographing for the subject 2 by the master digital still camera 3. As a result, even if users are not made aware specifically, it is possible to save the state around the subject 2 and the like together with the subject 2 consisting of a specific object as a picture-photographed image and a moving-picture-photographed image, which are precise records of events, using the master digital still camera 3 and the plural slave digital still cameras 4A to 4N.

In addition, in the photographing system 1, since the plural slave digital still cameras 4A to 4N are connected wireless to the master digital still camera 3, it is possible to wirelessly connect in any photographing location, the plural slave digital still cameras 4A to 4N to the master digital still camera 3 to establish the photographing system 1 easily. As a result, it is possible to start picture photographing and moving picture photographing for the subject 2 from plural directions promptly.

In the first embodiment described above, a picture-photographed image is displayed when picture-photographed image display processing is executed in the master digital still camera 3 and a moving-picture-photographed image is displayed when moving-picture-photographed image display processing is executed. However, the invention is not limited to this. A picture-photographed image and a moving-picture-photographed image may be mixed and displayed when either photographed image display processing is executed in the master digital still camera 3.

In the first embodiment described above, the master moving-picture-photographed image data D16 and the slave moving-picture-photographed image data D26 are extracted from the imaged moving image data D6 and D30 when the subject 2 is subjected to moving picture photographing in the master digital still camera 3 and the plural slave digital still cameras 4A to 4N. However, the invention is not limited to this. It is also possible that the master moving-picture-photographed image data D16 and the slave moving-picture-photographed image data D26 are extracted when the subject 2 is subjected to moving picture photographing in the master digital still camera 3 and the plural slave digital still cameras 4A to 4N, in synchronization with the extraction of the data, sound data is generated concurrently by collecting sounds around the subject 2, and the generated sound data is recorded as a result of the moving picture photographing together with the master moving-picture-photographed image data D16 and the slave moving-picture-photographed image data D26.

In the first embodiment described above, picture photographing conditions and moving picture photographing conditions for the plural slave digital still cameras 4A to 4N are selected and held arbitrarily in the master digital still camera 3. However, the invention is not limited to this. The plural slave digital still cameras 4A to 4N may select and hold own picture photographing conditions and moving picture photographing conditions arbitrarily or the plural slave digital still cameras 4A to 4N may hold picture photographing conditions and moving picture photographing conditions selected arbitrarily by the master digital camera 3.

In the first embodiment described above, the master digital still camera 3 transmits the picture photographing instruction signal S10 and the moving picture photographing instruction signal S13 to the plural slave digital still cameras 4A to 4N at a master photographing instruction input point. However, the invention is not limited to this. The master digital still camera 3 may transmit the picture photographing instruction signal S10 and the moving picture photographing instruction signal S13 to the plural slave digital still cameras 4A to 4N at a master photographing instruction input point or a picture photographing point and a moving picture photographing start point after elapse of picture photographing delay time and moving picture photographing delay time from the master photographing instruction input point in accordance with picture photographing conditions and moving picture photographing conditions for the plural slave digital still cameras 4A to 4N.

In the first embodiment described above, the slave picture file data D21 and the slave moving picture file data D23, which are generated by subjecting the subject 2 to picture photographing and moving picture photographing subordinately in the plural slave digital still cameras 4A to 4N, are collected and recorded in the master digital still camera 3 collectively. However, the invention is not limited to this. All or a part of the master picture file data D12, the master moving picture file data D17 and the slave picture file data D21, and the slave moving picture file data D23, which are generated by the master digital still camera 3 and the plural slave digital still cameras 4A to 4N, respectively, may be shared and recorded by the master digital still camera 3 and the plural slave digital still cameras 4A to 4N, respectively. Incidentally, in the case of such sharing, the master digital still camera 3 and the plural slave digital still cameras 4A to 4N may be caused to select arbitrarily whether the master digital still camera 3 and the plural slave digital still cameras 4A to 4N provide the other with the master picture file data D12, the master moving picture file data D17 and the slave picture file data D21, and the slave moving picture file data D23.

In the first embodiment described above, the master digital still camera 3 executes master picture photographing processing and master moving picture photographing processing and, then, executes picture-photographed image acquisition processing and moving-picture-photographed image acquisition processing to acquire the slave picture file data D21 and the slave moving picture file data D23 from the plural slave digital still camera 4A to 4N. However, the invention is not limited to this. It is possible that the picture-photographed image acquisition processing is incorporated in the master picture photographing processing and the moving-picture-photographed image acquisition processing is incorporated in the master moving picture photographing processing in the master digital still camera 3, and the master digital still camera 3 acquires the slave picture file data D21 and the slave moving picture file data D23 sequentially every time the subject 2 is subjected to picture photographing and moving picture photographing by the plural slave digital still cameras 4A to 4N while executing the master picture photographing processing and the master moving picture photographing processing.

The master digital still camera 3 and/or the plural slave digital still cameras 4A to 4N may be adapted to acquire, when startup stop instructions are inputted thereto, respectively, the master picture file data D12, the master moving picture file data D17 and/or the slave picture file data D21, and the slave moving picture file data D23 while stopping startup outwardly. Consequently, since the master controller 20 and the slave controller 40 are caused to stop other functions such as picture photographing and moving picture photographing, it is possible to acquire the master picture file data D12, the master moving picture file data D17 and/or the slave picture file data D21, and the slave moving picture file data D23 with processing loads reduced significantly.

In the first embodiment described above, a digital still camera serving as a master (i.e., the master digital still camera 3) and digital still cameras serving as slaves (i.e., the plural slave digital still cameras 4A to 4N) are set fixedly. However, the invention is not limited to this. It is also possible that any one of the master digital still camera 3 and the plural slave digital still cameras 4A to 4N are set as a master arbitrarily and the remaining digital still cameras are set as slaves to change a digital still camera to be set as a master. Consequently, when different users use the master digital still camera 3 and the plural slave digital still camera 4A to 4N, respectively, it is possible to cause any one of the users to subject the subject 2 to picture photographing and moving picture photographing as a master and cause the respective users to perform picture photographing and moving picture photographing according to the users' own preferences.

In the first embodiment described above, when the picture photographing mode and the moving picture photographing mode are selected in the master digital still camera 3, the master digital still camera 3 automatically searches for the subordinately operable slave digital still cameras 4A to 4N present in the master radio communication range and, when the subordinately operable slave digital still cameras 4A to 4N are present in the master radio communication range, executes master picture photographing processing and master moving picture photographing processing. However, the invention is not limited to this. It is also possible that the master digital still camera 3 is caused to select whether the master digital still camera 3 executes the master picture photographing processing and the master moving picture photographing processing and, when the execution is selected, the master digital still camera 3 executes the master picture photographing processing and the master moving picture photographing processing.

In the first embodiment described above, the master digital still camera 3 and the plural slave digital still cameras 4A to 4N execute the master photograph picture processing and the slave picture photographing processing separately. However, the invention is not limited to this. The master digital still camera 3 and the plural slave digital still cameras 4A to 4N may execute the master picture photographing processing and the master moving picture photographing processing as well as the slave picture photographing processing and the slave moving picture photographing processing in a mixed state. When the master picture photographing processing and the master moving picture photographing processing as well as the slave picture photographing processing and the slave moving picture photographing processing are mixed, the master digital still camera 3 and the plural slave digital still cameras 4A to 4N may be caused to select a combination of the respective kinds of processing arbitrarily. Consequently, it is possible to execute both picture photographing and moving picture photographing together. As a result, when a user wishes to photograph the subject 2, it is possible to save a state of the subject 2 as both a picture-photographed image and a moving-picture-photographed image.

In the first embodiment described above, moving picture photographing time is set in advance for the master digital still camera 3 and the slave digital still cameras 4A to 4N. However, the invention is not limited to this. The moving picture photographing time does not have to be set specifically and the master digital still camera 3 and the plural slave digital still camera 4A to 4N may execute moving picture photographing for desired moving picture photographing time in order and continuously to realize the following. For example, in the case of the moving picture photographing, after the master digital still camera 3 and the slave digital still cameras 4A to 4N perform normal communication to start moving picture photographing in the master digital still camera 3, at a point when the moving picture photographing is finished because, for example, the shutter button 14 is depressed once again, a first one of the slave digital still cameras 4A to 4N starts moving picture photographing in accordance with an order set in advance. At a point when the moving picture photographing is also finished in the slave digital still camera 4A to 4N because, for example, the shutter button 14 is depressed once gain, a second one of the slave digital still cameras 4A to 4N starts moving picture photographing. After a last one of the slave digital still cameras 4A to 4N starts moving picture photographing, all kinds of moving picture photographing are finished because the shutter button 14 is depressed twice continuously.

Consequently, it is possible to execute the moving picture photographing described above with reference to FIG. 10 freely without being restricted by prior processing for selecting moving picture photographing conditions and moving picture photographing time selected once.

(2) SECOND EMBODIMENT

Figure 13:
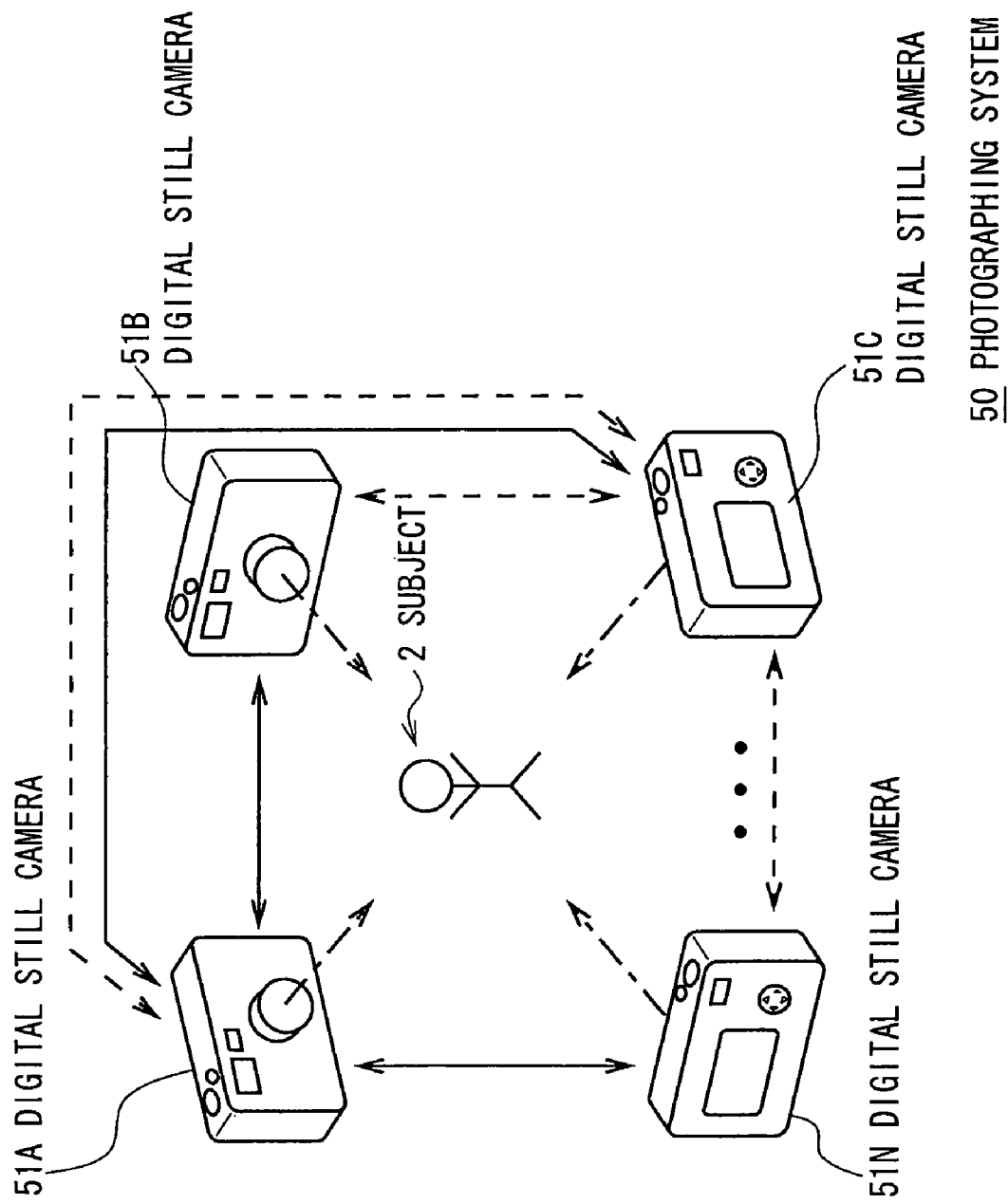
FIG. 13 is a schematic diagram showing a constitution of a photographing system according to a second embodiment.

FIG. 13 shows a photographing system 50 according to a second embodiment. The photographing system 50 is established by wirelessly connecting plural digital still cameras 51A to 51N, which can subject the subject 2 such as a person to picture photographing and moving picture photographing, one another according to Bluetooth or the like that is a near field radio communication technique.

In this case, the photographing system 50 can subject the subject 2 to picture photographing and moving picture photographing with any one of the plural digital still cameras 51A to 51N used by different users as a master for the picture photographing and the moving picture photographing for the subject 2. At the same time, the photographing system 50 can subject the subject 2 to picture photographing and moving picture photographing in association with picture photographing and moving picture photographing by the digital still camera 51A to 51N set as the master by setting the other ones of the digital still cameras 51A to 51N as slaves to the digital still camera 51A to 51N set as the master.

The plural digital still cameras 51A to 51N have the same external constitution as the master digital still camera 3 and the plural slave digital still cameras 4A to 4N according to the first embodiment that are described above with reference to, for example, FIGS. 2(A) and 2(B).

The plural digital still cameras 51A to 51N basically have substantially the same circuit constitution as the master digital still camera 3 and the slave digital still cameras 4A to 4N that are described above with reference to FIGS. 3 and 5. However, since the digital still cameras 51A to 51N can realize both a master photographing function and a slave photographing function, the digital still camera 51A to 51N have a constitution slightly different from that of the master digital still camera 3 and the slave digital still cameras 4A to 4N. Thus, the circuit constitution of the digital still cameras 51A to 51N will be explained below.

Figure 5:
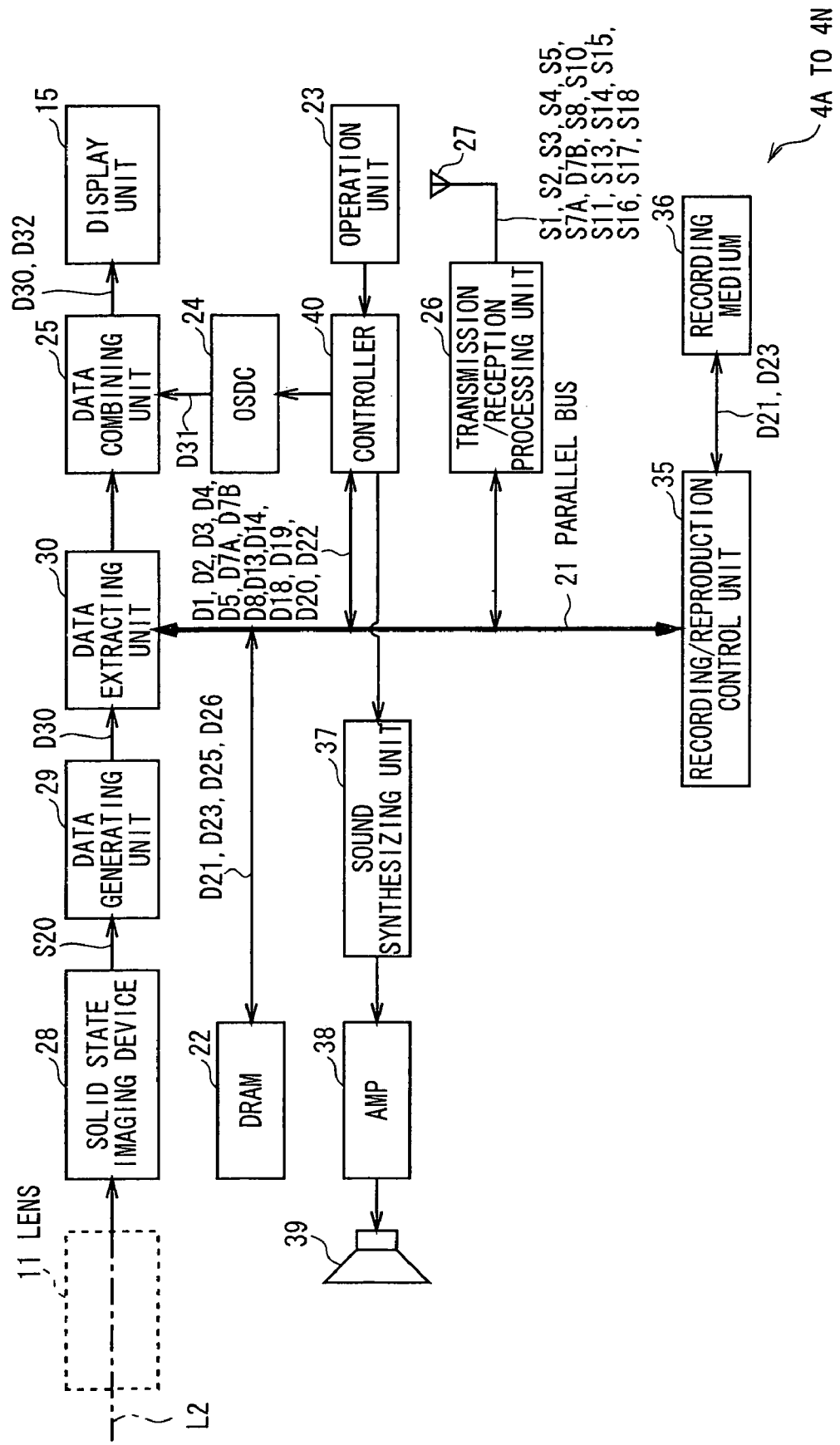
FIG. 5 is a block diagram showing a circuit constitution of a master digital still camera.
Figure 14:
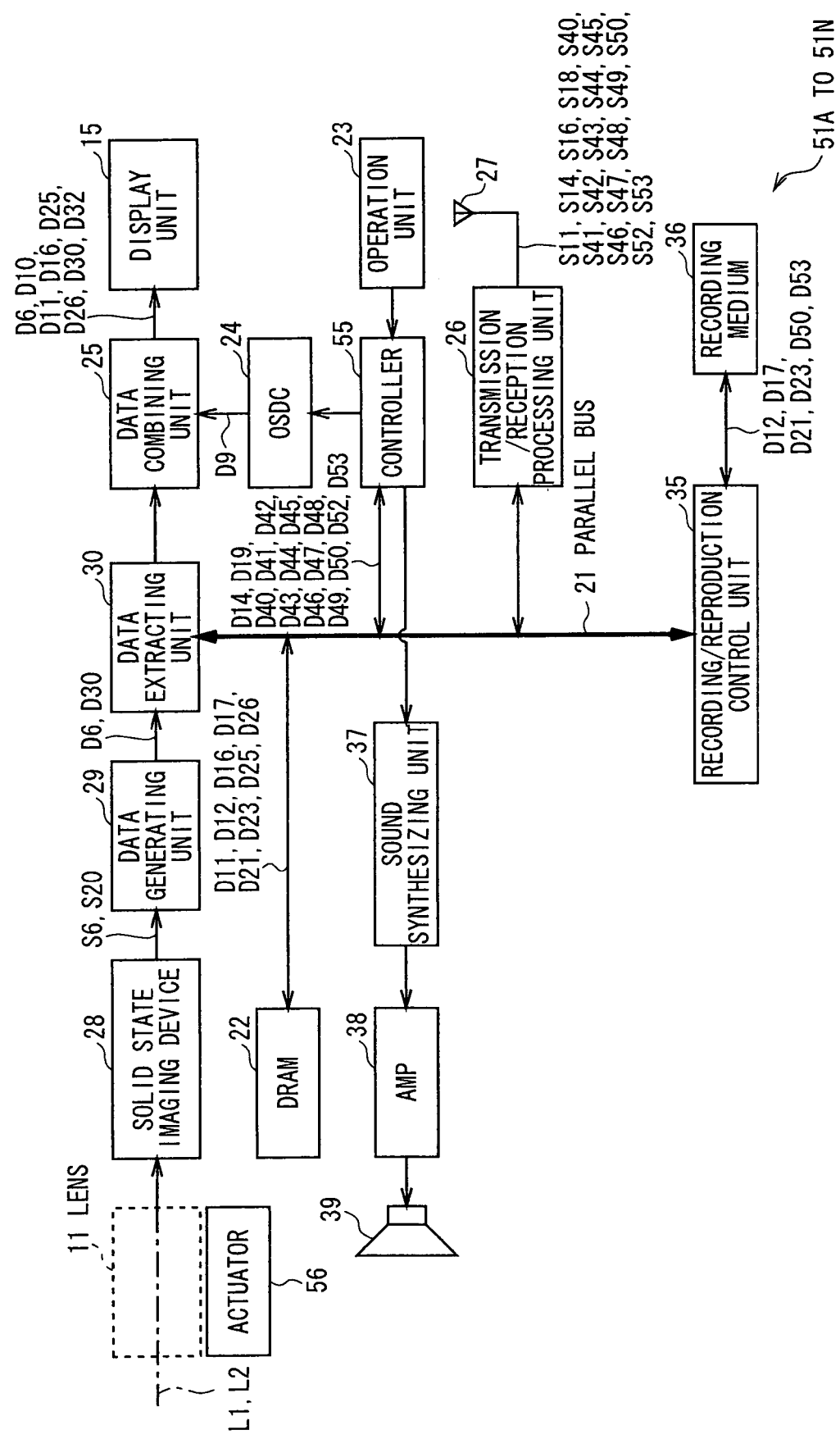
FIG. 14 is a block diagram showing a circuit constitution of a digital still camera.

In FIG. 14, components corresponding to those in FIGS. 3 and 5 are denoted by the identical reference numerals and signs. In FIG. 14, in the digital still cameras 51A to 51N, a controller 55 having a CPU, a nonvolatile memory such as an SRAM, a ROM, and the like expands various application programs stored in the internal ROM in advance such as a mutual registration processing program, a master slave setting processing program, a master photographing processing program, a slave photographing processing program, a photographed image sharing processing program, and a photographed image reproduction processing program on the DRAM 22 according to various instructions inputted via the operation unit 23 and controls respective circuit units of the digital still cameras 51A to 51N totally. Through this control, the controller 55 executes mutual registration processing among the digital still cameras 51A to 51N, master slave setting processing for setting a master and slaves among the digital still cameras 51A to 51N, master photographing processing, slave photographing processing, photographed image sharing processing for sharing master picture-photographed image data D11 and master moving-picture-photographed image data D16 as well as slave picture-photographed image data D25 and slave moving-picture-photographed image data D26 among the digital still camera 51A to 51N, photographed image reproduction processing, and the like.

The controller 55 displays a menu screen on the display unit 15 according to operation of the operation unit 23 in a state in which the other one or plural ones of the digital still cameras 51A to 51N are present in a radio communication range of own one of the digital still cameras 51A to 51N (hereinafter referred to as own radio communication range). Subsequently, when a mutual registration instruction is inputted on the menu screen according to operation of the operation unit 23, the controller 55 starts mutual registration processing.

In this case, the controller 55 generates mutual registration request data D40 for requesting the plural digital still cameras 51A to 51N to register one another. The controller 55 sends the mutual registration request data D40 to the transmission/reception processing unit 26 and subjects the mutual registration request data D40 to transmission processing. The controller 55 transmits an obtained mutual registration request signal S40 to the other of the digital still cameras 51A to 51N present in the own radio communication range from the antenna 27.

As a result, when a mutual registration approval signal S41 for approving mutual registration is sent from the other ones of the digital still cameras 51A to 51N, the controller 55 receives the mutual registration approval signal S41 with the antenna 27 and subject the mutual registration approval signal S41 to reception processing in the transmission/reception processing unit 26. Then, the controller 55 captures obtained mutual registration approval data D41.

Consequently, the controller 55 recognizes the other ones of the digital still cameras 51A to 51N, which have approved mutual registration with the own one of the digital still cameras 51A to 51N, on the basis of the mutual registration approval data D41.

The controller 55 reads out identification information for mutual registration peculiar to the own one of the digital still cameras 51A to 51N stored in advance from the internal ROM. The controller 55 sends the identification information for mutual registration to the transmission/reception processing unit 26 as registration data D42 for registering the own one of the digital still cameras 51A to 51N in the other ones of the digital still cameras 51A to 51N and subjects the registration data D42 to transmission processing. The controller transmits an obtained registration signal S42 to the other ones of the digital still cameras 51A to 51N from the antenna 27 again.

As a result, identification information for mutual registration peculiar to the other ones of the digital still cameras 51A to 51N is transmitted to the controller 55 from the other ones of the digital still cameras 51A to 51N as a registration signal S43 for mutual registration for the own one of the digital still cameras 51A to 51N. Then, the controller 55 receives the registration signal S43 with the antenna 27 and subjects the registration signal S43 to reception processing in the transmission/reception processing unit 26. The controller 55 captures obtained registration data D43.

Consequently, the controller 55 stores identification information for mutual registration of the others obtained on the basis of the registration data D43 in the internal nonvolatile memory. In this way, the controller 55 registers the own one of the digital still cameras 51A to 51N and the other ones of the digital still cameras 51A to 51N mutually and ends the mutual registration processing.

Incidentally, as a result of transmitting the mutual registration request signal S40 to the other ones of the digital still cameras 51A to 51N, if a mutual registration rejection signal S44 for rejecting mutual registration is transmitted from the other ones of the digital still cameras 51A to 51N, the controller 55 receives the mutual registration rejection signal S44 with the antenna 27 and subjects the mutual registration rejection signal S44 to reception processing in the transmission/reception processing unit 26. The controller 55 captures obtained mutual registration rejection data D44.

Consequently, the controller 55 recognizes the other ones of the digital still cameras 51A to 51N, which have rejected mutual registration with the own one of the digital still cameras 51A to 51N, on the basis of the mutual registration rejection data D44 and ends the mutual registration processing.

When the mutual registration request signal S40 is transmitted from the other ones of the digital still cameras 51A to 51N, the controller 55 receives the mutual registration request signal S40 with the antenna 27 and subjects the mutual registration request signal S40 to reception processing in the transmission/reception processing unit 26. The controller 55 captures obtained mutual registration request data D40 to thereby start mutual registration processing.

In this case, the controller 55 sends mutual registration inquiry screen data stored in advance in the internal ROM to the display unit 15 via the OSDC 24 and the data combining unit 25 sequentially. Consequently, the controller 55 displays a mutual registration inquiry screen, which has icons for selecting an approval instruction and a rejection instruction for mutual registration of the digital still cameras 51A to 51N, on the display unit 15 on the basis of the mutual registration inquiry screen data.

In this state, when an approval instruction is inputted on the mutual registration inquiry screen via the operation unit 23, the controller 55 generates mutual registration approval data D41 according to the approval instruction. The controller 55 sends the mutual registration approval data D41 to the transmission/reception processing unit 26 and subjects the mutual registration approval data D41 to transmission processing. Then, the controller 55 transmits obtained mutual registration approval signal S41 to the other ones of the digital still cameras 51A to 51N from the antenna 27.

As a result, the controller 55 receives a registration signal S42 transmitted from the other ones of the digital still cameras 51A to 51N with the antenna 27. Then, the controller 55 subjects the registration signal S42 to reception processing in the transmission/reception processing unit 26 and captures obtained registration data D42. Consequently, the controller 55 stores identification information for mutual registration obtained on the basis of the registration data D42 in the internal nonvolatile memory.

The controller 55 reads out identification information for mutual registration peculiar to the own one of the digital still cameras 51A to 51N stored in advance from the internal ROM. The controller 55 sends the identification information for mutual registration to the transmission/reception processing unit 26 as registration data D43 and subjects the registration data D43 to transmission processing. The controller 55 transmits an obtained registration signal S43 to the other ones of the digital still cameras 51A to 51N again from the antenna 27 and ends the mutual registration processing.

Consequently, the controller 55 registers the own one of the digital still cameras 51A to 51N and the other ones of the digital still cameras 51A to 51N mutually.

Incidentally, when a rejection instruction is inputted on the mutual registration inquiry screen via the operation unit 23, the controller 55 generates mutual registration rejection data D44 according to the rejection instruction, sends the mutual registration rejection data D44 to the transmission/reception processing unit 26, and subjects the mutual registration rejection data D44 to transmission processing. The controller 55 transmits an obtained mutual registration rejection signal S44 to the other ones of the digital still camera 51A to 51N from the antenna 27 and ends the mutual registration processing.

In this way, the controller 55 registers the own one of the digital still cameras 51A to 51N and the other ones of the digital still cameras 51A to 51N. Thereafter, when master photographing processing and slave photographing processing, photographed image sharing processing, and the like are executed, the controller 55 attaches the identification information for mutual registration of the others to various signals and transmits the signals. Consequently, the controller 55 causes the others of the digital still cameras 51A to 51N to identify various signals transmitted thereto and receive the signals surely. In addition, the controller 55 causes the other ones of the digital still camera 51A to 51N to attach identification information for mutual registration for the own one of the digital still cameras 51A to 51N to various signals transmitted from the other ones of the digital still cameras 51A to 51N. Consequently, the controller 55 identifies the various signals and receives the signals surely.

After the mutual registration processing ends, a photographing condition setting instruction for selecting picture photographing conditions and moving picture photographing conditions for the own one of the digital still cameras 51A to 51N is inputted on the menu screen via the operation unit 23. Then, the controller 55 executes photographing condition setting processing according to the photographing condition setting instruction and reads out photographing condition setting screen data stored in advance from the internal ROM.

The controller 55 sends the photographing condition setting screen data to the display unit 15 via the OSDC 24 and the data combining unit 25 sequentially. Consequently, the controller 55 displays a photographing condition setting screen based on the photographing condition setting screen data on the display unit 15 instead of the menu screen.

In this case, the controller 55 causes a user to select picture photographing conditions and moving picture photographing conditions on the photographing condition setting screen in the same manner as at the time of selection of picture photographing conditions and moving picture photographing conditions by the master digital still camera 3 described above with reference to FIG. 3. When picture photographing conditions and moving picture photographing conditions for the own one of the digital still cameras 51A to 51N are selected, the controller 55 stores the picture photographing conditions and the moving picture photographing conditions in the internal nonvolatile memory as picture photographing condition information and moving picture photographing condition.

Consequently, when the controller 55 causes the own one of the digital still cameras 51A to 51N to operate subordinately in association with picture photographing and moving picture photographing for the subject 2 by the other one of the digital still camera 51A to 51N set as a master, the controller 55 subjects the subject 2 to picture photographing and moving picture photographing in accordance with the picture photographing condition information and the moving picture condition information in the nonvolatile memory.

Incidentally, an actuator 56 for imaging a subject image on a light-receiving surface of the solid state imaging device 28 to adjust focus by moving the lens 11 in an optical axis direction thereof is provided in each of the digital still camera 51A to 51N.

In this case, when the shutter button 14 is depressed to the utmost (i.e., pressed fully) in a state in which the picture photographing mode and the moving picture photographing mode are selected (i.e., a state in which the subject 2 is imaged), the controller 55 subjects the subject 2 to picture photographing and moving picture photographing in accordance with a photographing instruction inputted from the operation unit 23 in response to the depression of the shutter button 14. However, when the shutter button 14 is depressed by a distance shorter than that at the time of full pressing of the shutter button 14 (i.e., when the shutter button 14 is pressed halfway), the controller 55 drives the actuator 56 to move the lens 11 in an optical axis direction thereof in accordance with a focus adjustment instruction inputted from the operation unit 23 in response to the depression of the shutter button 14 to thereby automatically adjust focus on the subject 2.

When the shutter button 14 is pressed halfway prior to picture photographing and moving picture photographing to adjust focus on the subject 2 in a state in which the picture photographing mode and the moving picture photographing mode are selected, the controller 55 can judge that the user has an intention of subjecting the subject 2 to picture photographing and moving picture photographing according to the user's own preference. Consequently, making use of this judgment, when the shutter button 14 is pressed halfway in the picture photographing mode and the moving picture photographing mode, the controller 55 takes in, together with a focus adjustment instruction, a master setting request for requesting that the own one of the digital still cameras 51A to 51N should be set as a master for picture photographing and moving picture photographing for the subject 2 from the operation unit 23.

Therefore, when the picture photographing mode and the moving picture photographing mode are selected, the controller 55 sets one of the digital still cameras 51A to 51N, in which the shutter button 14 is pressed halfway at an earliest point and a master setting request is inputted, among the plural digital still cameras 51A to 51N as a master for picture photographing and moving picture photographing for the subject 2 while wirelessly communicating with the other ones of the digital still cameras 51A to 51N. Accordingly, the controller 55 sets the remaining ones of the plural digital still cameras 51A to 51N as slaves to the one of the digital still cameras 51A to 51N. In this way, the controller 55 establishes a relation of a master and slaves in the plural digital still cameras 51A to 51N.

When the picture photographing mode and the moving picture photographing mode are selected, the controller 55 executes master slave setting processing. When a master setting request is inputted from the operation unit 23 as the shutter button 14 is pressed halfway in the own one of the digital still cameras 51A to 51N before it is declared by the other one of the digital still cameras 51A to 51N that the one is set as a master, the controller 55 sets the own one of the digital still cameras 51A to 51N as a master for picture photographing and moving picture photographing for the subject 2 at a master setting request input point when the master setting request is inputted. In addition, the controller 55 generates master setting declaration data D45 for declaring the setting to the other ones of the digital still cameras 51A to 51N.

Then, the controller 55 sends the master setting declaration data D45 to the transmission/reception processing unit 26 and subjects the master setting declaration data D45 to transmission processing. The controller 55 transmits an obtained master setting declaration signal S45 from the antenna 27.

As a result, a subordinate operability notification signal S46 for notifying the own one of the digital still cameras 51A to 51N of subordinate operability is returned from the other ones of the digital still cameras 51A to 51N present in the own radio communication range after the other ones of the digital still cameras 51A to 51N admit that the own one of the digital still cameras 51A to 51N is set as a master. Then, the controller 55 receives the subordinate operability notification signal S46 with the antenna 27 and subjects the subordinate operability notification signal S46 to reception processing in the transmission/reception processing unit 26. The controller 55 captures obtained subordinate operability notification data D46.

Consequently, the controller 55 recognizes the others of the digital still cameras 51A to 51N, which are set as slaves to the own one of the digital still cameras 51A to 51N, on the basis of the subordinate operability notification data D46.

At this point, the controller 55 generates slave camera notification screen data D9 in the same manner as the master digital still camera 3 (FIG. 3) according to the first embodiment described above on the basis of the subordinate operability notification data D46 and sends the slave camera notification screen data D9 to the display unit 15. Consequently, the controller 55 displays the combined screen 32 for slave camera notification described above with reference to FIG. 4 on the display unit 15 to notify the user that the own one of the digital still cameras 51A to 51N is set as a master. At the same time, the controller 55 notifies the user, of the other ones of the digital still cameras 51A to 51N, which are set as slaves according to the setting of a master, among the plural digital still cameras 51A to 51N registered mutually.

Incidentally, while executing the master picture photographing processing and the master moving picture photographing processing in a state in which the own one of the digital still cameras 51A to 51N is set as a master, the controller 55 transmits the master setting declaration signal S45 periodically to thereby always grasp the other ones of the digital still cameras 51A to 51N (including the digital still cameras 51A to 51N set as slaves that enter the own radio communication range later than a point when the own one of the digital still cameras 51A to 51N is set as a master) subordinately operable in the own radio communication range and notifies the user, of the grasped subordinately operable other ones of the digital still cameras 51A to 51N.

Before a master setting request is inputted from the operation unit 23 according to half-pressing operation of the shutter button 14 in the own one of the digital still cameras 51A to 51N, if the controller 55 receives the master setting declaration signal S45 transmitted form the other ones of the digital still cameras 51A to 51N with the antenna 27, the controller 55 subjects the master setting declaration signal S45 to reception processing in the transmission/reception processing unit 26 and captures obtained master setting declaration data D45.

At this point, the controller 55 recognizes the other one of the digital still cameras 51A to 51N set as a master in accordance with the master setting declaration data D45. At the same time, the controller 55 sets the own one of the digital still cameras 51A to 51N as slaves to the other one of the digital still cameras 51A to 51N set as a master.

Then, the controller 55 generates subordinate operability notification data D46 that is transmitted to the other one of the digital still cameras 51A to 51N set as a master. The controller 55 sends the subordinate operability notification data D46 to the transmission/reception processing unit 26 and subjects the subordinate operability notification data D46 to transmission processing. The controller 55 transmits an obtained subordinate operability notification signal S46 to the other one of the digital still camera 51A to 51N set as a master from the antenna 27.

At this point, the controller 55 generates slave photographing notification screen data D31 and sends the slave photographing notification screen data D31 to the display unit 15 on the basis of the master setting declaration data D45 in the same manner as the slave digital still cameras 4A to 4N (FIG. 5) according to the first embodiment described above. Consequently, the controller 55 displays the combined screen for slave photographing notification 41 described above with reference to FIG. 6 on the display unit 15 to notify the user that the own one of the digital still cameras 51A to 51N are set as a slave to the other one of the digital still cameras 51A to 51N set as a master.

In this way, in a state in which the plural digital still cameras 51A to 51N are gathered for picture photographing and moving picture photographing and a relation of a master and slaves is not established, when a master setting request is inputted (i.e., the shutter button 14 is pressed halfway) in the own one of the digital still cameras 51A to 51N at a point earlier than the other one of the digital still cameras 51A to 51N is set as a master (i.e., the shutter button 14 is pressed halfway), the controller 55 sets the own one of the digital still cameras 51A to 51N as a master for picture photographing and moving picture photographing for the subject 2 and subjects the subject 2 to picture photographing and moving picture photographing.

When a master setting request is inputted in the other one of the digital still cameras 51A to 51N at a point earlier than a master setting request is inputted in the own one of the digital still cameras 51A to 51N, the controller 55 sets the own one of the digital still cameras 51A to 51N as a slave to the other one of the digital still cameras 51A to 51N set as a master according to the input of the master setting request. The controller 55 subjects the subject 2 to picture photographing and moving picture photographing subordinately.

Incidentally, in such a photographing system 50, one of the digital still cameras 51A to 51N, in which a master setting request is inputted at an earliest point, among the plural digital still cameras 51A to 51N registered mutually is set as a master. However, when master setting requests are inputted in at least two of the digital still cameras 51A to 51N simultaneously, one of the at least two digital still cameras 51A to 51N, in which the master setting requests are inputted simultaneously, is set as a master preferentially in accordance with a priority for master setting set in advance for the plural digital still cameras 51A to 51N.

Consequently, in the photographing system 50, even when master setting requests are inputted in at least two of the digital still cameras 51A to 51N simultaneously, only one of the digital still cameras 51A to 51N is set as a master surely to prevent a relation of a master and slaves from being broken.

Actually, after the picture photographing mode is selected via the operation unit 23, when a master setting request is subsequently inputted from the operation unit 23 according to half-pressing operation of the shutter button 14, the controller 55 sets the own one of the digital still cameras 51A to 51N as a master for picture photographing for the subject 2. At the same time, when the other ones of the digital still cameras 51A to 51N are set as slaves according to the setting of a master, the controller 55 waits for the shutter button 14 to be pressed fully to input a photographing instruction while imaging the subject 2.

In this state, when a photographing instruction is inputted from the operation unit 23 according to full-pressing operation of the shutter button 14, the controller 55 extracts master picture-photographed image data D11 from imaged moving image data D6 in the same manner as the master digital still camera 3 according to the first embodiment described above. At the same time, the controller 55 generates master picture file data D12 on the basis of the extracted master picture-photographed image data D11 and records the master picture file data D12 in the recording medium 36.

In addition, the controller 55 generates picture photographing instruction data D47 storing master picture photographing date and time information for causing the subordinately operable other ones of the digital still cameras 51A to 51N present in the own radio communication range at this point to perform picture photographing. The controller 55 sends this picture photographing instruction data D47 to the transmission/reception processing unit 26 and subjects the picture photographing instruction data D47 to transmission processing. Then, the controller 55 transmits an obtained picture photographing instruction signal S47 to the other ones of the digital still cameras 51A to 51N present in the own radio communication range from the antenna 27.

Consequently, the controller 55 causes the other ones of the subordinately operable digital still cameras 51A to 51N present in the own radio communication range to subject the subject 2 to picture photographing in accordance with picture photographing conditions held by the digital still cameras 51A to 51N, respectively, substantially simultaneously with a master photographing instruction input point or at a picture photographing point after elapse of picture photographing delay time from the master photographing instruction input point.

In this way, after causing the other ones of the digital still cameras 51A to 51N set as slaves to subject the subject 2 to picture photographing subordinately, when end of the master picture photographing processing is instructed via the operation unit 23, the controller 55 generates slave picture photographing end data D14. The controller 55 sends this slave picture photographing end data D14 to the transmission/reception processing unit 26 and subjects the slave picture photographing end data D14 to transmission processing. The controller 55 transmits an obtained slave picture photographing end signal S11 to the other ones of the digital still cameras 51A to 51N from the antenna 27 and, then, ends the master picture photographing processing.

On the other hand, after the picture photographing mode is selected via the operation unit 23, when the other one of the digital still cameras 51A to 51N is set as a master earlier, according to the setting of a master, the controller 55 sets the own one of the digital still cameras 51A to 51N as a slave to the other one of the digital still cameras 51A to 51N set as a master. Then, the controller 55 starts slave picture photographing processing and waits for reception of a picture photographing instruction signal S47 transmitted from the other one of the digital still cameras 51A to 51N set as a master while imaging the subject 2.

In this state, the controller 55 receives the picture photographing instruction signal S47, which is transmitted from the other one of the digital still cameras 51A to 51N set as a master, with the antenna 27. Then, the controller 55 subjects the picture photographing instruction signal S47 to reception processing in the transmission/reception processing unit 26. The controller 55 captures obtained picture photographing instruction data D47.

At this point, the controller 55 extracts slave picture-photographed image data D25 from the imaged moving image data D30 on the basis of master picture photographing date and time information stored in the picture photographing instruction data D47 and own picture photographing condition information read out from the internal nonvolatile memory in the same manner as the slave digital still cameras 4A to 4N according to the first embodiment described above. The controller 55 generates slave picture file data D21 on the basis of the extracted slave picture-photographed image data D25 and records the slave picture file data D21 in the recording medium 36.

In this way, the controller 55 subjects the subject 2 to picture photographing substantially simultaneously with a master photographing instruction input point or at a picture photographing point after elapse of picture photographing delay time from the master photographing instruction input point in association with picture photographing for the subject 2 by the other ones of the digital still cameras 51A to 51N set as a master.

Thereafter, the controller 55 receives a slave picture photographing end signal S11, which is transmitted from the other one of the digital still cameras 51A to 51N set as a master, with the antenna 27. Then, the controller 55 subjects the slave picture photographing end signal S11 to reception processing in the transmission/reception processing unit 26 and captures obtained slave picture photographing end data D14. Consequently, the controller 55 ends the slave picture photographing processing in accordance with the slave picture photographing end data D14.

After the moving picture photographing mode is selected via the operation unit 23, when a master setting request is subsequently inputted from the operation unit 23 according to half-pressing operation of the shutter button 14, the controller 55 sets the own one of the digital still cameras 51A to 51N as a master for moving picture photographing for the subject 2. At the same time, when the other ones of the digital still cameras 51A to 51N are set as slaves according to the setting of a master, the controller 55 starts master moving picture photographing processing and waits for the shutter button 14 to be pressed fully to input a photographing instruction while imaging the subject 2.

In this state, when a photographing instruction is inputted from the operation unit 23 according to full-pressing operation of the shutter button 14, the controller 55 extracts master moving-picture-photographed mage data D16 from imaged moving image data D6 in the same manner as the master digital still camera 3 according to the first embodiment described above. At the same time, the controller 55 generates master moving picture file data D17 on the basis of the extracted master moving-picture-photographed image data D16 and records the master moving picture file data D17 in the recording medium 36.

In addition, the controller 55 generates moving picture photographing instruction data D48 storing master moving picture photographing date and time information for causing the subordinately operable other ones of the digital still cameras 51A to 51N present in the own radio communication range at this point to perform moving picture photographing. The controller 55 sends this moving picture photographing instruction data D48 to the transmission/reception processing unit 26 and subjects the moving picture photographing instruction data D48 to transmission processing. Then, the controller 55 transmits an obtained moving picture photographing instruction signal S48 to the other ones of the digital still cameras 51A to 51N p from the antenna 27.

Consequently, the controller 55 causes the other ones of the subordinately operable digital still cameras 51A to 51N present in the own radio communication range to start moving picture photographing for the subject 2 to subject the subject 2 to moving picture photographing over moving picture photographing time in accordance with moving picture photographing conditions held by the digital still cameras 51A to 51N, respectively, substantially simultaneously with a master photographing instruction input point or at a moving picture photographing point after elapse of moving picture photographing delay time from the master photographing instruction input point.

In this way, after causing the other ones of the digital still cameras 51A to 51N set as slaves to subject the subject 2 to moving picture photographing subordinately, when end of the master moving picture photographing processing is instructed via the operation unit 23, the controller 55 generates slave moving picture photographing end data D19. The controller 55 sends this slave moving picture photographing end data D19 to the transmission/reception processing unit 26 and subjects the slave moving picture photographing end data D19 to transmission processing. The controller 55 transmits an obtained slave moving picture photographing end signal S14 to the other ones of the digital still cameras 51A to 51N from the antenna 27 and, then, ends the master moving picture photographing processing.

On the other hand, after the moving picture photographing mode is selected via the operation unit 23, when the other one of the digital still cameras 51A to 51N is set as a master earlier, according to the setting of a master, the controller 55 sets the own one of the digital still cameras 51A to 51N as a slave to the other one of the digital still cameras 51A to 51N set as a master. Then, the controller 55 starts slave moving picture photographing processing and waits for reception of a moving picture photographing instruction signal S48 transmitted from the other one of the digital still cameras 51A to 51N set as a master while imaging the subject 2.

In this state, the controller 55 receives the moving picture photographing instruction signal S48, which is transmitted from the other one of the digital still cameras 51A to 51N set as a master, with the antenna 27. Then, the controller 55 subjects the moving picture photographing instruction signal S48 to reception processing in the transmission/reception processing unit 26. The controller 55 captures obtained moving picture photographing instruction data D48.

At this point, the controller 55 extracts slave moving-picture-photographed image data D26 from the imaged moving image data D30 on the basis of master moving picture photographing date and time information stored in the moving picture photographing instruction data D48 and own moving picture photographing condition information read out from the internal nonvolatile memory in the same manner as the slave digital still cameras 4A to 4N according to the first embodiment described above. The controller 55 generates slave moving picture file data D23 on the basis of the extracted slave moving-picture-photographed image data D26 and records the slave moving picture file data D23 in the recording medium 36.

In this way, the controller 55 starts moving image photographing for the subject 2 and subjects the subject 2 to moving picture photographing over moving picture photographing time substantially simultaneously with a master photographing instruction input point or at a moving picture photographing point after elapse of picture photographing delay time from the master photographing instruction input point in association with moving picture photographing for the subject 2 by the other ones of the digital still cameras 51A to 51N set as a master.

Thereafter, the controller 55 receives a slave moving picture photographing end signal S14, which is transmitted from the other one of the digital still cameras 51A to 51N set as a master, with the antenna 27. Then, the controller 55 subjects the slave moving picture photographing end signal S14 to reception processing in the transmission/reception processing unit 26 and captures obtained slave moving picture photographing end data D19. Consequently, the controller 55 ends the slave moving picture photographing processing in accordance with the slave moving picture photographing end data D19.

Incidentally, in the photographing system 50, the digital still cameras 51A to 51N are set as a master and slaves, respectively, in a state in which the plural digital still cameras 51A to 51N are gathered for picture photographing and moving picture photographing. However, when the digital still cameras 51A to 51N are gathered in one place for picture photographing and moving picture photographing, it is highly likely that the digital still cameras 51A to 51N are gathered for the purpose of photographing the same subject 2 as in a wedding ceremony, a photography contest, or the like. In addition, it is highly likely that users desire to share master picture-photographed image data D11, slave picture-photographed image data D25, master moving-picture-photographed image data D16, and slave moving-picture-photographed image data D26 that are generated by subjecting the subject 2 to picture photographing and moving picture photographing with the digital still cameras 51A to 51N. The plural digital still cameras 51A to 51N can share the master picture-photographed image data D11, the slave picture-photographed image data D25, the master moving-picture-photographed image data D16, and the slave moving-picture-photographed image data D26.

After the end of the master picture photographing processing, when a sharing instruction for a picture-photographed image is inputted on a menu screen via the operation unit 23 in a state in which the menu screen is displayed on the display screen 15, in other words, when the reproduction mode is selected via operation of the operation unit 23, the controller

55 starts photographed image sharing processing (hereinafter referred to as master picture-photographed image sharing processing).

In this case, the controller 55 generates picture-photographed image request data D49 storing master picture-photographed date and time information at the time when the subject 2 is subjected to picture photographing independently at master picture photographing processing time. The controller 55 sends this picture-photographed image request data D49 to the transmission/reception processing unit 26 and subjects the picture-photographed image request data D49 to transmission processing. The controller 55 transmits an obtained picture-photographed image request signal S49 to the other ones of the digital still cameras 51A to 51N present in the own radio communication range from the antenna 27.

As a result, a picture file signal S16 equivalent to s slave picture file data D21, which is specified in accordance with master picture photographing date and time information, is transmitted from the other ones of the digital still cameras 51A to 51N. Then, the controller 55 receives this picture file signal S16 with the antenna 27 and subjects the picture file signal S16 to reception processing in the transmission/reception processing unit 26. The controller 55 records obtained slave picture file data D21 in the recording medium 36.

When the controller 55 records the slave picture file data D21 in the recording medium 36 in this way, the controller 55 reproduces master picture file data D12 from the recording medium 36 together with the slave picture file data D21 via the recording/reproduction control unit 35. The controller 55 transfers this master picture file data D12 to the DRAM 22.

Then, the controller 55 selectively consolidates the master picture file data D12 and the remaining slave picture file data D21 excluding only the slave picture file data D21 generated by the other ones of the digital still cameras 51A to 51N serving as transmission partners among the slave picture file data D21 to generate a picture file data group for sharing D50. The controller 55 sends this picture file data group for sharing D50 to the transmission/reception processing unit 26 from the DRAM 22.

Consequently, the controller 55 subjects the picture file data group for sharing D50 to transmission processing in the transmission/reception processing unit 26. The controller 55 transmits an obtained picture file signal group for sharing S50 to the other plural ones of the digital still cameras 51A to 51N from the antenna 27 and ends the master picture-photographed image sharing processing.

On the other hand, after the end of the slave picture photographing processing, when the controller 55 receives a picture-photographed image request signal S49, which is transmitted from the other one of the digital still cameras 51A to 51N set as a master, with the antenna 27, the controller 55 subjects the picture-photographed image request signal S49 to the reception processing in the transmission/reception processing unit 26 and captures obtained picture-photographed image request data D49. Consequently, the controller 55 starts photographed image sharing processing (hereinafter referred to as slave picture-photographed image sharing processing) according to the picture-photographed image request data D49.

In this case, the controller 55 extracts master picture photographing date and time information stored in the picture-photographed image request data D49. The controller 55 searches for slave picture photographing date and time information stored in slave picture file data D21 in the recording medium 36 using the recording/reproduction control unit 35 in accordance with the extracted master picture photographing date and time information and picture photographing condition information for the own one of the digital still cameras 51A to 51N. Consequently, the controller 55 specifies the slave picture file data D21 generated by subjecting the subject 2 to picture photographing subordinately in association with picture photographing of the other one of the digital still cameras 51A to 51N set as a master.

The controller 55 reads out the specified slave picture file data D21 from the recording medium 36 with the recording/reproduction control unit 35. The controller 55 sends this slave picture file data D21 to the transmission/reception processing unit 26 and subjects the slave picture file data D21 to transmission processing. The controller 55 transmits an obtained slave picture file signal S16 to the other one of the digital still cameras 51A to 51N set as a master from the antenna 27.

After transmitting the slave picture file signal S16 to the other one of the digital still cameras 51A to 51N set as a master, the controller 55 receives a picture file signal group for sharing S50, which is subsequently transmitted from the other one of the digital still cameras 51A to 51N set as a master, with the antenna 27. Then, the controller 55 subjects the picture file signal group for sharing S50 to reception processing in the transmission/reception processing unit 26. The controller 55 records an obtained picture file data group for sharing D50 in the recording medium 36 using the recording/reproduction control unit 35 and ends the slave picture-photographed image sharing processing.

Figure 15:
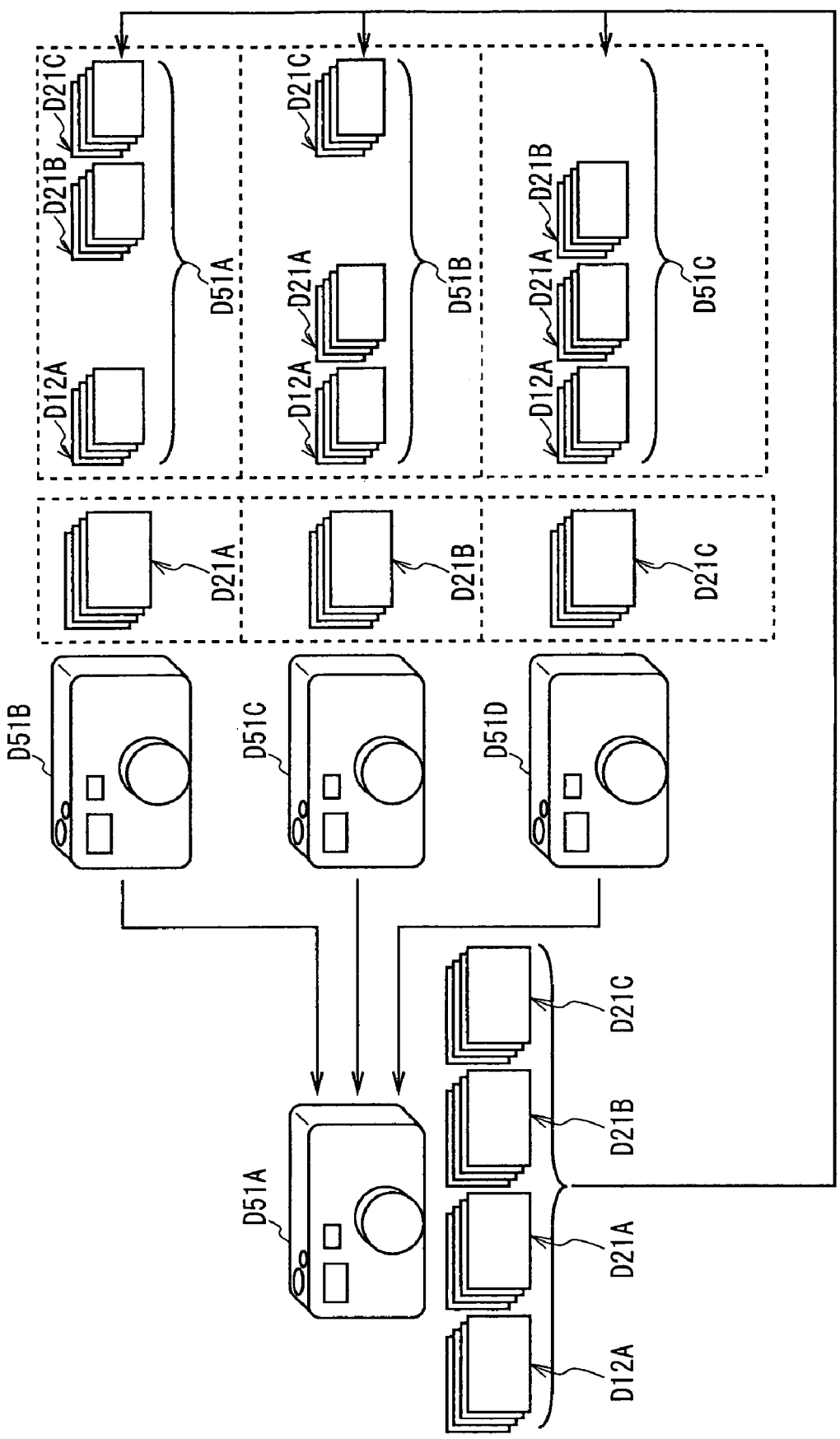
FIG. 15 is a schematic diagram served for explanation of sharing of photograph file data in plural digital still camera.

In this way, for example, as shown in FIG. 15, the digital still camera 51A set as master captures slave picture file data groups D21A to D21C consisting of plural slave picture file data D21 from the plural digital still cameras 51B to 51D set as slaves. The digital still camera 51A records the captured slave picture file data groups D21A to D21C in the recording medium 36 together with a master picture file data group D12A consisting of plural master picture file data D12. Consequently, the digital still camera 51A stores the master picture file data group D12A and the slave picture file data groups D21A to D21C, which are generated by subjecting the subject 2 to picture photographing independently and subordinately, in the own digital still camera 51A collectively.

The digital still camera 51A set as a master selects the master picture file data group D12A and the slave picture file data group D21A to D21C to be provided to the plural digital still cameras 51B to 51D set as slaves, excluding the slave picture file data D21A to D21C generated by the other ones of the digital still cameras as transmission partners respectively, among the master picture file data group D12A and the slave picture file data group D21A to D21C recorded in the recording medium 36. The digital still camera 51A generates picture file data groups for sharing D50A to D50C. The digital still camera 51A transmits the picture file data groups for sharing D50A to D50C to the plural digital still cameras 51B to 51D set as slaves and causes the plural digital still cameras 51B to 51D to record the picture file data groups for sharing D50A to D50C, respectively.

Consequently, in the photographing system 50, in the case of picture photographing for the subject 2, it is possible to share the master picture file data group D12A and the slave picture file data groups D21A to D21C in all the digital still cameras 51A to 51N establishing a relation of a master and slaves.

After the end of the master moving picture photographing processing, when a sharing instruction for a moving-picture-photographed image is inputted on a menu screen via the operation unit 23 in a state in which the menu screen is displayed on the display screen 15, in other words, when the reproduction mode is selected via operation of the operation unit 23, the controller 55 starts photographed image sharing processing (hereinafter referred to as master moving picture-photographed image sharing processing).

In this case, the controller 55 generates moving-picture-photographed image request data D52 storing master moving-picture-photographed date and time information at the time when the subject 2 is subjected to picture photographing independently at master moving picture photographing processing time. The controller 55 sends this moving-picture-photographed image request data D52 to the transmission/reception processing unit 26 and subjects the moving-picture-photographed image request data D52 to transmission processing. The controller 55 transmits an obtained moving-picture-photographed image request signal S52 to the other ones of the digital still cameras 51A to 51N present in the own radio communication range from the antenna 27.

As a result, a slave moving picture file signal S18 equivalent to s slave moving picture file data D23, which is specified in accordance with master moving picture photographing date and time information, is transmitted from the other ones of the digital still cameras 51A to 51N. Then, the controller 55 receives this moving picture file signal S18 with the antenna 27 and subjects the moving picture file signal S18 to reception processing in the transmission/reception processing unit 26. The controller 55 records obtained slave moving picture file data D23 in the recording medium 36.

When the controller 55 records the slave moving picture file data D23 in the recording medium 36 in this way, the controller 55 reproduces master moving picture file data D17 from the recording medium 36 together with the slave moving picture file data D23 via the recording/reproduction control unit 35. The controller 55 transfers this master moving picture file data D17 to the DRAM 22.

Then, the controller 55 selectively consolidates the master moving picture file data D17 and the remaining slave moving picture file data D23 excluding only the slave moving picture file data D23 generated by the other ones of the digital still cameras 51A to 51N serving as transmission partners among the slave moving picture file data D23 to generate a moving picture file data group for sharing D53. The controller 55 sends this picture file data group for sharing D50 to the transmission/reception processing unit 26 from the DRAM 22.

Consequently, the controller 55 subjects the moving picture file data group for sharing D53 to transmission processing in the transmission/reception processing unit 26. The controller 55 transmits an obtained moving picture file signal group for sharing S53 to the other plural ones of the digital still cameras 51A to 51N from the antenna 27 and ends the master moving-picture-photographed image sharing processing.

On the other hand, after the end of the slave moving picture photographing processing, when the controller 55 receives a moving-picture-photographed image request signal S52, which is transmitted from the other one of the digital still cameras 51A to 51N set as a master, with the antenna 27, the controller 55 subjects the moving picture-photographed image request signal S52 to the reception processing in the transmission/reception processing unit 26 and captures obtained moving-picture-photographed image request data D52. Consequently, the controller 55 starts photographed image sharing processing (hereinafter referred to as slave moving-picture-photographed image sharing processing) according to the moving picture-photographed image request data D52.

In this case, the controller 55 extracts master moving picture photographing date and time information stored in the moving-picture-photographed image request data D52. The controller 55 searches for slave moving picture photographing date and time information stored in slave moving picture file data D23 in the recording medium 36 using the recording/reproduction control unit 35 in accordance with the extracted master moving picture photographing date and time information and moving picture photographing condition information for the own one of the digital still cameras 51A to 51N. Consequently, the controller 55 specifies the slave moving picture file data D23 generated by subjecting the subject 2 to moving picture photographing subordinately in association with moving picture photographing of the other one of the digital still cameras 51A to 51N set as a master.

The controller 55 reads out the specified slave moving picture file data D23 from the recording medium 36 with the recording/reproduction control unit 35. The controller 55 sends this slave moving picture file data D23 to the transmission/reception processing unit 26 and subjects the slave moving picture file data D23 to transmission processing. The controller 55 transmits an obtained slave moving picture file signal S18 to the other one of the digital still cameras 51A to 51N set as a master from the antenna 27.

After transmitting the slave moving picture file signal S18 to the other one of the digital still cameras 51A to 51N set as a master, the controller 55 receives a moving picture file signal group S53 for sharing, which is subsequently transmitted from the other one of the digital still cameras 51A to 51N set as a master, with the antenna 27. Then, the controller 55 subjects the moving picture file signal group S53 for sharing to reception processing in the transmission/reception processing unit 26. The controller 55 records an obtained moving picture file data group D53 for sharing in the recording medium 36 via the recording/reproduction control unit 35 and ends the slave moving-picture-photographed image sharing processing.

In this way, the controller 55 can also share the master moving picture file data D17 and the slave moving picture file data D23 in all the digital still cameras 51A to 51N establishing a relation of a master and slaves in the case of moving picture photographing as in the case of the picture-photographed image sharing processing described with reference to FIG. 15.

Incidentally, when the reproduction mode is selected according to operation of the operation unit 23, a reproduction instruction for picture-photographed image and moving-picture-photographed image is subsequently inputted on a menu screen via the operation unit 23 in a state in which the menu screen is displayed on the display unit 15. Then, the controller 55 executes the picture-photographed image reproduction processing and the moving-picture-photographed image reproduction processing as the photographed image reproduction processing to cause a user to visually recognize a picture-photographed image and a moving-picture-photographed image freely as in the case of the master digital still camera 3 according to the first embodiment described above.

Note that, in the case of this second embodiment, the controller 55 can subject the subject 2 to picture photographing and moving picture photographing independently from the other ones of the digital still cameras 51A to 51N in a state in which none of the other ones of the digital still cameras 51A to 51N is present in the own radio communication range.

Consequently, the controller 55 uses the own one of the digital still cameras 51A to 51N not only in association with the other ones of the digital still cameras 51A to 51N but also independently to improve convenience of use.

Figure 16:
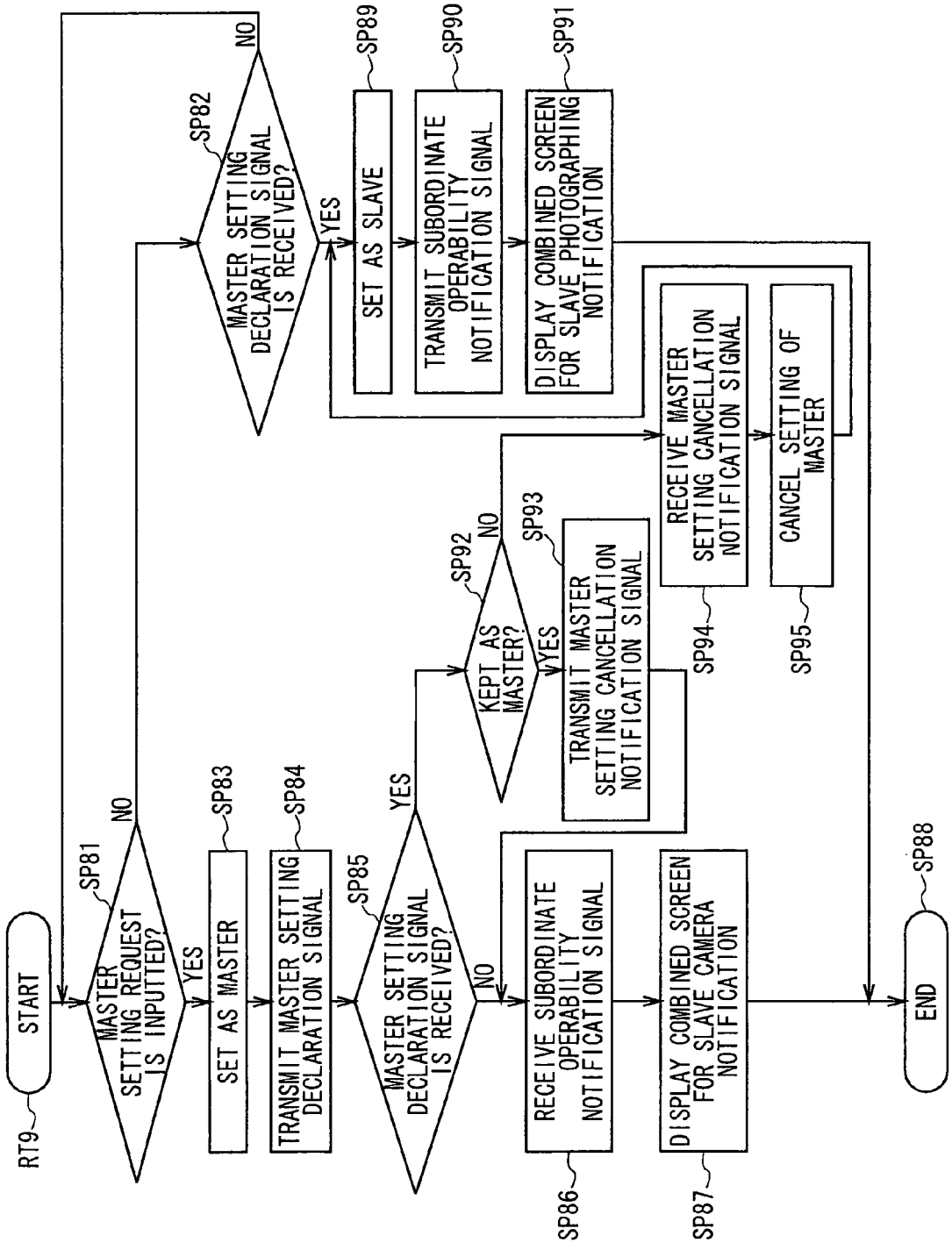
FIG. 16 is a flowchart showing a procedure for master/slave setting processing.

Actually, when the picture photographing mode and the moving picture photographing mode are selected via the operation unit 23, the controller 55 of each of the plural digital still cameras 51A to 51N executes master slave setting processing in accordance with a master slave setting processing program. Consequently, the controller 55 enters a master slave setting processing procedure RT9 shown in FIG. 16 from a start step and shifts to the following step SP81.

In step SP81, the controller 55 judges whether a master setting request is inputted.

When a negative result is obtained in this step SP81, this indicates that, since a user is considering when and how the subject 2 should be subjected to picture photographing and moving picture photographing in the own one of the digital still cameras 51A to 51N, the shutter button 14 has not been pressed halfway yet. At this point, the controller 55 shifts to step SP82.

In step SP82, the controller 55 judges whether a master setting declaration signal S45 transmitted from the other ones of the digital still cameras 51A to 51N is received.

When a negative result is obtained in this step SP82, this indicates that, since the user is also considering when and how the subject 2 should be subjected to picture photographing and moving picture photographing in the other ones of the digital still cameras 51A to 51N, the shutter button 14 has not been pressed halfway yet. At this point, the controller 55 returns to step SP81.

Thereafter, until a positive result is obtained in step SP81 or step SP82, the controller 55 repeats the processing in steps SP81 to SP82 cyclically. Consequently, the controller 55 waits for a master setting request to be inputted in the own one of the digital still cameras 51A to 51N and waits for reception of a master setting declaration signal S45 transmitted from the other ones of the digital still camera 51A to 51N.

When a positive result is obtained in step SP81, this indicates that the shutter button 14 is pressed halfway in order to subject the subject 2 to picture photographing and moving picture photographing in the own one of the digital shutter cameras 51A to 51N. At this point, the controller 55 shifts to step SP83.

In step SP83, the controller 55 sets the own one of the digital still cameras 51A to 51N as a master for picture photographing and moving picture photographing for the subject 2 and shifts to the following step SP84.

In step SP84, the controller 55 transmits the master setting declaration signal S45 to the other ones of the digital still cameras 51A to 51N present in the own radio communication range and shifts to step SP85.

In step SP85, the controller 55 judges whether the master setting declaration signal S45 transmitted from the other ones of the digital still cameras 51A to 51N is received.

When a negative result is obtained in this step SP85, this indicates that, since the own one of the digital still cameras 51A to 51N is set as a master for picture photographing and moving picture photographing for the subject 2 at a point earlier than the other ones of the digital still cameras 51A to 51N, the own one of the digital still cameras 51A to 51N can be kept to be set as a master. At this point, the controller 55 shifts to the following step SP86.

In step SP86, the controller 55 receives a subordinate operability notification signal S46 transmitted from the other ones of the digital still cameras 51A to 51N and shifts to the following step SP87.

In step SP87, the controller 55 displays the combined screen 32 for slave camera notification on the display unit 15 to notify a user that the own one of the digital still cameras 51A to 51N is set as a master for picture photographing and moving picture photographing for the subject 2. At the same time, the controller 55 notifies the user of the other ones of the digital still cameras 51A to 51N set as slaves according to the setting of a master. Then, the controller 55 shifts to step SP88 and ends this master slave setting processing procedure RT9.

Incidentally, when a positive result is obtained in step SP82 described above, this indicates that the other one of the digital still cameras 51A to 51N is set as a master for picture photographing and moving picture photographing for the subject 2 before the own one of the digital still cameras 51A to 51N is set as a master for picture photographing and moving picture photographing for the subject 2. At this point the controller 55 shifts to step SP89.

In step SP89, the controller 55 sets the own one of the digital still cameras 51A to 51N as a slave to the other one of the digital still cameras 51A to 51N set as a master and shifts to the following step SP90.

In step SP90, the controller 55 transmits a subordinate operability notification signal S46 to the other one of the digital still cameras 51A to 51N set as a master and shifts to the following step SP91.

In step SP91, the controller 55 displays the combined screen 41 for slave photographing notification on the display unit 15 to notify the user that the own one of the digital still cameras 51A to 51N is set as a slave and shifts to step SP88.

When a positive result is obtained in step SP85 described above, this indicates that, since in the own one of the digital still cameras 51A to 51N and the other one of the digital still cameras 51A to 51N the shutter button 14 is pressed halfway simultaneously, these digital still cameras are set as masters simultaneously. At this point, the controller 55 shifts to step SP92.

In step SP92, the controller 55 judges whether the own one of the digital still cameras 51A to 51N, among the own one of the digital still cameras 51A to 51N and the other one of the digital still cameras 51A to 51N set as masters simultaneously, should be kept to be set as a master preferentially in accordance with information on a priority for master setting stored in advance in the internal nonvolatile memory.

When a positive result is obtained in this step SP92, this indicates that the own one of the digital still cameras 51A to 51N can be kept to be set as a master more preferentially than the other one of the digital still cameras 51A to 51N in accordance with the priority for master setting. At this point, the controller 55 shifts to step SP93.

In step SP93, the controller 55 transmits a master setting cancellation notification signal for notifying that the setting of a master is to be cancelled to the other one of the digital still cameras 51A to 51N set as a master simultaneously with the own one of the digital still cameras 51A to 51N while keeping the own one of the digital still cameras 51A to 51N set as a master preferentially. Then, the controller 55 shifts to step SP86.

When a negative result is obtained in step SP92, this indicates that the other one of the digital still cameras 51A to 51N is kept to be set as a master more preferentially than the own one of the digital still cameras 51A to 51N in accordance with the priority for master setting. At this point, the controller 55 shifts to step SP94.

In step SP94, the controller 55 receives a master setting cancellation notification signal transmitted from the other one of the digital still cameras 51A to 51N and shifts to step SP95.

In step SP95, the controller 55 cancels the setting of a master for the own one of the digital still cameras 51A to 51N and sifts to step SP89.

Figure 17:
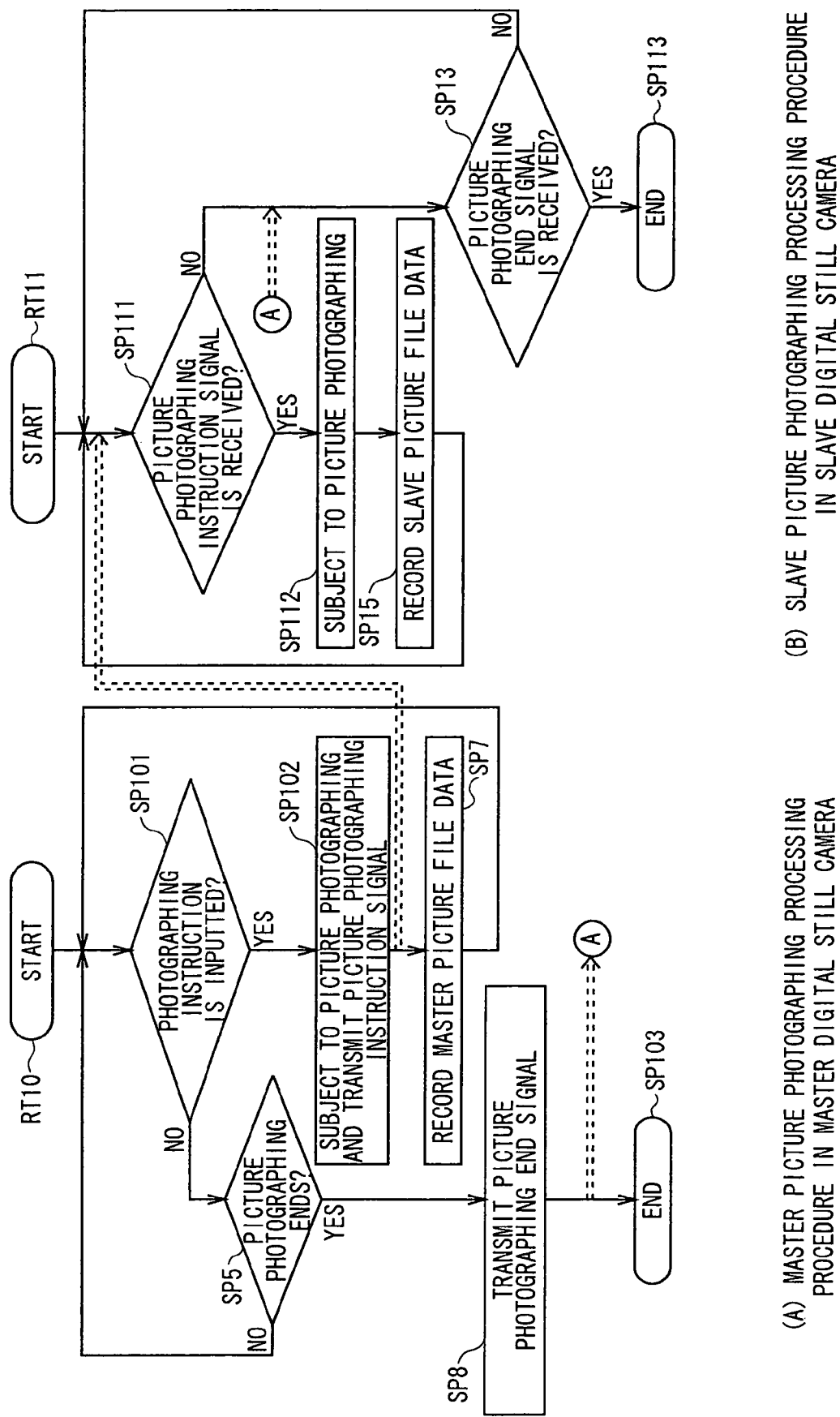
FIG. 17 is a flowchart showing a procedure for picture photographing processing in the photographing system according to the second embodiment.

A picture photographing processing procedure by the plural digital still cameras 51A to 51N in the photographing system 50 is summarized as described below. As shown in FIG. 17(A) in which steps corresponding to those in FIG.

7(A) are denoted by the identical reference signs, first, a controller (hereinafter specifically referred to as master controller) 55 of one of the digital still cameras 51A to 51N, which is set as a master in a state in which the picture photographing mode is selected, among the plural digital still cameras 51A to 51N, executes master picture photographing processing in accordance with a master photographing processing program. Consequently, the master controller 55 enters a master picture photographing processing procedure RT10 from a start step and shifts to the following step In step SP101, the master controller 55 judges whether a photographing instruction is inputted while imaging the subject 2.

When a negative result is obtained in this step SP101, this indicates that, for example, a user judges that a perfect moment for a good shot for picture photographing for the subject 2 has not come yet and the shutter button 14 has not been pressed fully. At this point, the master controller 55 shifts to step SP5.

When a positive result is obtained in step SP101, this indicates that, for example, the user judges that a perfect moment for a good shot for picture photographing for the subject 2 has come and the shutter button 14 has been pressed fully. At this point, the master controller 55 shifts to step SP102.

In step SP102, the master controller 55 extracts master picture-photographed image data D11 from imaged moving image data D6 that is generated while the subject 2 is imaged. In addition, the master controller 55 transmits picture photographing instruction data D47 storing master picture photographing date and time information at a master photographing instruction input point to the other ones of the digital still cameras 51A to 51N as a picture photographing instruction signal S47. Then, the master controller 55 executes processing in the following step SP7 and returns to step SP101.

Thereafter, the master controller 55 repeats the processing in steps SP101, SP5, SP102, and SP7 cyclically to thereby subject the subject 2 to picture photographing every time a photographing instruction is inputted until a positive result is obtained in step SP5.

On the other hand, as shown in FIG. 17(B) in which steps corresponding to those in FIG. 7(B) are denoted by the identical reference signs, a controller (hereinafter specifically referred to as slave controller) 55 of each of the other plural ones of the digital still cameras 51A to 51N, which is set as a slave to one of the digital still cameras 51A to 51N is set as a master, executes slave picture photographing processing in accordance with a slave photographing processing program. Consequently, the slave controller 55 enters a slave picture photographing processing procedure RT11 from a start step and shifts to the following step SP111.

In step SP111, the slave controller 55 judges whether a picture photographing instruction signal S47 transmitted from the one of the digital still cameras 51A to 51N set as a master is received.

When a negative result is obtained in this step SP111, this indicates that, for example, a user judges that a perfect moment for a good shot for picture photographing for the subject 2 has not come yet in the one of the digital still cameras 51A to 51N set as a master. At this point, the slave controller 55 shifts to SP13.

When a positive result is obtained in step SP111, this indicates that, for example, the user judges that a perfect moment for a good shot for picture photographing for the subject 2 has come in the one of the digital still cameras 51A to 51N set as a master and the shutter button 14 is pressed fully, whereby picture photographing is instructed from the one of the digital still cameras 51A to 51N set as a master. At this point, the slave controller 55 shifts to step SP112.

In step SP112, the slave controller 55 extracts slave picture-photographed image data D25 from imaged moving image data D30, which is generated while the subject 2 is imaged, in accordance with master picture photographing date and time information, which is obtained on the basis of the picture photographing instruction signal S47, and picture photographing condition information for the own one of the digital still cameras 51A to 51N stored in the internal nonvolatile memory. Then, the slave controller 55 executes processing in step SP15 and returns to step SP111.

In this way, the slave controller 55 repeats the processing in steps SP111, SP13, SP112, and SP15 cyclically until a positive result is obtained in step SP13. Consequently, every time the subject 2 is subjected to picture photographing in the one of the digital still cameras 51A to 51N set as a master, the slave controller 55 subjects the subject 2 to picture photographing in association with the picture photographing for the subject 2 in the one of the digital still cameras 51A to 51N set as a master.

When a positive result is obtained in step SP5 described above, the master controller 55 executes processing in the following step SP8. Then, the master controller 55 shifts to step SP103 and ends the master picture photographing processing procedure RT10.

When a positive result is obtained in step SP13 described above, the slave controller 55 shifts to step SP113 and ends the slave picture photographing processing procedure RT11. In this way, the entire picture photographing processing procedure in the photographing system 50 ends.

Figure 18:
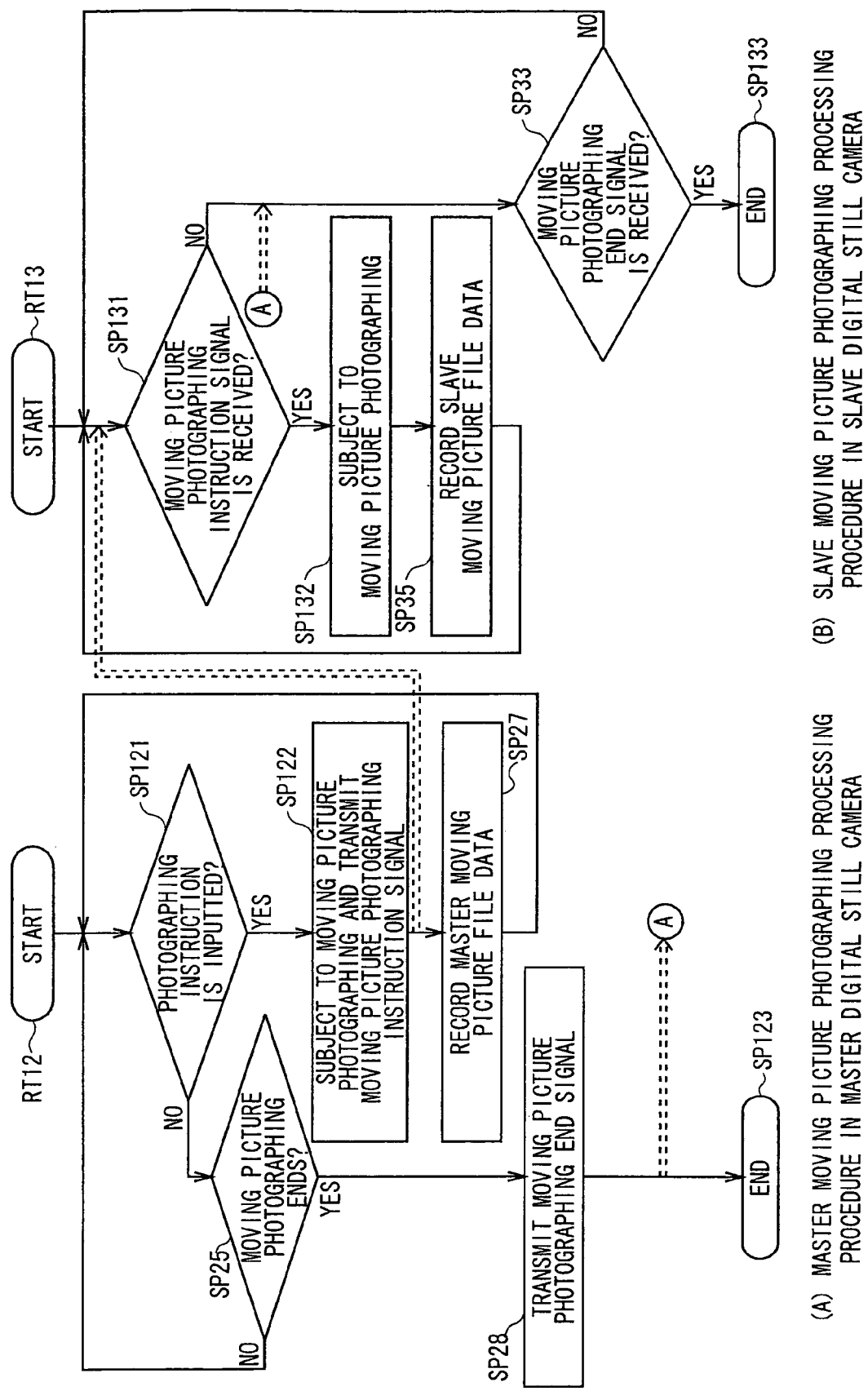
FIG. 18 is a flowchart showing a procedure for moving picture photographing processing in the photographing system according to the second embodiment.

A moving picture photographing processing procedure by the plural digital still cameras 51A to 51N in the photographing system 1 is summarized as described below. As shown in FIG. 18(A) in which steps corresponding to those in FIG. 9(A) are denoted by the identical reference signs, first, the master controller 55 of one of the digital still cameras 51A to 51N, which is set as a master in a state in which the moving picture photographing mode is selected, among the plural digital still cameras 51A to 51N, executes master moving picture photographing processing in accordance with a master photographing processing program. Consequently, the master controller 55 enters a master moving picture photographing processing procedure RT12 from a start step and shifts to the following step SP121.

In step SP121, the master controller 55 judges whether a photographing instruction is inputted while imaging the subject 2.

When a negative result is obtained in this step SP121, this indicates that, for example, a user judges that a perfect moment for a good shot for moving picture photographing for the subject 2 has not come yet and the shutter button 14 has not been pressed fully. At this point, the master controller 55 shifts to step SP25.

When a positive result is obtained in step SP121, this indicates that, for example, the user judges that a perfect moment for a good shot for moving picture photographing for the subject 2 has come and the shutter button 14 has been pressed fully. At this point, the master controller 55 shifts to step SP122.

In step SP122, the master controller 55 extracts master moving-picture-photographed image data D16 from imaged moving image data D6 that is generated while the subject 2 is imaged. In addition, the master controller 55 transmits moving picture photographing instruction data D48 storing master moving picture photographing date and time information at a master photographing instruction input point to the other ones of the digital still cameras 51A to 51N as a moving picture photographing instruction signal S48. Then, the master controller 55 executes processing in the following step SP27 and returns to step SP121.

Thereafter, the master controller 55 repeats the processing in steps SP121, SP25, SP122, and SP27 cyclically to thereby subject the subject 2 to moving picture photographing every time a photographing instruction is inputted until a positive result is obtained in step SP25.

On the other hand, as shown in FIG. 18(B) in which steps corresponding to those in FIG. 9(B) are denoted by the identical reference signs, the slave controller 55 of each of the other plural ones of the digital still cameras 51A to 51N, which is set as a slave to one of the digital still cameras 51A to 51N is set as a master, executes slave moving picture photographing processing in accordance with a slave photographing processing program. Consequently, the slave controller 55 enters a slave moving picture photographing processing procedure RT13 from a start step and shifts to the following step SP131.

In step SP131, the slave controller 55 judges whether a moving picture photographing instruction signal S48 transmitted from the one of the digital still cameras 51A to 51N set as a master is received.

When a negative result is obtained in this step SP131, this indicates that, for example, a user judges that a perfect moment for a good shot for moving picture photographing for the subject 2 has not come yet in the one of the digital still cameras 51A to 51N set as a master. At this point, the slave controller 55 shifts to SP33.

When a positive result is obtained in step SP131, this indicates that, for example, the user judges that a perfect moment for a good shot for moving picture photographing for the subject 2 has come in the one of the digital still cameras 51A to 51N set as a master and the shutter button 14 is pressed fully, whereby moving picture photographing is instructed from the one of the digital still cameras 51A to 51N set as a master. At this point, the slave controller 55 shifts to step SP132.

In step SP132, the slave controller 55 extracts slave moving-picture-photographed image data D26 from imaged moving image data D30, which is generated while the subject 2 is imaged, in accordance with master moving picture photographing start date and time information, which is obtained on the basis of the moving picture photographing instruction signal S48, and picture photographing condition information for the own one of the digital still cameras 51A to 51N stored in the internal nonvolatile memory. Then, the slave controller 55 executes processing in step SP35 and returns to step SP 131.

In this way, the slave controller 55 repeats the processing in steps SP131, SP33, SP132, and SP35 cyclically until a positive result is obtained in step SP33. Consequently, every time the subject 2 is subjected to moving picture photographing in the one of the digital still cameras 51A to 51N set as a master, the slave controller 55 subjects the subject 2 to moving picture photographing in association with the picture photographing for the subject 2 in the one of the digital still cameras 51A to 51N set as a master.

When a positive result is obtained in step SP25, the master controller 55 executes processing in the following step SP28. Then, the master controller 55 shifts to step SP123 and ends the master moving picture photographing processing procedure RT12.

When a positive result is obtained in step SP33, the slave controller 55 shifts to step SP133 and ends the slave moving picture photographing processing procedure RT13. In this way, the entire moving picture photographing processing procedure in the photographing system 50 ends.

Figure 19:
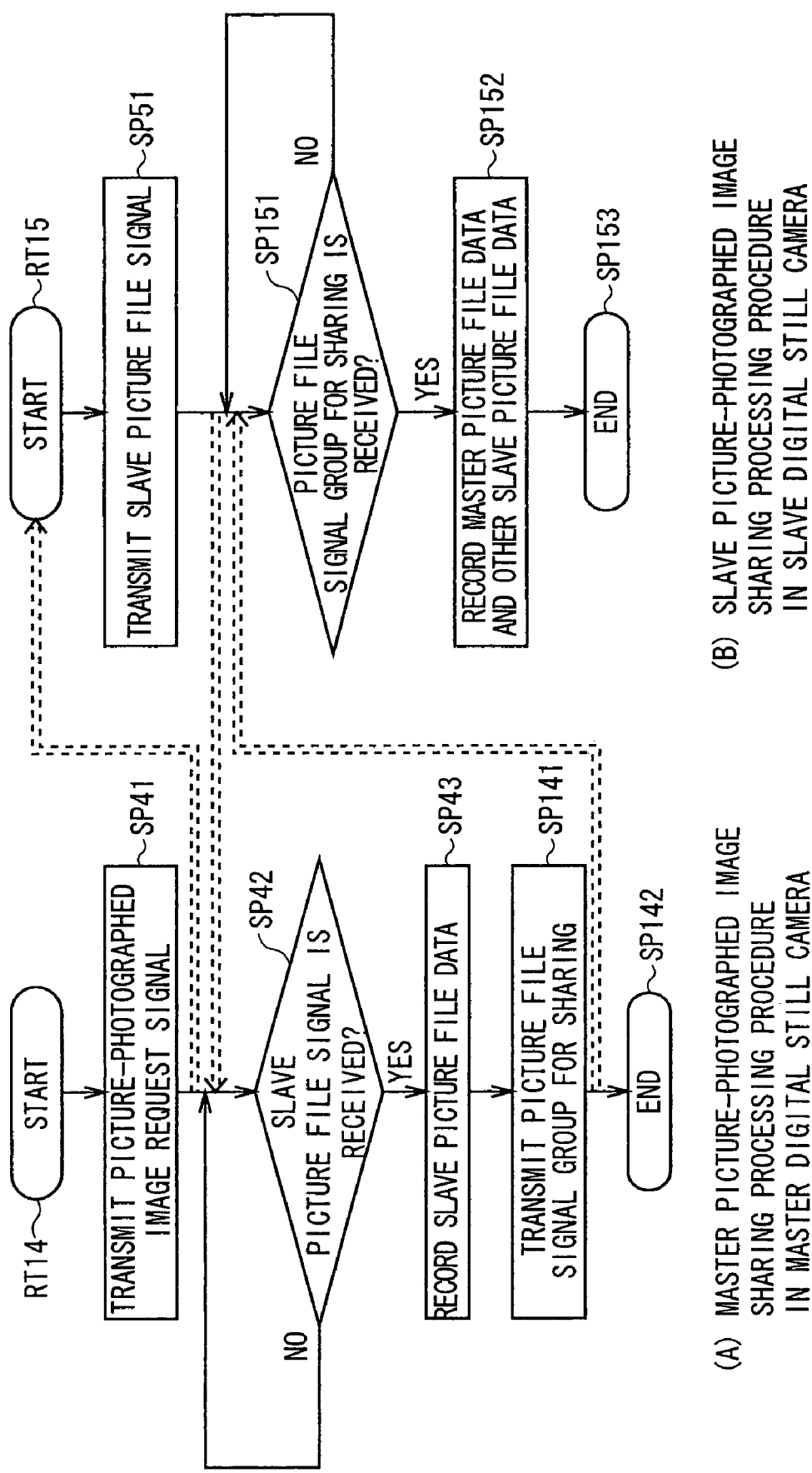
FIG. 19 is a flowchart showing a procedure for picture-photographed image sharing processing in the photographing system according to the second embodiment.

A picture-photographed image sharing processing procedure by the plural digital still cameras 51A to 51N in the photographing system 50 is summarized as described below. As shown in FIG. 19(A) in which steps corresponding to those in FIG. 11(A) are denoted by the identical reference signs, first, the master controller 55 of one of the digital still cameras 51A to 51N, which is set as a master in the picture photographing processing, among the plural digital still cameras 51A to 51N, executes master picture-photographed image sharing processing in accordance with a photographed image sharing processing program when a sharing instruction for a picture-photographed image is inputted on a menu screen via the operation unit 23. Consequently, the master controller 55 enters a master picture-photographed image sharing processing procedure RT14 from a start step and executes processing in the following step SP41. Then, the master controller 55 shifts to step SP42.

At this point, as shown in FIG. 19(B) in which steps corresponding to those in FIG. 11(B) are denoted by the identical reference signs, the slave controller 55 of each of the other plural ones of the digital still cameras 51A to 51N, which is set as a slave to the one of the digital still cameras 51A to 51N when the one of the digital still cameras 51A to 51N is set as a master in the picture photographing processing, executes slave picture photographing processing in accordance with a photographed image sharing processing program in response to reception of a picture-photographed image request signal S49 transmitted from the one of the digital still cameras 51A to 51N set as a master. Consequently, the slave controller 55 enters a slave picture-photographed image sharing processing procedure RT15 from a start step and executes processing in the following step SP51. Then, the slave controller 55 shifts to step SP151.

At this point, the master controller 55 executes processing in steps SP42 and SP43 sequentially in response to transmission of a slave picture file signal S16 from the other ones of the digital still cameras 51A to 51N set as slaves. Then, the master controller 55 shifts to the following step SP141.

In step SP141, the master controller 55 generates a picture file data group D50 for sharing that is obtained by reproducing slave picture file data D21 together with master picture file data D12 from the recording medium 36 and selectively consolidating the slave picture file data D21 and the master picture file data D12. The master controller 55 transmits this picture file data group D50 for sharing to the other plural ones of the digital still cameras 51A to 51N set as slaves as a picture file signal group S50 for sharing. Then, the master controller 55 shifts to the following step SP142 and ends the master picture-photographed image sharing processing procedure RT14.

At this point, in step SP151, the slave controller 55 judges whether the picture file signal group S50 for sharing transmitted from the one of the digital still cameras 51A to 51N set as a master is received.

When a negative result is obtained in this step SP151, this indicates that the one of the digital still cameras 51A to 51N set as a master is still consolidating the master picture file data D12 and the slave picture file data D21 selectively. At this point, the slave controller 55 waits for reception of the picture file signal group S50 for sharing transmitted from the one of the digital still cameras 51A to 51N set as a master.

When a positive result is obtained in step SP151, this indicates that the one of the digital still cameras 51A to 51N set as a master has consolidated the master picture file data D12 and the slave picture file data D21 selectively. At this point, the slave controller 55 shifts to step SP152.

In step SP152, the slave controller 55 records the master picture file data D12, which is obtained on the basis of the picture file signal group S50 for sharing, and the slave picture file data D21, which is generated in the other ones of the digital still cameras 51A to 51N set as slaves other than the own one of the digital still cameras 51A to 51N, in the recording medium 36. Then, the slave controller 55 shifts to the following step SP153 and ends the slave picture-photographed image sharing processing procedure RT15. In this way, the entire picture-photographed image sharing processing procedure ends in the photographing system 50.

Figure 20:
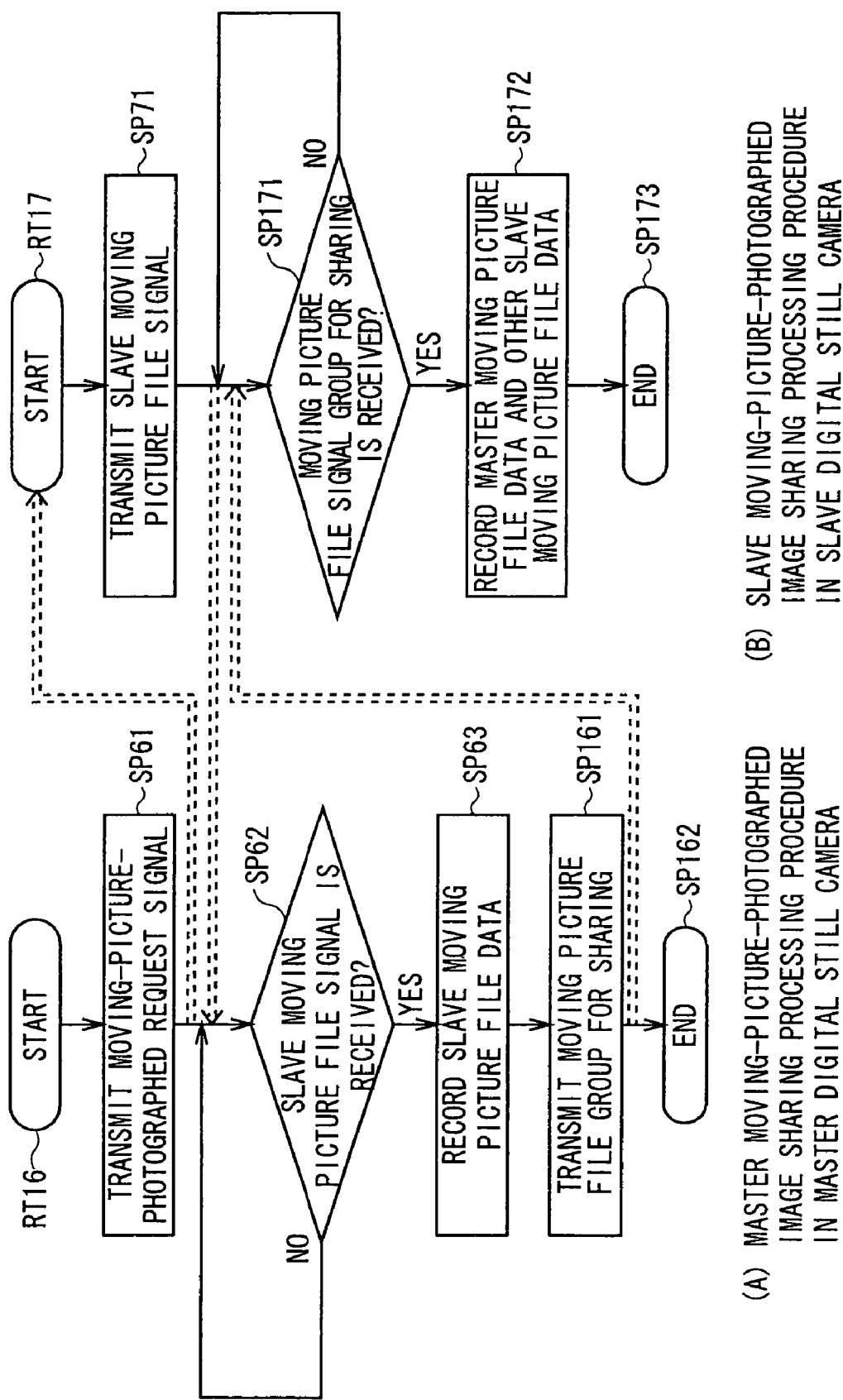
FIG. 20 is a flowchart showing a procedure for moving-picture-photographed image sharing processing in the photographing system according to the second embodiment.

A moving-picture-photographed image sharing processing procedure by the plural digital still cameras 51A to 51N in the photographing system 50 is summarized as described below. As shown in FIG. 20(A) in which steps corresponding to those in FIG. 12(A) are denoted by the identical reference signs, first, the master controller 55 of one of the digital still cameras 51A to 51N, which is set as a master in the moving picture photographing processing, among the plural digital still cameras 51A to 51N, executes master moving-picture-photographed image sharing processing in accordance with a photographed image sharing processing program when a sharing instruction for a moving-picture-photographed image is inputted on a menu screen via the operation unit 23. Consequently, the master controller 55 enters a master moving-picture-photographed image sharing processing procedure RT16 from a start step and executes processing in the following step SP61. Then, the master controller 55 shifts to step SP62.

At this point, as shown in FIG. 20(B) in which steps corresponding to those in FIG. 12(B) are denoted by the identical reference signs, the slave controller 55 of each of the other plural ones of the digital still cameras 51A to 51N, which is set as a slave to the one of the digital still cameras 51A to 51N when the one of the digital still cameras 51A to 51N is set as a master in the moving picture photographing processing, executes slave moving picture photographing processing in accordance with a photographed image sharing processing program in response to reception of a moving-picture-photographed image request signal S52 transmitted from the one of the digital still cameras 51A to 51N set as a master. Consequently, the slave controller 55 enters a slave moving-picture-photographed image sharing processing procedure RT17 from a start step and executes processing in the following step SP71. Then, the slave controller 55 shifts to step SP171.

At this point, the master controller 55 executes processing in steps SP62 and SP63 sequentially in response to transmission of a slave moving picture file signal S16 from the other ones of the digital still cameras 51A to 51N set as slaves. Then, the master controller 55 shifts to the following step SP161.

In step SP161, the master controller 55 generates a moving picture file data group D53 for sharing that is obtained by reproducing master moving picture file data D17 and slave moving picture file data D23 from the recording medium 36 and selectively consolidating the master moving picture file data D17 and the slave moving picture file data D23. The master controller 55 transmits this moving picture file data group D53 for sharing to the other plural ones of the digital still cameras 51A to 51N set as slaves as a moving picture file signal group S53 for sharing. Then, the master controller 55 shifts to the following step SP162 and ends the master moving-picture-photographed image sharing processing procedure RT16.

At this point, in step SP171, the slave controller 55 judges whether the moving picture file signal group S53 for sharing transmitted from the one of the digital still cameras 51A to 51N set as a master is received.

When a negative result is obtained in this step SP171, this indicates that the one of the digital still cameras 51A to 51N set as a master is still consolidating the master moving picture file data D17 and the slave moving picture file data D23 selectively. At this point, the slave controller 55 waits for reception of the moving picture file signal group for sharing S53 transmitted from the one of the digital still cameras 51A to 51N set as a master.

When a positive result is obtained in step SP171, this indicates that the one of the digital still cameras 51A to 51N set as a master has consolidated the master moving picture file data D17 and the slave moving picture file data D23 selectively. At this point, the slave controller 55 shifts to step SP172.

In step SP172, the slave controller 55 records the master moving picture file data D17, which is obtained on the basis of the moving picture file signal group S53 for sharing, and the slave moving picture file data D23, which is generated in the other ones of the digital still cameras 51A to 51N set as slaves other than the own one of the digital still cameras 51A to 51N, in the recording medium 36. Then, the slave controller 55 shifts to the following step SP173 and ends the slave moving-picture-photographed image sharing processing procedure RT17. In this way, the entire moving-picture-photographed image sharing processing procedure ends in the photographing system 50.

In the constitution described above, at the picture photographing processing time, the photographing system 50 sets one of the digital still cameras 51A to 51N, in which a master setting request is inputted at an earliest point among the plural digital still cameras 51A to 51N, as a master for picture photographing for the subject 2. At the same time, according to this setting of a master, the photographing system 50 sets the other plural ones of the digital still cameras 51A to 51N as slaves to the one of the digital still cameras 51A to 51N set as a master (steps SP81 to step SP95).

When a photographing instruction is inputted in the one of the digital still cameras 51A to 51N set as a master, the photographing system 50 subjects the subject 2 to picture photographing. At the same time, the photographing system 50 transmits a picture photographing instruction signal S47 to the other plural ones of the digital still cameras 51A to 51N set as slaves (steps SP101 to SP7 and steps SP111 and SP13). Consequently, the photographing system 50 subjects the subject 2 to picture photographing subordinately in the other plural ones of the digital still cameras 51A to 51N that have received the picture photographing instruction signal S47 (steps SP112 and SP15).

At the time of the moving picture photographing processing, the photographing system 50 sets one of the digital still cameras 51A to 51N, in which a master setting request is inputted at an earliest point, among the plural digital still cameras 51A to 51N as a master for moving picture photographing for the subject 2. At the same time, according to this setting of a master, the photographing system 50 sets the other plural ones of the digital still cameras 51A to 51N as slaves to the one of the digital still cameras 51A to 51N set as a master (steps SP81 to step SP95).

When a photographing instruction is inputted in the one of the digital still cameras 51A to 51N set as a master, the photographing system 50 subjects the subject 2 to moving picture photographing. At the same time, the photographing system 50 transmits a moving picture photographing instruction signal S48 to the other plural ones of the digital still cameras 51A to 51N set as slaves (steps SP121 to SP27 and steps SP131 and SP33). Consequently, the photographing system 50 subjects the subject 2 to moving picture photographing subordinately in the other plural ones of the digital still cameras 51A to 51N that have received the moving picture photographing instruction signal S48 (steps SP132 to SP35).

Therefore, in this photographing system 50, any one of plural users using the plural digital still cameras 51A to 51N can be a master of picture photographing and moving picture photographing and subjects the subject 2 to picture photographing and moving picture photographing at a desired chance for a good shot from a desired direction. In addition, the user can subject the subject 2 to picture photographing and moving picture photographing collectively from plural directions other than the desired direction (and at different chance for a good shot).

The photographing system 50 depends on users using the digital still cameras 51A to 51N in determining photographing directions of the respective digital still cameras 51A to 51N in subjecting the subject 2 to picture photographing and moving picture photographing. Thus, the photographing system 50 not only can subject the subject 2 to picture photographing and moving picture photographing from plural directions, but also can subject a state around the subject 2 and the like to picture photographing and moving picture photographing.

In addition, at the time of picture-photographed image sharing processing, in the photographing system 50, one of the digital still cameras 51A to 51N set as a master at the time of the previous picture photographing processing transmits a picture-photographed image request signal S49 to the other plural ones of the digital still cameras 51A to 51N set as slaves at the time of the picture photographing processing (step SP41). Consequently, the one of the digital still cameras 51A to 51N set as a master acquires slave picture file data D21 from the other plural ones of the digital still cameras 51A to 51N set as slaves (steps SP42 and SP43 and step SP51).

In the photographing system 50, the one of the digital still cameras 51A to 51N set as a master provides the other plural ones of the digital still cameras 51A to 51N set as slaves with slave picture file data D21 other than the slave picture file data D21 generated by the other plural ones of the digital still cameras 51A to 51N together with master picture file data D12. Consequently, all the digital still cameras 51A to 51N set as a master and slaves share the master picture file data D12 and the slave picture file data D21 (steps SP141 and SP151 and step SP152).

In the photographing system 50, at the time of the moving picture photographing image acquisition processing, the one of the digital still cameras 51A to 51N set as a master at the time of the previous moving picture photographing processing transmits a moving-picture-photographed image request signal S52 to the other plural ones of the digital still cameras 51A to 51N set as slaves at the time of the moving picture photographing processing (step SP61). Consequently, the one of the digital still cameras 51A to 51N set as a master acquires the slave moving picture file data D23 from the other plural ones of the digital still cameras 51A to 51N set as slaves, respectively (steps SP62 and SP63 and step SP71).

In the photographing system 50, the one of the digital still cameras 51A to 51N set as a master provides the other plural ones of the digital still cameras 51A to 51N set as slaves with slave moving picture file data D23 other than the slave moving picture file data D23 generated by the other plural ones of the digital still cameras 51A to 51N together with master moving picture file data D17. Consequently, all the digital still cameras 51A to 51N set as a master and slaves share the master picture file data D17 and the slave picture file data D23 (steps SP161 and SP171 and step SP172).

Therefore, in this photographing system 50, even the other plural ones of the digital still cameras 51A to 51N set as slaves other than the one of the digital still cameras 51A to 51N set as a master at the time of the picture photographing processing and the moving picture processing can acquire the master picture file data D12 and the slave picture file data D21 as well as the master moving picture file data D17 and the slave moving picture file data D23, which are generated by subjecting the subject 2 to picture photographing and moving picture photographing from plural directions, easily without requiring complicated procedures such as lending and borrowing of the recording medium 36 itself and re-recording using an information processing apparatus.

According to the constitution described above, at the time of the picture photographing processing and the moving picture photographing processing, one of the digital still cameras 51A to 51N, in which a master setting request is inputted at an earliest point, among the plural digital still cameras 51A to 51N is set as a master of picture photographing and moving picture photographing for the subject 2. At the same time, the other plural ones of the digital still cameras 51A to 51N are set as slaves to the one of the digital still camera 51A to 51N set as a master according to the setting of a master. In this state, when a photographing instruction is inputted in the one of the digital still cameras 51A to 51N set as a master, the one of the digital still cameras 51A to 51N subjects the subject 2 to picture photographing and moving picture photographing according to the input of the photographing instruction. At the same time, the one of the digital still cameras 51A to 51N transmits the picture photographing instruction signal S47 and the moving picture photographing instruction signal S48 to the other plural ones of the digital still cameras 51A to 51N set as slaves. Consequently, the other plural ones of the digital still cameras 51A to 51N set as slaves subject the subject 2 to picture photographing and moving picture photographing according to the picture photographing instruction signal S47 and the moving picture photographing instruction signal S48. Therefore, in addition to the feasibility obtained by the first embodiment described above, it is possible to subject the subject 2 to picture photographing and moving picture photographing with any one of plural users, who use the plural digital still cameras 51A to 51N, as a master. As a result, it is possible to reflect easily preference such as a photographing direction and a perfect moment for a good shot of all the users using the plural digital still cameras 51A to 51N on the picture photographing and the moving picture photographing to subject the subject 2 to picture photographing and moving picture photographing.

In the photographing system 50, when master setting requests are inputted simultaneously in at least two of the plural digital still cameras 51A to 51N, any one of the digital still cameras 51A to 51N is set as a master of picture photographing and moving picture photographing for the subject 2 in accordance with a priority for master setting set in advance. Consequently, it is possible to establish a master slave relation with respect to the plural digital still cameras 51A to 51N without failure at the time of the picture photographing processing and the moving picture photographing processing and subject the subject 2 to picture photographing and moving picture photographing from plural directions collectively without delay.

In the photographing system 50, at the time of the picture-photographed image sharing processing and the moving-picture-photographed image sharing processing, the one of the digital still cameras 51A to 51N set as a master transmits the picture-photographed image request signal S49 and the moving-picture-photographed image request signal S52 to the other plural ones of the digital still cameras 51A to 51N set as slaves. The one of the digital still cameras 51A to 51N set as a master acquires the slave picture file data D21 and the slave moving picture file data D23 from the other plural ones of the digital still cameras 51A to 51N set as slaves. Then, the one of the digital still cameras 51A to 51N set as a master provides the other plural ones of the digital still cameras 51A to 51N set as slave with the slave picture file data D21 and the slave moving picture file data D23 other than the slave picture file data D21 and the slave moving picture file data D23 generated by the other plural ones of the digital still cameras 51A to 51N together with the master picture file data D12 and the master moving picture file data D17. All the digital still cameras 51A to 51N share the master picture file data D21 and the slave picture file data D21 as well as the master moving picture file data D17 and the slave moving picture file data D23. Consequently, it is possible to acquire the master picture file data D12 and the slave picture file data D21 as well as the master moving picture file data D17 and the slave moving picture file data D23 easily without requiring complicated procedures such as lending and borrowing of the recording medium 36 and re-recording using an information processing apparatus in all the digital still cameras 51A to 51N. As a result, even the digital still cameras 51A to 51N, which cannot be a master but are set as slaves at the time of picture photographing and moving picture photographing, can store the master picture file data D12 and the slave picture file data D21 as well as the master moving picture file data D17 and the slave moving picture file data D23 generated by subjecting the subject 2 to picture photographing and moving picture photographing from plural directions.

In the second embodiment described above, a picture-photographed image is displayed when the picture-photographed image display processing is executed in the digital still cameras 51A to 51N and a moving-picture-photographed image is displayed when the moving-picture-photographed image display processing is executed. However, the invention is not limited to this. A picture-photographed image and a moving-picture-photographed image may be mixed and displayed when the digital still cameras 51A to 51N are executing one photographed image display processing.

In the second embodiment described above, the master moving-picture-photographed image data D16 and the slave moving-picture-photographed image data D26 are extracted from the imaged moving image data D6 and D30 when the subject 2 is subjected to moving picture photographing in the digital still cameras 51A to 51N. However, the invention is not limited to this. It is also possible that the master moving-picture-photographed image data D16 and the slave moving-picture-photographed image data D26 are extracted when the subject 2 is subjected to moving picture photographing in the digital still cameras 51A to 51N, sound data is generated concurrently by collecting sounds around the subject 2 in synchronization with the extraction of the data, and the generated sound data is recorded as a result of the moving picture photographing together with the master moving-picture-photographed image data D16 and the slave moving-picture-photographed image data D26.

In the second embodiment described above, all the digital still cameras 51A to 51N share the master picture-photographed image data D11 and the slave picture-photographed image data S25 as well as the master moving-picture-photographed image data D16 and the slave moving-picture-pho- tographed image data D26. However, the invention is not limited to this. It is also possible that, when the respective digital still cameras 51A to 51N acquire the master picture-photographed image data D11 and the slave picture-photographed image data D25 as well as the master moving-picture-photographed image data D16 and the slave moving-picture-photographed image data D26, one or plural one of the digital still cameras 51A to 51N, which are sources of provision of the master picture-photographed image data D11 and the slave picture-photographed image data D25 as well as the master moving-picture-photographed image data D16 and the slave moving-picture-photographed image data D26, are selected arbitrarily and the master picture-photographed image data D11 and the slave picture-photographed image data D25 as well as the master moving-picture-photographed image data D16 and the slave moving-picture-photographed image data D26 are acquired from the selected ones of the digital still cameras 51At to 51N.

In the second embodiment described above, after executing the picture photographing processing and the moving picture photographing processing, the digital still cameras 51A to 51N execute the picture-photographed image sharing processing and the moving-picture-photographed image sharing processing to share the master picture-photographed image data D11 and the slave picture-photographed image data D25 as well as the master moving-picture-photographed image data D16 and the slave moving-picture-photographed image data D26. However, the invention is not limited to this. It is also possible that, in the digital still cameras 51A to 51N, the picture-photographed image sharing processing is incorporated in the picture photographing processing and the moving-picture-photographed image sharing processing is incorporated in the moving picture photographing processing, and the digital still cameras 51A to 51N share the master picture-photographed image data D11 and the slave picture-photographed image data D25 as well as the master moving-picture-photographed image data D16 and the slave moving-picture-photographed image data D26 every time the digital still cameras 51A to 51N subject the subject 2 to picture photographing and moving picture photographing while executing the picture photographing processing and the moving picture photographing processing.

The one of the digital still cameras 51A to 51N set as a master and/or the plural ones of the digital still cameras 51A to 51N set as slaves may be adapted to acquire, when startup stop instructions are inputted thereto, respectively, the master picture file data D12, the master moving picture file data D17 and/or the slave picture file data D21, and the slave moving picture file data D23 while stopping startup outwardly. Consequently, since the master controller 55 and the slave controller 55 are caused to stop other functions such as picture photographing and moving picture photographing, it is possible to acquire the master picture file data D12, the master moving picture file data D17 and/or the slave picture file data D21, and the slave moving picture file data D23 with significantly reduced processing loads.

In addition, it is also possible that each of the plural digital still cameras 51A to 51N provides the other ones of the plural digital still cameras 51A to 51N (regardless of setting of a master and slaves) with the master picture file data D12 and the master moving picture file data D17 as well as the slave picture file data D21 and the slave moving picture file data D23 generated in the own one of the digital still cameras 51A to 51N, respectively, to share the master picture file data D12 and the master moving picture file data D17 as well as the slave picture file data D21 and the slave moving picture file data D23.

In the second embodiment described above, when one of the digital still cameras 51A to 51N is set as a master, the remaining other ones of the digital still cameras 51A to 51N are automatically set as slaves. However, the invention is not limited to this. It is also possible that, when one of the digital still cameras 51A to 51N is set as a master, the one of the digital still cameras 51A to 51N is caused to select arbitrarily whether the remaining other ones of the digital still cameras 51A to 51N should be set as slaves.

In the second embodiment described above, when the one of the digital still cameras 51A to 51N set as a master executes the master picture photographing processing, the other ones of the digital still cameras 51A to 51N set as slaves execute the slave picture photographing processing and, when the one of the digital still cameras 51A to 51N set as a master executes the master moving picture photographing processing, the other ones of the digital still cameras 51A to 51N set as slaves execute the slave moving picture photographing processing. However, the invention is not limited to this. The one of the digital still cameras 51A to 51N set as a master and the other ones of the digital still cameras 51A to 51N set as slaves may execute the master picture photographing processing and the master moving picture photographing processing as well as the slave picture photographing processing and the slave moving picture photographing processing in a mixed state or execute a fixed combination of any of the digital still cameras 51A to 51N may execute the processing. Consequently, it is possible to execute both picture photographing and moving picture photographing together. As a result, when a user wishes to photograph the subject 2, it is possible to record a state of the subject 2 as both a picture-photographed image and a moving-picture-photographed image.

In the second embodiment described above, moving picture photographing time is set in advance for the respective digital still cameras 51A to 51N. However, the invention is not limited to this. The moving picture photographing time does not have to be set specifically and the plural digital still cameras 51A to 51N may execute moving picture photographing for desired moving picture photographing time in order and continuously to realize the following. For example, in the case of the moving picture photographing, after the one of the digital still cameras 51A to 51N set as a master and the other ones of the digital still cameras 51A to 51N set as slaves perform normal communication to start moving picture photographing in the one of the digital still cameras 51A to 51N set as a master, at a point when the moving picture photographing is finished because, for example, the shutter button 14 is depressed once again, a first one of the other ones of the digital still cameras 51A to 51N set as slaves starts moving picture photographing in accordance with an order set in advance. At a point when the moving picture photographing is also finished in the other ones of the digital still cameras 51A to 51N set as slaves because, for example, the shutter button 14 is depressed once gain, a second one of the other ones of the digital still cameras 51A to 51N set as slaves starts moving picture photographing. After a last one of the other ones of the digital still cameras 51A to 51N set as slaves starts moving picture photographing, all kinds of moving picture photographing are finished because the shutter button 14 is depressed twice continuously.

Consequently, it is possible to execute the moving picture photographing described above with reference to FIG. 10 freely without being restricted by prior processing for selecting moving picture photographing conditions and moving picture photographing time selected once.

Moreover, in the second embodiment described above, when one of the digital still cameras 51A to 51N is set as a master at the time of the picture photographing processing and the moving picture photographing processing, the one of the digital still cameras 51A to 51N set as a master is kept to be set as a master until end of the master picture photographing processing and the picture moving picture photographing processing is instructed in the one of the digital still cameras 51A to 51N. However, the invention is not limited to this. One of the digital still cameras 51A to 51N set as a master may be changed every time the plural digital still cameras 51A to 51N subject the subject 2 to picture photographing and moving picture photographing a predetermined number of times at the time of the picture photographing processing and the moving picture photographing processing. Consequently, it is possible to subject the subject 2 to picture photographing and moving picture photographing with plural users set as a master in order in one photographing location. As a result, it is possible to reflect surely preference of respective users on the picture photographing and the moving picture photographing to subject the subject 2 to picture photographing and moving picture photographing.

(3) THIRD EMBODIMENT

Figure 21:
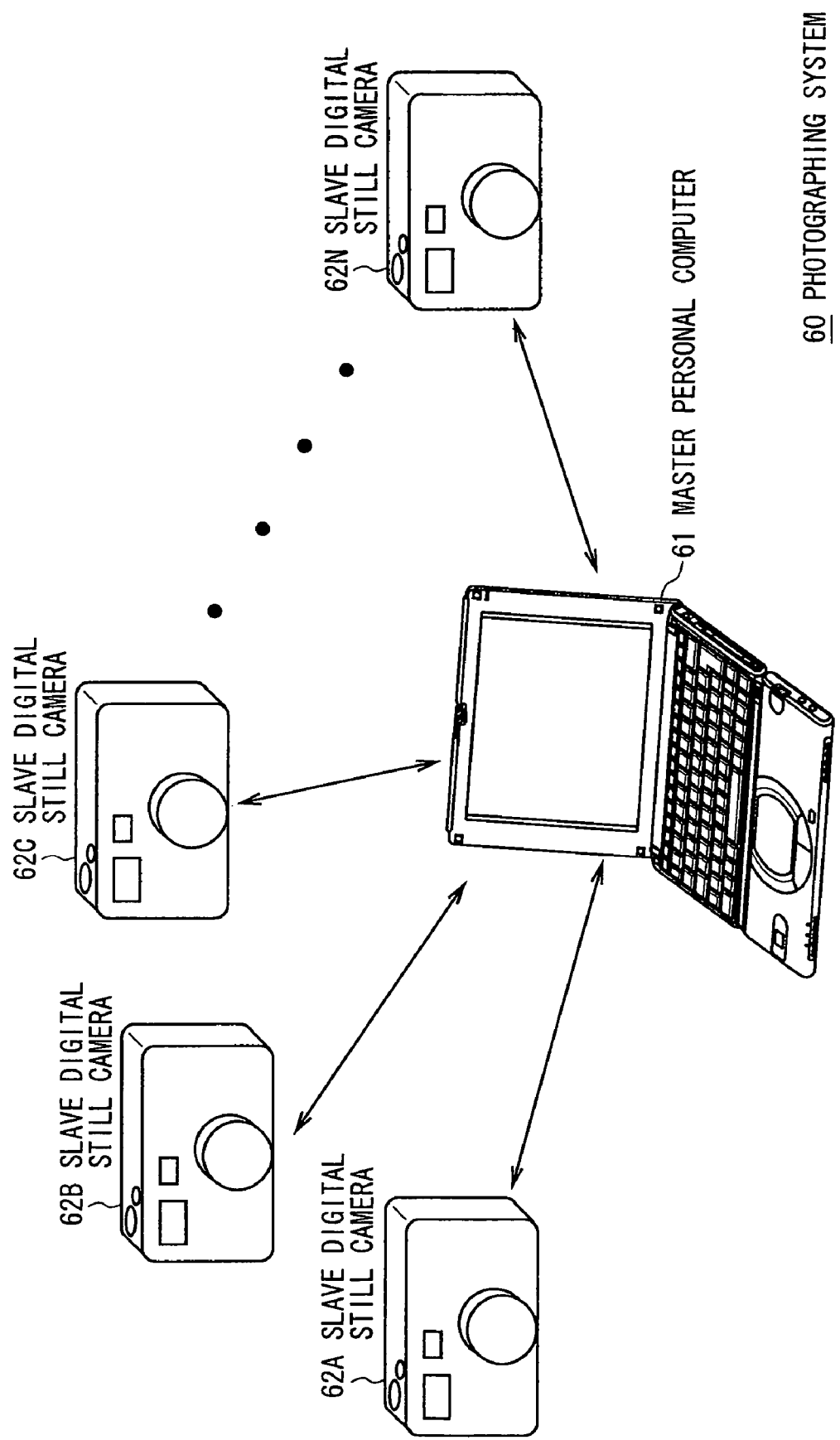
FIG. 21 is a schematic diagram showing an overall constitution of a photographing system according to a third embodiment.

FIG. 21 shows a photographing system 60 according to a third embodiment. The photographing system 60 is established by wirelessly connecting to a master personal computer 61 serving as a master of picture photographing and moving picture photographing for a subject such as a person, plural slave digital still cameras 62A to 62N, which actually subject a subject to picture photographing and moving picture photographing, as slaves to the master personal computer 61 according to Bluetooth or the like that is a near field radio communication technique.

Figure 22:
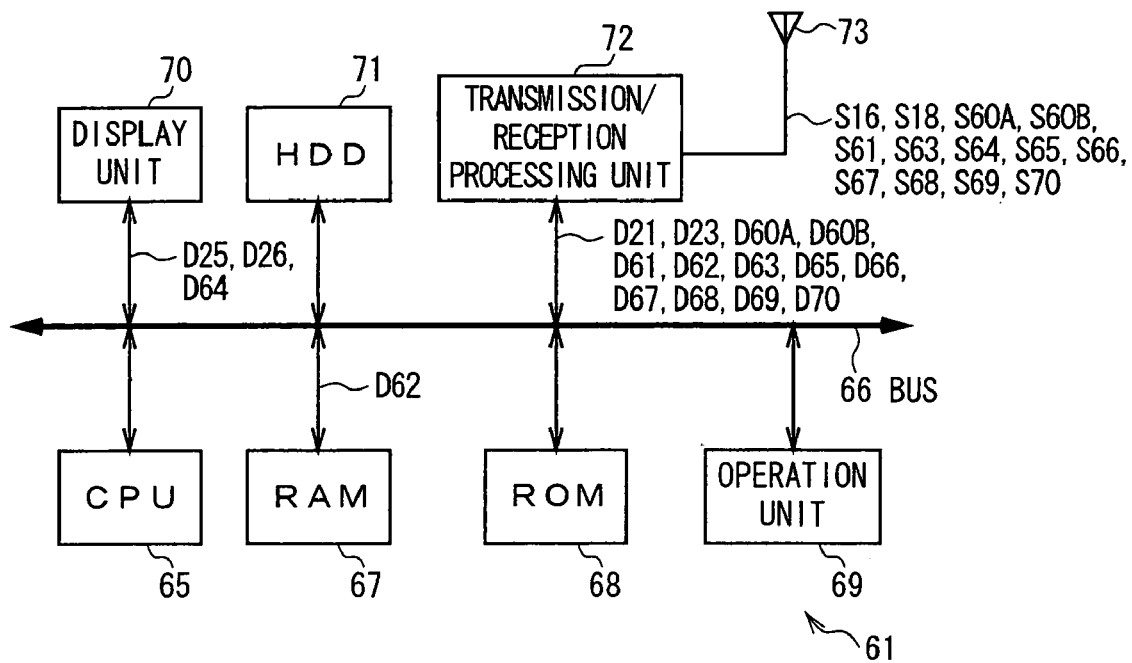
FIG. 22 is a block diagram showing a circuit constitution of a master personal computer.

In this case, as shown in FIG. 22, the master personal computer 61 is constituted by connecting a RAM 67, a ROM 68, an operation unit 69, a display unit 70, a hard disk drive 71, and a transmission/reception unit 72 to a CPU 65 via a bus 66.

The CPU 65 expands various application programs such as a master registration processing program, a photographing control processing program, a photographed image acquisition processing program, and a photographed image reproduction processing program stored in ROM 68 in advance on the RAM 67 according to various instructions inputted via the operation unit 69 and controls respective circuit units of the master personal computer 61 totally. Through this control, the CPU 65 executes master registration processing for the slave digital still cameras 62A to 62N, photographing processing for the slave digital still cameras 62A to 62N, photographed image acquisition processing for acquiring slave picture-photographed image data D25 and slave moving-picture-photographed image data D26, which are generated by subjecting a subject to picture photographing and moving picture photographing subordinately, from the slave digital still cameras 62A to 62N, photographed image reproduction processing for reproducing photographed image data acquired from the slave digital still cameras 62A to 62N, and the like.

When a slave registration instruction is inputted via the operation unit 69 in a state in which the slave digital still cameras 62A to 62N are present in a radio communication range of the master personal computer 61 (hereinafter referred to as personal computer radio communication range), the CPU 65 executes master registration processing for the slave digital still cameras 62A to 62N in the same manner as the master digital still camera 3 (FIG. 3) according to the first embodiment described above.

Consequently, the CPU 65 causes the slave digital still cameras 62A to 62N to store identification information for master registration peculiar to the master personal computer 61 while wirelessly communicating with the slave digital still cameras 62A to 62N present in the personal computer wireless communication range via the transmission/reception processing unit 72 and an antenna 73. At the same time, the CPU 65 records identification information for slave registration peculiar to the slave digital still cameras 62A to 62N in a hard disk of a hard disk drive 71. Consequently, the CPU 65 registers the slave digital still camera 62A to 62N as slaves to the master personal computer 61.

Incidentally, thereafter, the CPU 65 adds the identification information for slave registration to various signals and transmits the various signals to thereby cause the slave digital still cameras 62A to 62N to identify and receive various signals sent to the slave digital still cameras 62A to 62N surely. At the same time, the CPU 65 causes the slave digital still cameras 62A to 62N to add the identification information for master registration to various signals transmitted from the slave digital still cameras 62a to 62N. Consequently, the CPU 65 identifies and receives the various signals surely.

After registering the slave digital still cameras 62A to 62N as slaves, when a photographing condition setting instruction is inputted for the slave digital still cameras 62A to 62N via the operation unit 69, the CPU 65 executes the photographing condition setting processing according to the photographing condition setting instruction. The CPU 65 reads out photographing condition setting screen data recorded in advance from the hard disk of the hard disk drive 71 and displays a photographing condition setting screen based on the read-out photographing condition setting screen data on the display unit 70.

In this state, the CPU 65 causes a user to select picture photographing conditions and moving picture photographing conditions for the slave digital still cameras 62a to 62N on the photographing condition setting screen in the same manner as the master digital still camera 3 according to the first embodiment described above. The CPU 65 stores the selected picture photographing conditions and moving picture photographing conditions in the hard disk of the hard disk drive 71 as picture photographing condition information and moving picture photographing condition information and associates the picture photographing condition information and the moving picture photographing condition information with the identification information for slave registration to thereby generate a registration information data table.

When a picture photographing control instruction is inputted via the operation unit 69, the CPU 65 starts photographing control processing for picture photographing (hereinafter referred to as picture photographing control processing) for the slave digital still cameras 62A to 62N.

In this case, the CPU 65 performs search to find whether the slave digital still cameras 62A to 62N in a subordinately operable state are present in the personal radio communication range. In addition, the CPU 65 generates search data D60A for causing the slave digital still cameras 62A to 62N to start the slave picture photographing processing, sends this search data D60A to the transmission/reception processing unit 72, and subjects the search data D60A to transmission processing. The CPU 65 transmits an obtained search signal S60A from the antenna 73.

As a result, the subordinately operable slave digital still cameras 62A to 62N present in the personal computer radio communication range starts the slave picture photographing processing in response to the search signal S60A and a subordinate operability notification signal S61 is returned from the slave digital still cameras 62A to 62N. Then, the CPU 65 receives this subordinate operability notification signal S61 with the antenna 73 and subjects the subordinate operability notification signal S61 to reception processing in the transmission/reception processing unit 72. The CPU 65 captures obtained subordinate operability notification data D61.

Consequently, the CPU 65 recognizes the slave digital still cameras 62A to 62N capable of performing a slave operation for picture photographing, which are present in the personal radio communication range, on the basis of the subordinate operability notification data D61.

The CPU 65 generates imaged still image request data D63 for acquiring imaged still image data D62, which is generated by imaging a subject from the slave digital still cameras 62A to 62N present in the personal computer radio communication range, respectively. The CPU 65 transmits this imaged still image request data D63 to the transmission/reception processing unit 72 and subjects the imaged still image request data D63 to transmission processing. The CPU 65 transmits an obtained imaged still image request signal S63 to the slave digital still cameras 62A to 62N from the antenna 73.

As a result, imaged still image data D62, which is equivalent to one imaged still image sequentially extracted at a predetermined period from imaged moving image data generated by imaging a subject from the slave digital still cameras 62A to 62N, among temporally continuous plural imaged still image data D62 constituting the imaged moving image data is transmitted as an imaged still image signal S64. Every time the imaged still image signal S64 is transmitted, the CPU 65 receives this imaged still image signal S64 with the antenna 73 and subjects the imaged still image signal S64 to reception processing in the transmission/reception processing unit 72. The CPU 65 stores obtained imaged still image data D62 in the RAM 67 temporarily.

Figure 23:
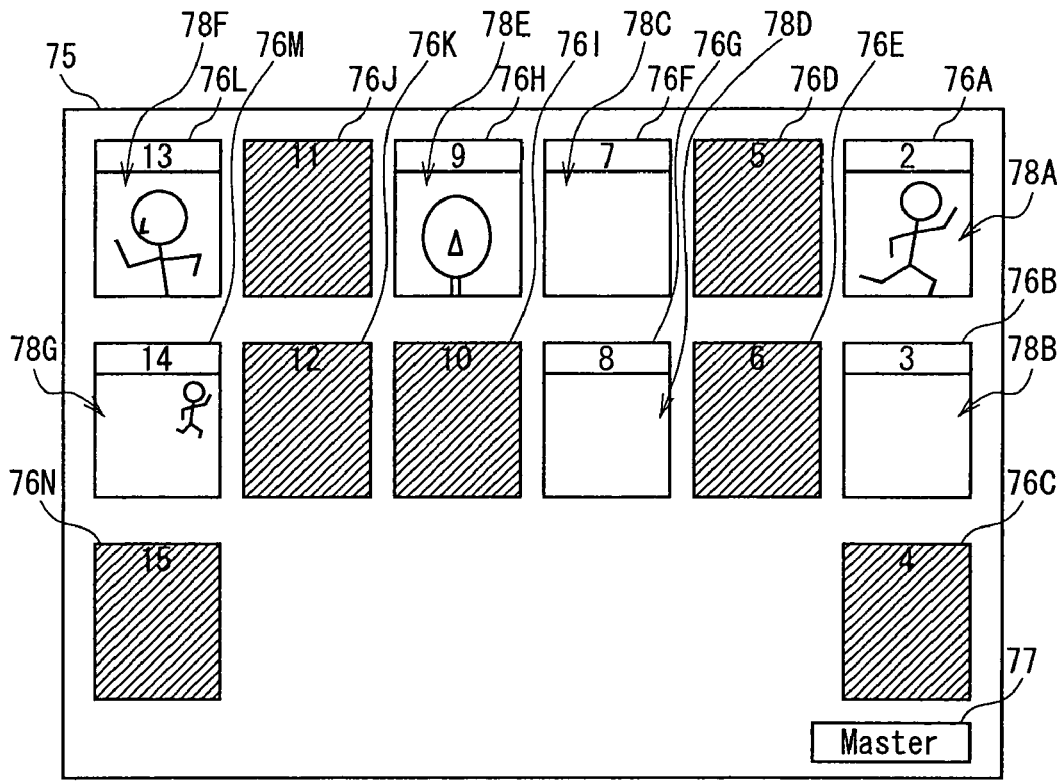
FIG. 23 is a schematic diagram showing a constitution of a screen for notifying a camera imaging state.

Consequently, the CPU 65 generates slave camera notification screen data for notifying a user, of the subordinately operable slave digital still cameras 62A to 62N present in the personal computer radio communication range on the basis of the subordinate operability notification data D61. At the same time, every time the CPU 65 acquires the imaged still image data D62 from the slave digital still cameras 62A to 62N, the CPU 65 combines the imaged still image data D62 with the slave camera notification screen data. The CPU 65 sends obtained camera photographing state notification screen data D64 to the display unit 70. Consequently, the CPU 65 displays a camera imaging state notification screen 75 shown in FIG. 23 based on the camera photographing state notification screen data D64 on the display unit 15.

The camera imaging state notification screen 75 is provided with plural imaged still image display areas 76A to 76N that can represent all the slave digital still cameras 62A to 62N registers as slaves to the master personal computer 61 and display an imaged still image based on the imaged still image data D62. The camera imaging state notification screen 75 is also provided with a photographing control execution notification icon 77 for notifying that the master personal computer 61 is executing control of picture photographing (and moving picture photographing) for the slave digital still cameras 62A to 62N as a master.

The camera imaging state notification screen 75 displays imaged still images 78A to 78G, which are based on the imaged still image data D62 acquired from the slave digital still cameras 62A to 62N, corresponding to imaged still image display areas 76A and 76B, 76F to 76H, and 76L and 76M for the slave digital still cameras 62A to 62N present in the personal computer radio communication range among the respective imaged still image display areas 76A to 76N.

In the camera imaging state notification screen 75, the images still image display areas 76C to 76E, 76I to 76K, and 76N for the slave digital still cameras 62A to 62N, which are not present in the personal computer radio communication range, and the imaged still image display areas 76A and 76B, 76F to 76H, and 76L and 76M for the slave digital still cameras 62A to 62N, which are present in the personal computer radio communication range, among the plural imaged still image display areas 76A to 76N are selected display states different from one another (colors, lighting and light-out, and the like of all the imaged still image display areas 76A to 76N).

Consequently, the CPU 65 can notify the user, of the slave digital still cameras 62A to 62N, which can subject a subject to picture photographing (and moving picture photographing) in the personal radio communication range under the control of the master personal computer 61, using the camera imaging state notification screen 75. At the same time, the CPU 65 can switch the imaged still images 78A to 78G sequentially like a slide show (i.e., switch the imaged still images 78A to 78G every time the imaged still image data D62 is captured at predetermined periods from the slave digital still cameras 62A to 62N) to display imaging state (an imaging direction, an imaging angle, etc.) of the subject in the slave digital still cameras 62A to 62N and cause the user to visually recognize the imaging states.

Incidentally, the CPU 65 can transmit the search signal S60A periodically while the picture photographing control processing is executed (while photographing control processing for moving picture photographing (hereinafter referred to as moving picture photographing control processing) to thereby cause the user to check the imaging states of the subject in the slave digital still cameras 62A to 62N while grasping the subordinately operable slave digital still cameras 62A to 62N present in the personal computer radio communication range.

In a state in which the camera imaging state notification screen 75 is displayed, when a photographing instruction is inputted from the operation unit 69 according to, for example, depressing operation of a photographing instruction input button equivalent to a shutter button, the CPU 65 reads out picture photographing condition information for the slave digital still cameras 62A to 62N, which are present in the personal computer radio communication range at a master photographing instruction input point when the photographing instruction inputted, from the hard disk of the hard disk drive 71. The CPU 65 generates picture photographing instruction data D65 in which the read-out picture photographing condition information is stored together with picture photographing instruction input date and time information at the master photographing instruction input point.

The CPU 65 sends the picture photographing instruction data D65 to the transmission/reception processing unit 72 and subjects the picture photographing instruction data D65 to transmission processing. The CPU 65 transmits an obtained picture photographing instruction signal S65 to the slave digital still cameras 62A to 62N present in the personal computer radio communication range from the antenna 73.

Consequently, the CPU 65 causes the subordinately operable slave digital still cameras 62A to 62N present in the personal computer radio communication range to subject the subject to picture photographing in accordance with picture photographing conditions, respectively, simultaneously with the master photographing instruction input point or a picture photographing point after elapse of picture photographing delay time from the master photographing instruction input point.

In this way, after causing the slave digital still cameras 62A to 62N to subject the subject to picture photographing, when a picture photographing control end instruction is inputted via the operation unit 69, the CPU 65 generates slave picture photographing end data D66 for causing the slave digital still cameras 62A to 62N present in the personal computer radio communication range to end the slave picture photographing processing. The CPU 65 sends this slave picture photographing end data D66 to the transmission/reception processing unit 72. The CPU 65 transmits an obtained slave picture photographing end signal S66 to the slave digital still cameras 62A to 62N from the antenna 73 and ends the picture photographing control processing.

When a moving picture photographing control instruction is inputted via the operation unit 69, the CPU 65 starts moving picture photographing control processing for the slave digital still cameras 62A to 62N.

In this case, the CPU 65 performs search to find whether the slave digital still cameras 62A to 62N in a subordinately operable state is present in the personal computer radio communication range. In addition, the CPU 65 generates search data D60B for causing the slave digital still cameras 62A to 62N to start slave moving picture photographing processing. The CPU 65 sends the search data D60B to the transmission/reception processing unit 72 and subjects the search data D60B to transmission processing. The CPU 65 transmits an obtained search signal S60B from the antenna 73.

As a result, the subordinately operable slave digital still cameras 62A to 62N present in the personal computer communication range starts the slave moving picture photographing processing in response to the search signal S60B and returns a subordinate operability notification signal S61. Then, the CPU 65 receives this subordinate operability notification signal S61 with the antenna 73 and subjects the subordinate operability notification signal S61 to reception processing in the transmission/reception processing unit 72. The CPU 65 captures obtained subordinate operability notification data D61.

Consequently, the CPU 65 recognizes the subordinately digital still cameras 62A to 62N capable of performing a slave operation for moving picture photographing present in the personal computer radio communication range on the basis of the subordinate operability notification data D61.

The CPU 65 generates camera imaging state notification screen data D64 and displays the camera imaging state notification screen 75 on the display unit 70 every time the CPU 65 receives an imaged still image signal S64 sequentially transmitted from the slave digital still cameras 62A to 62N present in the personal computer radio communication range as at the time of picture photographing control processing described above.

In a state in which the camera imaging state notification screen 75 is displayed, when a photographing instruction is inputted according to depressing operation of the photographing instruction input button from the operation unit 69, the CPU 65 reads out moving picture photographing condition information for the slave digital still cameras 62A to 62N, which are present in the personal computer radio communication range at a master photographing instruction input point when the photographing instruction is inputted, from the hard disk of the hard disk drive 71. The CPU 65 generates moving picture photographing instruction data D67 in which the read-out moving image photographing condition information is contained together with moving picture photographing instruction input date and time information at the master photographing instruction input point.

The CPU 65 sends the moving picture photographing instruction data D67 to the transmission/reception processing unit 72 and subjects the moving picture photographing instruction data D67 to transmission processing. The CPU 65 transmits an obtained moving picture photographing instruction signal S67 to the slave digital still cameras 62A to 62N present in the personal computer radio communication range from the antenna 73.

Consequently, the CPU 65 causes the subordinately operable slave digital still cameras 62A to 62N present in the personal computer radio communication range to start moving picture photographing for the subject in accordance with the moving picture photographing conditions substantially simultaneously with the master photographing instruction input point or at a moving picture photographing start point after elapse of moving picture photographing delay time based on the master photographing instruction input point and subject the subject to moving picture photographing over moving picture photographing time.

In this way, after causing the slave digital still cameras 62A to 62N to subject the subject to moving picture photographing, when a moving picture photographing control end instruction is inputted via the operation unit 69, the CPU 65 generates slave moving picture photographing end data D68 for causing the slave digital still cameras 62A to 62N present in the personal computer radio communication range to end the slave moving picture photographing processing. The CPU 65 sends this slave moving picture photographing end data D68 to the transmission/reception processing unit 72 and subjects the slave moving picture photographing end data D68 to transmission processing. The CPU 65 transmits an obtained slave moving picture photographing end signal S68 to the slave digital still cameras 62A to 62N from the antenna 73 and ends the moving picture photographing control processing.

Incidentally, for example, when a picture-photographed image acquisition instruction is inputted via the operation unit 69 after the end of the picture photographing control processing, the CPU 65 executes the picture-photographed image acquisition processing in the same manner as the master digital still camera 3 according to the first embodiment described above. The CPU 65 sends picture-photographed image request data D69 storing picture photographing instruction input date and time information to the transmission/reception processing unit 72 and subjects the picture-photographed image request data D69 to transmission processing. The CPU 65 transmits an obtained picture-photographed image request signal S69 to the slave digital still cameras 62A to 62N from the antenna 73.

Consequently, the CPU 65 receives the slave picture file signal S16 transmitted from the slave digital still cameras 62A to 62N, respectively, with the antenna 73 and takes the slave picture file signal S16 into the transmission/reception processing unit 72. The CPU 65 subjects the slave picture file signal S16 to reception processing in the transmission/reception processing unit 72. The CPU 65 records obtained slave picture file data D21 in the hard disk of the hard disk drive 71.

For example, after the end of the moving picture photographing control processing, when a moving-picture-photographed image acquisition instruction is inputted via the operation unit 69, the CPU 65 executes the moving-picture-photographed image acquisition processing in the same manner as the master digital still camera 3 according to the first embodiment described above. The CPU 65 transmits moving-picture-photographed image request data D70 storing moving picture photographing instruction input date and time information to the transmission/reception processing unit 72 and subjects the moving-picture-photographed image request data D70 to transmission processing. The CPU 65 transmits an obtained moving-picture-photographed image request signal S70 to the slave digital sill cameras 62A to 62N from the antenna 73.

Consequently, the CPU 65 receives the slave moving picture file signal S18 transmitted from the slave digital still cameras 62A to 62N, respectively, with the antenna 73 and takes the slave moving picture file signal S18 into the transmission/reception processing unit 72. The CPU 65 subjects the slave moving picture file signal S18 to reception processing in the transmission/reception processing unit 72. The CPU 65 records obtained slave moving picture file data D23 in the hard disk of the hard disk drive 71.

In this way, the CPU 65 collects and acquires the slave picture file data D21 and the slave moving picture file data D23 generated by causing the slave digital still cameras 62A to 62N to subject the subject to picture photographing and moving picture photographing subordinately.

In addition, when a picture-photographed image reproduction instruction is inputted via the operation unit 69, the CPU 65 executes photographed image reproduction processing (hereinafter referred to as picture-photographed-image reproduction processing) to reproduce the slave picture file data D21 from the hard disk of the hard disk drive 71 in order in time series according to a slave picture photographing date and time and transfers the slave picture file data D21 to the RAM 67.

The CPU 65 extracts and captures picture image compression coded data from the slave picture file data D21 sequentially transferred from the RAM 67. The CPU 65 stores slave picture-photographed image data D25, which is obtained by decoding the captured picture image compression coded data according to the compression coding system such as JPEG, in the RAM 67 again.

The CPU 65 reads out the slave picture-photographed image data D25, which is obtained by oldest picture photographing, from the RAM 67 and sends the slave picture photographing image data D25 to the display unit 70. Consequently, the CPU 65 displays a slave picture-photographed image based on the slave picture-photographed image data D25 on the display unit 70. In this case, every time a picture-photographed image switching instruction is inputted via the operation unit 69, the CPU 65 reads out the slave picture-photographed image data D25 from the RAM 67 in order in time series according to a slave picture photographing date and time and sends the slave picture-photographed image data D25 to the display unit 70. Consequently, the CPU 65 sequentially switches and displays a slave picture-photographed image on the display unit 70.

When a moving-picture-photographed image reproduction instruction is inputted via the operation unit 69, the CPU 65 executes photographed image reproduction processing (hereinafter referred to as moving-picture-photographed image reproduction processing). The CPU 65 reproduces the slave moving picture file data D23 from the hard disk of the hard disk drive 71 in order in time series according to a slave moving picture photographing start date and time and transfers the slave moving picture file data D23 to the RAM 67.

The CPU 65 extracts and captures moving picture compression coded data from the slave moving picture file data D23 sequentially transferred to the RAM 67. The CPU 65 stores slave moving-picture-photographed image data D26, which is obtained by decoding the captured moving image compression coded data according to the compression coding system such as MPEG, in the RAM 67 again.

The CPU 65 reads out the slave moving-picture-photographed image data D26 obtained by oldest moving picture photographing from the RAM 67 and sends the slave moving-picture-photographed image data D26 to the display unit 70. Consequently, the CPU 65 displays a slave moving-picture-photographed image based on the slave moving-image-photographed image data D26 on the display unit 70. In this case, every time a moving-picture-photographed image switching instruction is inputted via the operation unit 69, the CPU 65 reads out the slave moving-picture-photographed image data D26 from the RAM 67 in order in time series according to a slave moving picture photographing date and time and sends the slave moving-picture-photographed image data D26 to the display unit 70. Consequently, the CPU 65 sequentially switches and displays a slave moving-picture-photographed image on the display unit 70.

In this way, the CPU 65 can cause a user to view the slave picture-photographed image and the slave moving-picture-photographed image acquired from the slave digital still cameras 62A to 62N freely via the display unit 70.

On the other hand, the plural slave digital still cameras 62A to 62N basically have substantially the same circuit constitution as the slave digital still cameras 4A to 4N according to the first embodiment described above with reference to FIG. 5, respectively. However, since the slave digital still cameras 62A to 62N executes the slave picture photographing processing and the slave moving picture photographing processing under the control of the master personal computer 61, the slave digital still cameras 62A to 62N have a slightly different circuit constitution. Thus, the circuit constitution of the slave digital still cameras 62A to 62N will be explained below.

Figure 24:
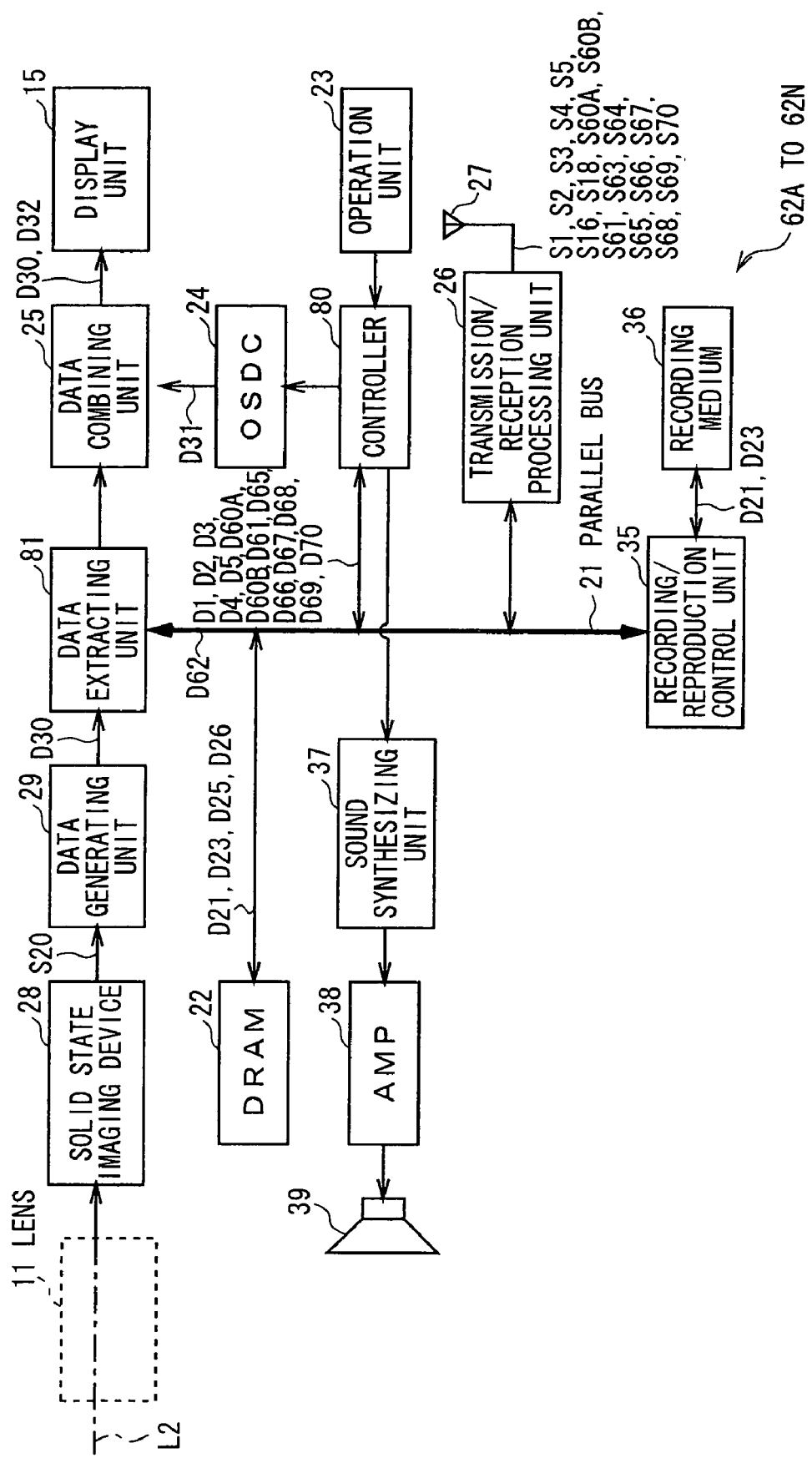
FIG. 24 is a block diagram showing a circuit constitution of a slave digital still camera.

In FIG. 24, components corresponding to those in FIG. 5 are denoted by the identical reference numerals and signs. In FIG. 24, in the slave digital still cameras 62A to 62N, a slave controller 80 having a CPU, a nonvolatile memory such as an SRAM, a ROM, and the like expands various application programs stored in the internal ROM in advance such as a slave photographing processing program, a slave registration processing program, and a photographed image provision processing program on the DRAM 22 according to various instructions inputted via the operation unit 23 and controls respective circuit units of the slave digital still cameras 62A to 62N totally. Through this control, the slave controller 80 executes slave picture photographing processing and slave moving picture photographing processing corresponding to the picture photographing control processing and the moving picture photographing control processing by the master personal computer 61, and executes picture-photographed image provision processing and moving-picture-photographed image provision processing. At the same time, the slave controller 80 executes the slave registration processing and the like for the master personal computer 61 in the same manner as the slave digital still cameras 4A to 4N according to the first embodiment described above.

When the slave controller 80 receives the search signal S60A, which is transmitted from the master personal computer 61 according to the execution of the picture photographing control processing, with the antenna 27, the slave controller 80 subjects the search signal S60A to reception processing in the transmission/reception processing unit 26. The slave controller 80 captures obtained search data D60A.

Consequently, the slave controller 80 starts slave picture photographing processing corresponding to the picture photographing control processing by the master personal computer 61 in accordance with the search data D60A and generates subordinate operability notification data D61. The slave controller 80 sends this subordinate operability notification data D61 to the transmission/reception processing unit 26 and subjects the subordinate operability notification data D61 to transmission processing. The slave controller 80 transmits an obtained subordinate operability notification signal S61 to the master personal computer 61 from the antenna 27.

At this point, the slave controller 80 starts imaging of a subject and generates imaged moving image data D30 and slave photographing notification screen data D31. The slave controller 80 sends the generated imaged moving image data D30 and slave photographing notification screen data D31 to the display unit 15 via the data combining unit 25. Consequently, the slave controller 80 displays the combined screen for slave photographing notification 41 described above with reference to FIG. 6 on the display unit 15.

When the slave controller 80 receives the imaged still image request signal S63 subsequently transmitted from the master personal computer 61 with the antenna 27, the slave controller 80 subjects the imaged still image request signal S63 to reception processing in the transmission/reception unit 26. The slave controller 80 captures obtained imaged still image request data D63.

Consequently, the slave controller 80 extracts imaged still image data equivalent to one imaged still image among temporally-continuous plural imaged still image data constituting the imaged moving image data D30, which is generated in the data generating unit 29, in a data extracting unit 81. The slave controller 80 sends the imaged still image data D62 to the transmission/reception processing unit 26 and subjects the imaged still image data D62 to transmission processing. The slave controller 880 transmits an obtained imaged still image signal S64 to the master personal computer 61 from the antenna 27.

In this way, in a state in which the slave controller 80 transmits the imaged still image signal S64 to the master personal computer 61 periodically while imaging the subject, when the slave controller 80 receives the picture photographing instruction signal S65 transmitted from the master personal computer 61 with the antenna 27, the slave controller 80 subjects the picture photographing instruction signal S65 to reception processing in the transmission/reception processing unit 26. The slave controller 80 captures obtained picture photographing instruction data D65.

At this point, the slave controller 80 extracts picture photographing instruction input date and time information and picture photographing condition information stored in the picture photographing instruction data D65. Consequently, the slave controller 80 extracts the slave picture-photographed image date D25 from the imaged moving image data D30 in accordance with picture photographing conditions based on a picture photographing instruction input date and time in the same manner as the slave digital still cameras 4A to 4N according to the first embodiment described above. The slave controller 80 stores the extracted slave picture-photographed image data D25 in the DRAM 22.

The slave controller 80 generates slave picture file data D21 on the basis of the slave picture-photographed image data D25 stored in the DRAM 22 and records the generated slave picture file data D21 in the recording medium 36.

In this way, after subjecting the subject to picture photographing subordinately in accordance with a photographing instruction given from the master personal computer 61, when the slave controller 80 receives a slave picture photographing end signal S66 transmitted from the master personal computer 61 with the antenna 27, the slave controller 80 subjects the slave picture photographing end signal S66 to reception processing in the transmission/reception processing unit 26. The slave controller 80 captures obtained slave picture photographing end data D66. Consequently, the slave controller 80 ends the slave picture photographing processing in accordance with the slave picture photographing end data D66.

When the slave controller 80 receives a search signal S60B, which is transmitted from the master personal computer 61 according to execution of the master moving picture photographing processing, with the antenna 27, the slave controller 80 subjects the search signal S60B to reception processing in the transmission/reception processing unit 26. The slave controller 80 captures obtained search data D60B.

Consequently, the slave controller 80 starts slave moving picture photographing processing corresponding to the moving picture photographing control processing by the master personal computer 61 in accordance with the search data D60B and generates subordinate operability notification data D61. The slave controller 80 sends this subordinate operability notification data D61 to the transmission/reception processing unit 26 and subjects the subordinate operability notification data D61 to transmission processing. The slave controller 80 transmits an obtained subordinate operability notification signal S61 to the master personal computer 61 from the antenna 27.

At this point, the slave controller 80 displays the combined screen for slave photographing notification 41 on the display unit 15 while imaging a subject as at the slave picture photographing processing time described above. In this state, when the slave controller 80 receives an imaged still image request signal S63 subsequently transmitted from the master personal computer 61 with the antenna 27, in response to imaged still image request signal S63, the slave controller 80 transmits an imaged still image signal S64 to the master personal computer 61 from the antenna 27.

In this way, in a state in which the slave controller 80 transmits the imaged still image signal S64 to the master personal computer 61 periodically while imaging the subject, when the slave controller 80 receives the moving picture photographing instruction signal S67 transmitted from the master personal computer 61 with the antenna 27, the slave controller 80 subjects the moving picture photographing instruction signal S67 to reception processing in the transmission/reception processing unit 26. The slave controller 80 captures obtained moving picture photographing instruction data D67.

At this point, the slave controller 80 extracts moving picture photographing instruction input date and time information and moving picture photographing condition information stored in the moving picture photographing instruction data D67. Consequently, the slave controller 80 extracts the slave moving-picture-photographed image date D26 from the imaged moving image data D30 in accordance with picture photographing conditions based on a picture photographing instruction input date and time in the same manner as the slave digital still cameras 4A to 4N according to the first embodiment described above. The slave controller 80 stores the extracted slave moving-picture-photographed image data D26 in the DRAM 22.

The slave controller 80 generates slave moving picture file data D23 on the basis of the slave moving-picture-photographed image data D26 stored in the DRAM 22 and records the generated slave moving picture file data D23 in the recording medium 36.

In this way, after subjecting the subject to moving picture photographing subordinately in accordance with a photographing instruction given from the master personal computer 61, when the slave controller 80 receives a slave moving picture photographing end signal S68 transmitted from the master personal computer 61 with the antenna 27, the slave controller 80 subjects the slave moving picture photographing end signal S68 to reception processing in the transmission/reception processing unit 26. The slave controller 80 captures obtained slave moving picture photographing end data D68. Consequently, the slave controller 80 ends the slave moving picture photographing processing in accordance with the slave moving picture photographing end data D68.

Incidentally, when the slave controller 80 receives a picture-photographed image request signal S69 transmitted from the master personal computer 61 with the antenna 27, the slave controller 80 executes the picture-photographed image provision processing in the same manner as the slave digital sill cameras 4A to 4N according to the first embodiment described above. Consequently, the slave controller 80 transmits slave picture file data D21, which is specified in accordance with picture photographing instruction input date and time information obtained on the basis of the picture-photographed image request signal S69, to the master personal computer 61 from the antenna 27 as a slave picture file signal S16.

When the slave controller 80 receives a moving-picture-photographed image request signal S70 transmitted from the master personal computer 61 with the antenna 27, the slave controller 80 executes the moving-picture-photographed image provision processing in the same manner as the slave digital sill cameras 4A to 4N according to the first embodiment described above. Consequently, the slave controller 80 transmits slave moving picture file data D23, which is specified in accordance with picture photographing instruction input date and time information obtained on the basis of the moving-picture-photographed image request signal S70, to the master personal computer 61 from the antenna 27 as a slave moving picture file signal S18.

Note that, in the case of the third embodiment, in the slave controller 80, when the own shutter button 14 is depressed, the slave digital still cameras 62A to 62N can photograph pictures and moving pictures of the subject independently from the master personal computer 61 regardless of whether the own slave digital still cameras 62A to 62N operate outside the personal computer radio communication range or operate in the personal computer radio communication range.

Consequently, the slave controller 80 actuates the slave digital still cameras 62A to 62N not only subordinately to the master personal computer 61 but also independently to improve convenience of use.

Figure 25:
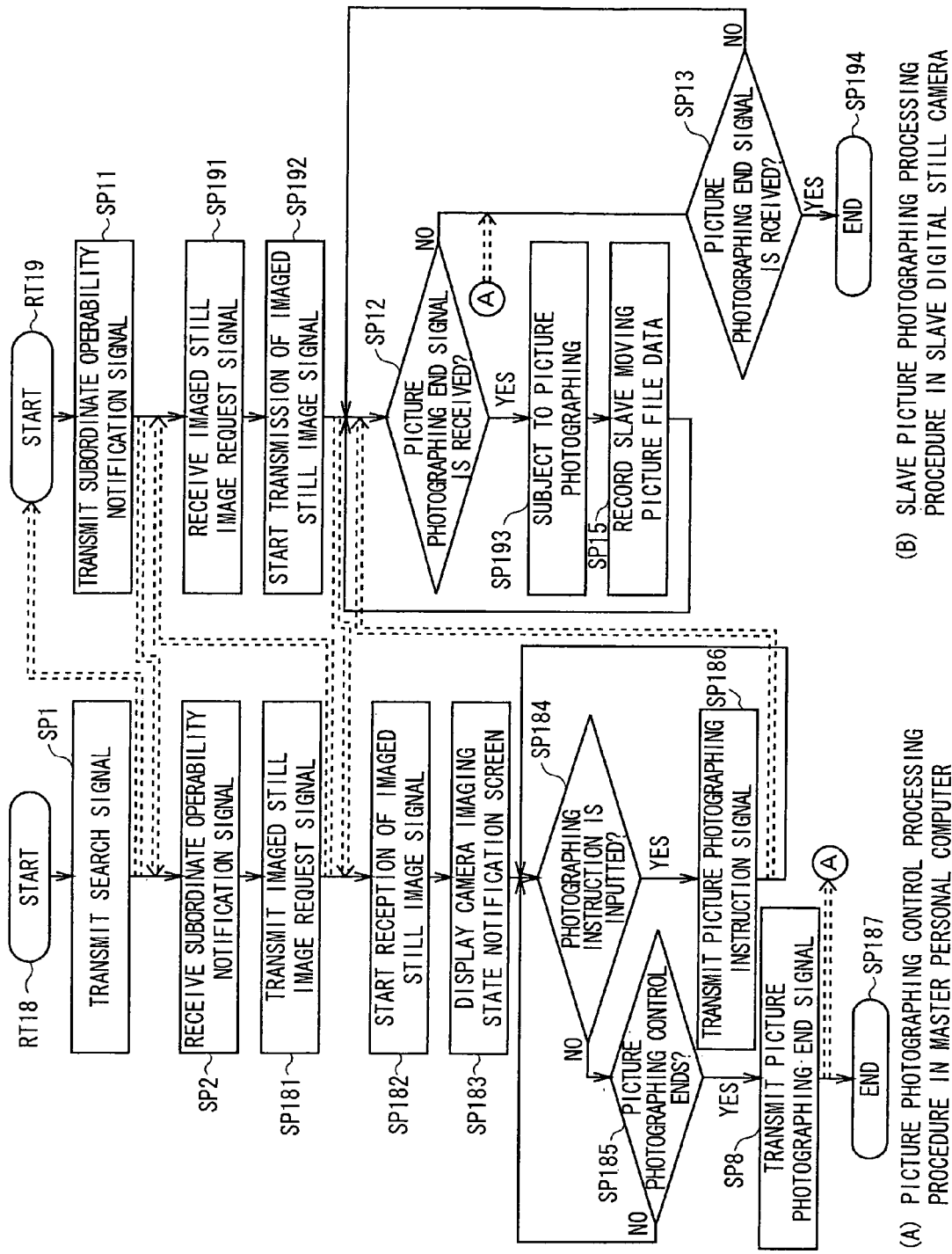
FIG. 25 is a flowchart showing a procedure for picture photographing processing in the photographing system according to the third embodiment.

A picture photographing processing procedure by the master personal computer 61 and the plural slave digital still camera 62A to 62N in the photographing system 60 is summarized as described below. As shown in FIG. 25(A) in which steps corresponding to those in FIG. 7(A) are denoted by the identical reference signs, first, when a picture photographing control instruction is inputted via the operation unit 69, the CPU 65 of the master personal computer 61 executes picture photographing control processing in accordance with a photographing control processing program. Consequently, the CPU 65 enters a picture photographing control processing procedure RT18 from a start step and sequentially executes processing in the following steps SP1 and SP2. Then, the CPU 65 shifts to step SP181.

In step SP181, the CPU 65 transmits an imaged still image request signal S63 to the slave digital still cameras 62A to 62N present in the personal computer radio communication range from the antenna 73 and shifts to the following step SP182.

At this point, as shown in FIG. 25(B) in which steps identical with those in FIG. 7(B), the slave controller 80 of each of the subordinately operable plural slave digital still cameras 62A to 62N present in the personal computer radio communication range executes the slave picture photographing processing in accordance with the slave photographing processing program in response to reception of the search signal S60A transmitted from the master personal computer 61. Consequently, the slave controller 80 enters a slave picture photographing processing procedure RT19 form a start step and executes processing in the following step SP11. Then, the slave controller 80 shifts to the following step SP191.

In step SP191, the slave controller 80 receives an imaged still image request signal S63 transmitted from the master personal computer 61 and shifts to the following step SP192.

In step S192, in accordance with the imaged still image request signal S63, the slave controller 80 extracts imaged still image data D62 equivalent to one imaged still image from the imaged moving image data D30 at a predetermined period. The slave controller 80 starts periodical transmission of an imaged still image signal S64 for transmitting the extracted imaged still image data D62 to the master personal computer 61 as the imaged still image signal S64. Then, the slave controller 80 shifts to the following step SP 12.

At this point, in step SP182, the slave controller 80 starts reception of the imaged still image signal S64 periodically transmitted from the slave digital still cameras 62A to 62N and shifts to the following step SP183.

In step S183, the CPU 65 displays the camera imaging state notification screen 75 on the display unit 70. Thereafter, the CPU 65 updates an imaged still image in the camera imaging state notification screen 75 every time the imaged still image signal S64 is received. Then, the CPU 65 shifts to the following step SP184.

In step SP184, the CPU 65 judges whether a photographing instruction is inputted.

When a negative result is obtained in this step SP184, this indicates that, for example, although plural imaged still images to be updated periodically in the camera imaging state notification screen 75 are viewed by the user, respectively, and an imaging state of the subject by the plural slave digital still cameras 62A to 62N is checked, the user has not depressed a photographing instruction input button because the user judges that a perfect moment for a good shot for picture photographing for the subject has not come yet. At this point, the CPU 65 shifts to step SP185.

In step SP185, the CPU 65 judges whether the picture photographing control for the slave digital still cameras 62A to 62N has ended.

When a negative result is obtained in this step SP185, this indicates that, since a picture photographing control end instruction has not been inputted via the operation unit 69 yet, it is still likely that the subject is subjected to picture photographing by the plural slave digital still cameras 62A to 62N. At this point, the CPU 65 returns to step SP184.

Consequently, thereafter, until positive results are obtained in step SP184 and step SP185, the CPU 65 repeats the processing in steps SP184 and SP185 cyclically to thereby wait for a photographing instruction to be inputted for picture photographing and a picture photographing control end instruction to be inputted.

When a positive result is obtained in step SP184, this indicates that, for example, the plural imaged still images to be updated periodically in the camera imaging state notification screen 75 are viewed by the user, respectively, and as a result, the photographing instruction input button is depressed because the user judges that a perfect moment for a good shot for picture photographing for the subject has come. At this point, the CPU 65 shifts to step SP186.

In step SP186, the CPU 65 transmits a picture photographing instruction signal S65 to the slave digital still cameras 62A to 62N in the personal computer radio communication range from the antenna 73 and shifts to step SP184.

Thereafter, the CPU 65 repeats the processing in steps SP184, SP185, and SP186 cyclically until a positive result is obtained in step SP185 to thereby cause the plural slave digital still cameras 62A to 62N to subject the subject to picture photographing every time a photographing instruction is inputted.

At this point, the slave controller 80 repeats processing in steps SP12 and SP13 cyclically and waits for picture photographing for the subject to be instructed from the master personal computer 61 and end of the slave picture photographing processing to be notified. When the slave controller 80 receives the picture photographing instruction signal S65 transmitted from the master personal computer 61 to obtain a positive result in step SP12, the slave controller 80 shifts to the following step SP193.

In step SP193, the slave controller 80 extracts slave picture-photographed image data D25 from the imaged moving image data D30 in accordance with picture photographing instruction input date and time information and picture photographing condition information obtained on the basis of the picture photographing instruction signal S65. After executing processing in the following step SP15, the slave controller 80 returns to step SP12.

In this way, until a positive result is obtained in step SP13, the slave controller 80 repeats the processing in steps SP12, SP13, SP193, and SP15 cyclically to thereby subject the subject to picture photographing every time picture photographing for the subject is instructed from the master personal computer 61.

When a positive result is obtained in step SP185 described above, this indicates that, since the user controls the plural slave digital still cameras 62A to 62N to subject the subject to picture photographing to the user's satisfaction, a picture photographing control end instruction is inputted. At this point, after executing processing in step SP8, the CPU 65 shifts to the following step SP187 and ends the picture photographing control processing procedure RT18.

At this point, the slave controller 80 receives a slave picture photographing end signal S66 transmitted from the master personal computer 61 according to the end of the picture photographing control processing and obtains a positive result in step SP13. Consequently, the slave controller 80 shifts to the following step SP194 and ends the slave picture photographing processing procedure RT19. In this way, the entire picture photographing processing procedure in the photographing system 60 ends.

Figure 26:
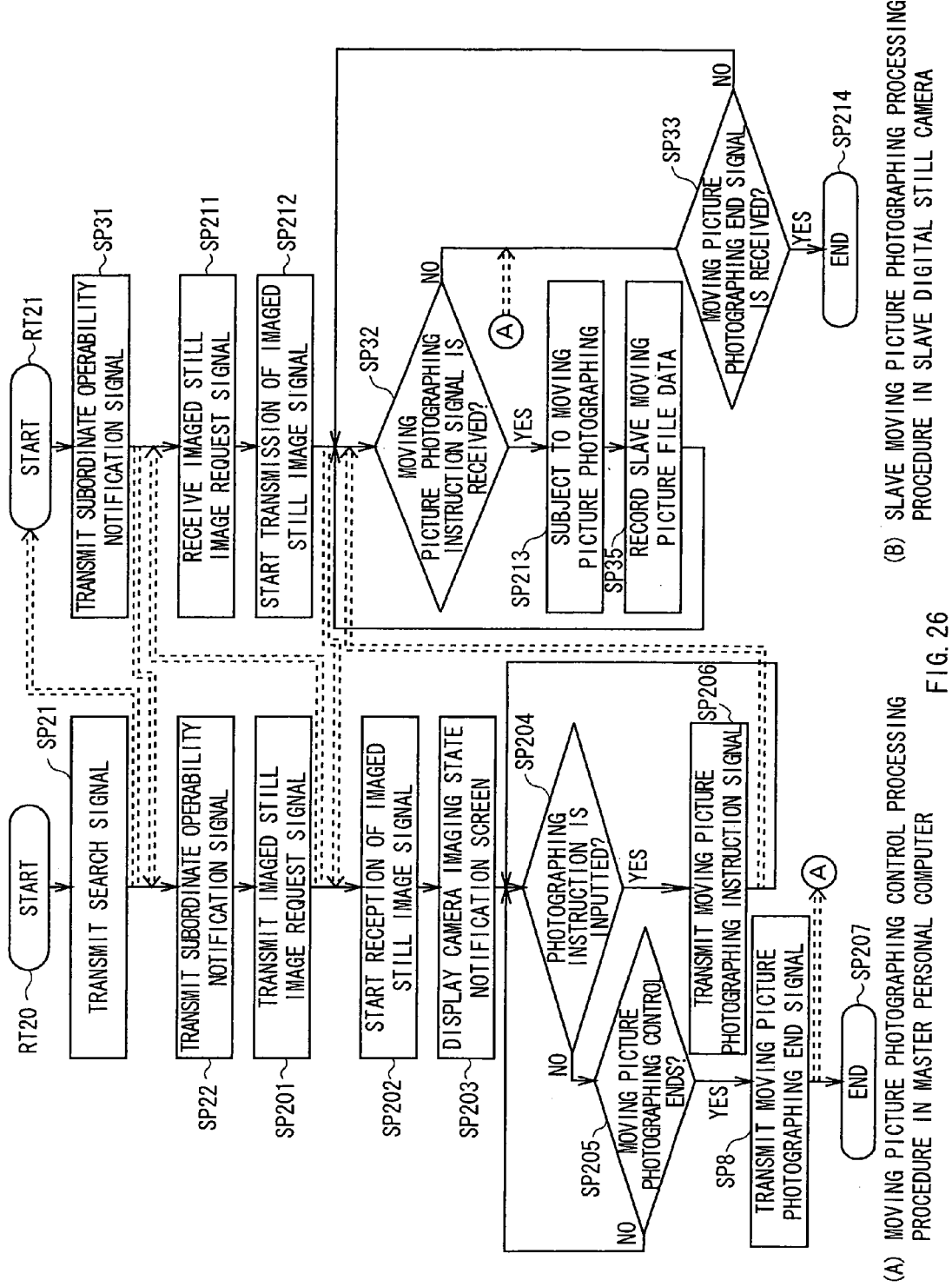
FIG. 26 is a flowchart showing a procedure for moving picture photographing processing in the photographing system according to the third embodiment.

A moving picture photographing processing procedure by the master personal computer 61 and the plural slave digital still cameras 62A to 62N in the photographing system 60 is summarized as described below. As shown in FIG. 26(A) in which steps corresponding to those in FIG. 9(A) are denoted by the identical reference signs, first, when a moving picture photographing control instruction is inputted via the operation unit 69, the CPU 65 of the master personal computer 61 executes moving picture photographing control processing in accordance with a photographing control processing program. Consequently, the CPU 65 enters a moving picture photographing control processing procedure RT20 from a start step and sequentially executes processing in the following steps SP21 and SP22. Then, the CPU 65 shifts to step SP201.

In step SP201, the CPU 65 transmits an imaged still image request signal S63 to the slave digital still cameras 62A to 62N present in the personal computer radio communication range from the antenna 73 and shifts to the following step SP202.

At this point, as shown in FIG. 26(B) in which steps identical with those in FIG. 9(B), the slave controller 80 of each of the subordinately operable plural slave digital still cameras 62A to 62N present in the personal computer radio communication range executes the slave moving picture photographing processing in accordance with the slave photographing processing program in response to reception of a search signal S60B transmitted from the master personal computer 61. Consequently, the slave controller 80 enters a slave moving picture photographing processing procedure RT21 from a start step and executes processing in the following step SP31. Then, the slave controller 80 shifts to the following step SP211.

In step SP211, the slave controller 80 receives an imaged still image request signal S63 transmitted from the master personal computer 61 and shifts to the following step SP212.

In step S212, in accordance with the imaged still image request signal S63, the slave controller 80 extracts imaged still image data D62 equivalent to one imaged still image from the imaged moving image data D30 at a predetermined period. The slave controller 80 starts for transmitting the extracted imaged still image data D62 to the master personal computer 61 as the imaged still image signal S64, periodical transmission of an imaged still image signal S64. Then, the slave controller 80 shifts to the following step SP 32.

At this point, in step SP202, the CPU 65 starts reception of the imaged still image signal S64 periodically transmitted from the slave digital still cameras 62A to 62N and shifts to the following step SP203.

In step S203, the CPU 65 displays the camera imaging state notification screen 75 on the display unit 70. Thereafter, the CPU 65 updates an imaged still image in the camera imaging state notification screen 75 every time the imaged still image signal S64 is received. Then, the CPU 65 shifts to the following step SP204.

In step SP204, the CPU 65 judges whether a photographing instruction is inputted.

When a negative result is obtained in this step SP204, this indicates that, for example, although plural imaged still images to be updated periodically in the camera imaging state notification screen 75 are viewed by the user, respectively, and an imaging state of the subject by the plural slave digital still cameras 62A to 62N is checked, the user has not depressed a photographing instruction input button because the user judges that a perfect moment for a good shot for moving picture photographing for the subject has not come yet. At this point, the CPU 65 shifts to step SP205.

In step SP205, the CPU 65 judges whether the moving picture photographing control for the slave digital still cameras 62A to 62N has ended.

When a negative result is obtained in this step SP205, this indicates that, since a moving picture photographing control end instruction has not been inputted via the operation unit 69 yet, it is still likely that the subject is subjected to moving picture photographing by the plural slave digital still cameras 62A to 62N. At this point, the CPU 65 returns to step SP204.

Consequently, thereafter, until positive results are obtained in step SP204 and step SP205, the CPU 65 repeats the processing in steps SP204 and SP205 cyclically to thereby wait for moving picture photographing to be instructed for moving picture photographing and a moving picture photographing control end instruction to be inputted.

When a positive result is obtained in step SP204, this indicates that, for example, the plural imaged still images to be updated periodically in the camera imaging state notification screen 75 are viewed by the user, respectively, and as a result, the photographing instruction input button is depressed because the user judges that a perfect moment for a good shot for moving picture photographing for the subject has come. At this point, the CPU 65 shifts to step SP206.

In step SP206, the CPU 65 transmits a moving picture photographing instruction signal S67 to the slave digital still cameras 62A to 62N in the personal computer radio communication range from the antenna 73 and shifts to step SP204.

Thereafter, the CPU 65 repeats the processing in steps SP204, SP205, and SP206 cyclically until a positive result is obtained in step SP205 to thereby cause the plural slave digital still cameras 62A to 62N to subject the subject to moving picture photographing every time a photographing instruction is inputted.

At this point, the slave controller 80 repeats processing in steps SP32 and SP33 cyclically and waits for moving picture photographing for the subject to be instructed from the master personal computer 61 and end of the slave moving picture photographing processing to be notified. When the slave controller 80 receives the moving picture photographing instruction signal S67 transmitted from the master personal computer 61 to obtain a positive result in step SP32, the slave controller 80 shifts to the following step SP213.

In step SP213, the slave controller 80 extracts slave moving-picture-photographed image data D26 from the imaged moving image data D30 in accordance with moving picture photographing instruction input date and time information and moving picture photographing condition information obtained on the basis of the moving picture photographing instruction signal S67. After executing processing in the following step SP35, the slave controller 80 returns to step SP32.

In this way, until a positive result is obtained in step SP33, the slave controller 80 repeats the processing in steps SP32, SP33, SP213, and SP35 cyclically to thereby subject the subject to moving picture photographing every time moving picture photographing for the subject is instructed from the master personal computer 61.

When a positive result is obtained in step SP205 described above, this indicates that, since the user controls the plural slave digital still cameras 62A to 62N to subject the subject to moving picture photographing to the user's satisfaction, a moving picture photographing control end instruction is inputted. At this point, after executing processing in step SP8, the CPU 65 shifts to the following step SP207 and ends the moving picture photographing control processing procedure RT20.

At this point, the slave controller 80 receives a slave moving picture photographing end signal S68 transmitted from the master personal computer 61 according to the end of the moving picture photographing control processing and obtains a positive result in step SP33. Consequently, the slave controller 80 shifts to the following step SP214 and ends the slave moving picture photographing processing procedure RT21. In this way, the entire moving picture photographing processing procedure in the photographing system 60 ends.

Incidentally, concerning the picture-photographed image acquisition processing procedure by the master personal computer 61 and the plural slave digital still cameras 62A to 62N in the photographing system 60, acquisition processing for picture-photographed image is executed basically in the same procedure as the picture-photographed image acquisition processing procedure described above with reference to FIGS. 11(A) and 11(B) except that the picture-photographed image request data D69 storing the picture photographing instruction input date and time information is used as the picture-photographed image request signal S69. Thus, an explanation using a flowchart is omitted.

In addition, concerning the moving-picture-photographed image acquisition processing procedure by the master personal computer 61 and the plural slave digital still cameras 62A to 62N in the photographing system 60, acquisition processing for moving-picture-photographed image is executed basically in the same procedure as the moving-picture-photographed image acquisition processing procedure described above with reference to FIGS. 12(A) and 12(B) except that the moving-picture-photographed image request data D70 storing the moving picture photographing instruction input date and time information is used as the moving-picture-photographed image request signal S70. Thus, an explanation using a flowchart is omitted.

In the constitution described above, at the picture photographing processing time, the photographing system 60 periodically acquires imaged still image data D62, which is generated by imaging a subject from plural directions, from the plural slave digital still cameras 62A to 62N, respectively, in the master personal computer 61. The photographing system 60 causes a user to view an imaging state of the subject from plural directions by the plural digital still cameras 62A to 62N while periodically updating an imaged still image based on the imaged still image data D62 in the camera imaging state notification screen 75 displayed on the display unit 70 (steps SP1 to SP183 and steps SP11 to SP192).

In this state, when a photographing instruction is inputted in the master personal computer 61, the photographing system 60 transmits a picture photographing instruction signal S65 to the plural slave digital still cameras 62A to 62N (steps SP184 to SP186). Consequently, the photographing system 60 subjects the subject to picture photographing in accordance with picture photographing conditions selected in advance using the plural slave digital still cameras 62A to 62N, respectively (steps SP12 to SP15).

At the moving picture photographing processing time, the photographing system 60 periodically acquires imaged still image data D62, which is generated by imaging a subject from plural directions, from the plural slave digital still cameras 62A to 62N, respectively, in the master personal computer 61. The photographing system 60 causes a user to view an imaging state of the subject from plural directions by the plural digital still cameras 62A to 62N while periodically updating an imaged still image based on the imaged still image data D62 in the camera imaging state notification screen displayed on the display unit 70 (steps SP21 to SP203 and steps SP31 to SP212).

In this state, when a photographing instruction is inputted in the master personal computer 61, the photographing system 60 transmits a moving picture photographing instruction signal S67 to the plural slave digital still cameras 62A to 62N (steps SP204 to SP206). Consequently, the photographing system 60 subjects the subject to moving picture photographing in accordance with moving picture photographing conditions selected in advance using the plural slave digital still cameras 62A to 62N, respectively (steps SP32 to SP35).

Therefore, the photographing system 60 can subject a subject to picture photographing and moving picture photographing by causing a user to judge a perfect moment for a good shot from any imaging state of the subject in the slave digital still cameras 62A to 62N while causing the user to check an imaging state of the subject from plural directions by the plural slave digital still cameras 62A to 62N in the master personal computer 61.

According to the constitution described above, the photographing system 60 causes a user to check an imaging state of a subject by the plural slave digital still cameras 62A to 62N in the master personal computer 61 and, in that state, at a point when a photographing instruction is inputted from the master personal computer 61, transmits a picture photographing instruction signal S65 and a moving picture photographing instruction signal S67 to the plural slave digital still cameras 62A to 62N to subject the subject to picture photographing and moving picture photographing. Consequently, in addition to the feasibility obtained by the first embodiment described above, it is possible to subject a subject to picture photographing and moving picture photographing on the basis of any imaging state of the subject in the plural slave digital still camera 62A to 62N. As a result, it is possible to subject the subject to picture photographing and moving picture photographing in a photographing state matching preference of a user for the subject without missing a perfect moment for a good shot from plural directions with respect to the subject.

Note that, in the third embodiment described above, a picture-photographed image is displayed when the picture-photographed-image display processing is executed in the master personal computer 61 and a moving-picture-photographed image is displayed when the moving-picture-photographed processing is executed. However, the invention is not limited to this. A picture-photographed image and a moving-picture-photographed image may be displayed in a mixed state when one photographed image display processing is executed in the master personal computer 61.

In the third embodiment described above, slave moving-picture-photographed image data D26 is extracted from imaged moving image data D30 when a subject is subjected to moving image photographing in the plural slave digital still cameras 62A to 62N. However, the invention is not limited to this. It is also possible that the slave moving-picture-photographed image data D26 is extracted when a subject is subjected to moving picture photographing in the plural slave digital still cameras 62A to 62N, sound data is generated concurrently by collecting sounds around the subject in synchronization with the extraction of the data, and the generated sound data is recorded as a result of the moving picture photographing together with the slave moving-picture-photographed image data D26.

In the third embodiment described above, picture photographing conditions and moving picture photographing conditions for the plural slave digital still cameras 62A to 62N are selected and held arbitrarily in the master personal computer 61. However, the invention is not limited to this. The plural slave digital still cameras 62A to 62N may select and hold own picture photographing conditions and moving picture photographing conditions arbitrarily or the plural slave digital still cameras 62A to 62N may hold picture photographing conditions and moving picture photographing conditions selected arbitrarily by the master personal computer 61.

In the third embodiment described above, the picture photographing instruction signal S65 and the moving picture photographing instruction signal S67 are transmitted to the plural slave digital still cameras 62A to 62N at a master photographing instruction input point when a photographing instruction is inputted from the master personal computer 61. However, the invention is not limited to this. The master personal computer 61 may transmit the picture photographing instruction signal S65 and the moving picture photographing instruction signal S67 to the plural slave digital still cameras 62A to 62N at a master photographing instruction input point or a picture photographing point and a moving picture photographing start point after elapse of picture photographing delay time and moving picture photographing delay time from the master photographing instruction input point in accordance with picture photographing conditions and moving picture photographing conditions, respectively.

In the third embodiment described above, the slave picture image data D25 and the slave moving picture image data D26, which are generated by subjecting a subject to picture photographing and moving picture photographing subordinately in the plural slave digital still cameras 62A to 62N, are collected and recorded in the master personal computer 61 collectively. However, the invention is not limited to this. A part of the slave picture image data D25 and the slave moving picture photographed image data D26, which are generated by the plural slave digital still cameras 62A to 62N, respectively, may be collected and recorded in the master personal computer 61. The slave picture file data D25 and the slave moving picture file data D26 may be shared and recorded by the master personal computer 61 and the plural slave digital still cameras 62A to 62N, respectively. The slave digital still cameras 62A to 62N may be caused to select arbitrarily whether the plural slave digital still cameras 62A to 62N provide the master personal computer 61 with the slave picture-photographed image data D25 and the slave moving-picture-photographed image data D26.

In the third embodiment described above, the master personal computer 61 executes picture photographing control processing and moving picture photographing control processing and, then, executes picture-photographed image acquisition processing and moving-picture-photographed image acquisition processing to acquire the slave picture file data D21 and the slave moving picture file data D23 from the plural slave digital still camera 62A to 62N. However, the invention is not limited to this. It is possible that the picture-photographed image acquisition processing is incorporated in the picture photographing control processing and the moving-picture-photographed image acquisition processing is incorporated in the moving picture photographing control processing in the master personal computer 61, and the master personal computer 61 acquires the slave picture file data D21 and the slave moving picture file data D23 sequentially from the plural slave digital still cameras 62A to 62N every time a subject is subjected to picture photographing and moving picture photographing while executing the picture photographing control processing and the moving picture photographing control processing.

The master personal computer 61 and/or the plural slave digital still cameras 62A to 62N may be adapted to acquire, when startup stop instructions are inputted thereto, respectively, the slave picture file data D21 and the slave moving picture file data D23 while stopping startup outwardly. Consequently, since the CPU 65 and the slave controller 80 are caused to stop other functions such as picture photographing and moving picture photographing, it is possible to acquire the slave picture file data D21 and the slave moving picture file data D23 with significantly reduced processing loads.

In the third embodiment described above, the master personal computer 61 and the plural slave digital still cameras 62A to 62N execute the picture photographing control processing and the slave picture photographing processing, or the moving picture photographing control processing and the slave moving picture photographing processing separately. However, the invention is not limited to this. The master personal computer 61 and the plural slave digital still cameras 62A to 62N may execute the picture photographing control processing with the moving picture photographing control processing, and the slave picture photographing processing with the slave moving picture photographing processing in a mixed state. When the picture photographing control processing with the moving picture photographing control processing, and the slave picture photographing processing with the slave moving picture photographing processing are mixed, the master personal computer 61 and the plural slave digital still cameras 62A to 62N may be caused to select a combination of the respective kinds of processing arbitrarily. Consequently, it is possible to execute both picture photographing and moving picture photographing together. As a result, when a user wishes to photograph a subject, it is possible to record a state of the subject as both a picture-photographed image and a moving-picture-photographed image.

In the third embodiment described above, moving picture photographing time is set in advance for the slave digital still cameras 62A to 62N. However, the invention is not limited to this. The moving picture photographing time does not have to be set specifically and the plural slave digital still camera 62A to 62N may execute moving picture photographing for desired moving picture photographing time in order and continuously to realize the following. For example, in the case of the moving picture photographing, at a point when the master personal computer 61 and the slave digital still cameras 62A to 62N perform normal communication and the master personal computer 61 instructs moving picture photographing, a first one of the slave digital still cameras 62A to 62N starts moving picture photographing in accordance with an order set in advance. At a point when the moving picture photographing is finished in the slave digital still camera because, for example, the shutter button 14 is depressed once gain, a second one of the slave digital still cameras 62A to 62N starts moving picture photographing. After a last one of the slave digital still cameras 62A to 62N starts moving picture photographing, all kinds of moving picture photographing are finished because, for example, the shutter button 14 is depressed twice continuously.

Consequently, it is possible to execute the moving picture photographing described above with reference to FIG. 10 freely without being restricted by prior processing for selecting moving picture photographing conditions and moving picture photographing time selected previously.

In the third embodiment described above, a single user uses the master personal computer 61 and the plural slave digital still cameras 62A to 62N. However, the invention is not limited to this. Different users may use the master personal computer 61 and the plural slave digital still cameras 62A to 62N, respectively.

Moreover, in the third embodiment described above, the imaged still image data D62, which is extracted periodically from the imaged moving image data D30 generated by imaging a subject with the plural slave digital still cameras 62A to 62N, respectively, at picture photographing processing time and moving picture photographing processing time, is taken into the master personal computer 61 to update and display an imaged still image based on the imaged still image data D62 in the camera imaging state notification screen 75. However, the invention is not limited to this. The imaged moving image data D30, which is generated by imaging a subject with the plural slave digital still cameras 62A to 62N at picture photographing processing time and moving picture photographing processing time, may be taken into the master personal computer 61 directly to display an imaged moving image based on the imaged moving image data D30 in the camera imaging state notification screen 75. Consequently, compared with the case in which the imaged still image data D62 is taken into the master personal computer 61 periodically, an imaging state of a subject can always be checked as an imaged moving image. Thus, it is possible to prevent a perfect moment for a good shot from being missed almost surely.

OTHER EMBODIMENTS

Note that, in the first to the third embodiments described above, the master digital still camera 3 and the slave digital still cameras 4A to 4N execute the picture photographing processing procedure described above with reference to FIGS. 7(A) and 7(B), the moving picture photographing processing procedure described above with reference to FIGS. 9(A) and 9(B), the picture-photographed image acquisition processing procedure described above with reference to FIGS. 11(A) and 11(B), and the moving-picture-photographed image acquisition processing procedures described above with reference to FIGS. 12(A) and 12(B) in accordance with the master photographing processing program and the photographed image acquisition processing program stored in the ROM inside the master controller 20 in advance and the slave photographing processing program and the photographed image provision processing program stored in the ROM inside the slave controller 40 in advance. However, the invention is not limited to this. The picture photographing processing procedure, the moving picture photographing procedure, the picture-photographed image acquisition processing procedure, and the moving-picture-photographed image acquisition processing procedure may be executed by installing the master photographing processing program, the photographed image acquisition processing program, the slave photographing processing program, and the photographed image provision processing program in the master digital still camera 3 and the slave digital still cameras 4A to 4N using wire or radio communication media such as a local area network, the Internet, and a digital satellite broadcast. Alternatively, the picture photographing processing procedure, the moving picture photographing processing procedure, the picture-photographed image acquisition processing procedure, and the moving-picture-photographed image acquisition processing procedure may be executed by installing a program storage medium, in which the master photographing processing program, the photographed image acquisition processing program, the slave photographing processing program, and the photographed image provision processing program are stored, in the master digital still camera 3 and the slave digital still cameras 4A to 4N.

The digital still cameras 51A to 51N execute the master slave setting processing procedure described above with reference to FIG. 16, the picture photographing processing procedure described above with reference to FIGS. 17(A) and (B), the moving picture photographing processing procedure described above with reference to FIGS. 18(A) and 18(B), the picture-photographed image sharing processing procedure described above with reference to FIGS. 19(A) and 19(B), and the moving-picture-photographed image sharing processing procedure described above with reference to FIGS. 20(A) and 20(B) in accordance with the master slave setting processing program, the master photographing processing program, the slave photographing processing program, and the photographed image sharing processing program stored in the ROM inside the controller 55 in advance. However, the invention is not limited to this. The master slave setting processing procedure, the picture photographing processing procedure, the moving picture photographing processing procedure, the picture-photographed image sharing processing procedure, and the moving-picture-photographed image sharing processing procedure may be executed by installing the master slave setting processing program, the master photographing processing program, the slave photographing processing program, and the photographed image sharing processing program in the digital still cameras 51A to 51N using wire and radio communication media such as a local area network, the Internet, and a digital satellite broadcast. Alternatively, the master slave setting processing procedure, the picture photographing processing procedure, the moving picture photographing processing procedure, the picture-photographed image sharing processing procedure, and the moving-picture-photographed image sharing processing procedure may be executed by installing a program storage medium, in which the master slave setting processing program, the master photographing processing program, the slave photographing processing program, and the photographed image sharing processing program are stored, in the digital still cameras 51A to 51N.

Moreover, the master personal computer 61 and the slave digital still cameras 62A to 62N executes the picture photographing processing procedure described above with reference to FIGS. 25(A) and 25(B) and the moving picture photographing processing procedure described above with reference to FIGS. 26(A) and 26(B) in accordance with the photographing control processing program stored in the ROM 68 in advance and the slave photographing processing program stored in the ROM inside the slave controller 80 in advance. However, the invention is not limited to this. The picture photographing processing procedure and the moving picture photographing processing procedure may be executed by installing the photographing control processing program and the slave photographing processing program in the master personal computer 61 and the slave digital still cameras 62A to 62N using wire and radio communication media such as a local area network, the Internet, and a digital satellite broadcast. Alternatively, the picture photographing processing procedure and the moving picture photographing processing procedure may be executed by installing a program storage medium, in which the photographing control processing program and the slave photographing processing program are stored, in the master personal computer 61 and the slave digital still cameras 62A to 62N.

Incidentally, the program storage media for installing the master photographing processing program, the slave photographing processing program, the photographed image acquisition processing program, the photographed image provision processing program, the master slave setting processing program, the photographed image sharing processing program, and the photographing control processing program for executing the picture photographing processing procedure, the moving picture photographing processing procedure, the picture-photographed image acquisition processing procedure, the moving-picture-photographed image acquisition processing procedure, the master slave setting processing procedure, the picture-photographed image sharing processing procedure, and the moving-picture-photographed image sharing processing procedure in the master digital still camera 3, the slave digital still cameras 4A to 4N and 62A to 62N, the digital still cameras 51A to 51N, and the master personal computer 61 and bringing the program into an executable state may be realized not only by package media such as a flexible disk, a CD-ROM (Compact Disc-Read Only Memory) and a DVD (Digital Versatile Disc) but also by a semiconductor memory, a magnetic disk, or the like in which the master photographing processing program, the slave photographing processing program, the photographed image acquisition processing program, the photographed image provision processing program, the master slave setting processing program, the photographed image sharing processing program, and the photographing control processing program are stored temporarily or permanently. As means for storing the master photographing processing program, the slave photographing processing program, the photographed image acquisition processing program, the photographed image provision processing program, the master slave setting processing program, the photographed image sharing processing program, and the photographing control processing program in the program storage media, wire and radio communication media such as a local area network, the Internet, and a digital satellite broadcast may be used. Alternatively, the programs may be stored via various communication interfaces such as a router and a modem.

In the first to the third embodiments described above, the photographing system according to the invention is applied to the photographing systems 1, 50, and 60 described above with reference to FIGS. 1 to 26. However, the invention is not limited to this. It is possible to apply the photographing system according to the invention to a wide variety of other photographing systems such as a photographing system established by using a digital video camera, a personal computer with camera, a cellular phone with camera, and a PDA (Personal Digital Assistance) with camera independently as plural photographing apparatuses, which photograph a subject as subordinates for a photographing master apparatus, or using these photographing apparatuses and digital still cameras in a mixed state and established by connecting the apparatuses by radio or wire communication, or a photographing system using a cellular phone, a PDA, or the like instead of a master personal computer as a photographing master apparatus serving as a master of photographing for a subject.

In the first to the third embodiments described above, the master digital still camera 3, the digital still cameras 51A to 51N, and the master personal computer 61 are applied as a photographing master apparatus that makes connection with plural slave photographing apparatuses for photographing a subject subordinately by communication and serves as a master of photographing for the subject. However, the invention is not limited to this. It is possible to apply a wide variety of other photographing master apparatuses such as a digital video camera, a desk-top personal computer, a cellular phone, and a PDA.

In the first to the third embodiments, the shutter button 14 and the photographing instruction input button described above with reference to FIGS. 1 to 26 are applied as photographing instruction input means for causing a user to input a photographing instruction for a subject at an arbitrary point. However, the invention is not limited to this. It is possible to apply a wide variety of other photographing instruction input means such as a touch panel and a pointing device as long as the photographing instruction input means can input a photographing instruction for a subject.

In the first to the third embodiments, the transmission/reception processing units 26 and 72 and the antennas 27 and 73 described above with reference to FIGS. 1 to 26 are applied as photographing instruction data transmitting means for causing respective slave photographing apparatuses to photograph a subject when a photographing instruction is inputted via the photographing instruction input means to thereby transmit photographing instruction data for generating slave photographed image data corresponding to a photographed image of the subject and recording the slave photographed image data to the respective slave photographing apparatuses. However, the invention is not limited to this. It is possible to apply a wide variety of other photographing instruction data transmitting means such as an interface circuits for wire connection.

In the first to the third embodiments described above, the transmission/reception processing units 26 and 72 and the antennas 27 and 73 described above with reference to FIGS. 1 to 26 are applied as photographed image data receiving means for receiving slave photographed image data transmitted from respective slave photographing apparatuses. However, the invention is not limited to this. It is possible to apply a wide variety of other photographed image data receiving means such as an interface circuit for wire connection.

In the first to the third embodiments described above, the recording/reproduction control unit 35, the recording medium 36, and the hard disk drive 71 described above with reference to FIGS. 1 to 26 are applied as master recording means for recording slave photographed image data received by the photographed image data receiving means. However, the invention is not limited to this. It is possible to apply a wide variety of other master recording means such as a magneto-optical disk and a built-in semiconductor memory.

In the first to the third embodiments, the lens 11, the solid state imaging device 28, the data generating unit 29, the data extracting unit 30, the master controller 20, and the controller 55 described above with reference to FIGS. 1 to 26 are applied as master photographed image data generating means for photographing a subject at a photographing instruction input point when a photographing instruction is inputted via the photographing instruction input means to thereby generate master photographed image data. However, the invention is not limited to this. It is possible to apply a wide variety of other master photographed image data generating means as long as the master photographed image data generating means can generate master photographed image data corresponding to a photographed image of the subject by photographing a subject at a photographing instruction input point when a photographing instruction is inputted via the photographing instruction input means.

In the first to the third embodiments, the controller 55 described above with reference to FIGS. 1 to 26 is applied as image data group generating means for consolidating other slave photographed image data excluding only slave photographed image data, which is generated by a slave photographing apparatus to be a transmission partner, with master photographed image data to generate a photographed image data group for sharing. However, the invention is not limited to this. It is possible to apply a wide variety of other image data group generating means such as a CPU and a microprocessor.

In the first to the third embodiments described above, the transmission/reception processing unit 26 and the antenna 27 described above with reference to FIGS. 1 to 26 are applied as image data group transmitting means for transmitting photographed image data group for sharing generated by the image data group generating means to a slave photographing apparatus to be a transmission partner in order to share master photographed image data and slave photographed image data with respective slave photographing apparatuses. However, the invention is not limited to this. It is possible to apply a wide variety of other image data group transmitting means such as an interface circuit for wire connection.

In the first to the third embodiments described above, the shutter button 14, which can be pressed halfway, described above with reference to FIGS. 1 to 26 is applied as setting request input means for inputting a master setting request for setting a photographing apparatus as a master of photographing for a subject by respective slave photographing apparatus. However, the invention is not limited to this. It is possible to apply a wide variety of other setting request input means such as a dedicated button or a touch panel for inputting a master setting request.

In the first to the third embodiments described above, the transmission/reception processing unit 26 and the antenna 27 described above with reference to FIGS. 1 and 26 are applied as setting declaration data receiving means for receiving master setting declaration data that is transmitted from respective slave photographing apparatuses in order to set the slave photographing apparatuses as a master of photographing for a subject and declare setting of a master. However, the invention is not limited to this. It is possible to apply a wide variety of other setting declaration data receiving means such as an interface circuit for wire connection.

In the first to the third embodiments described above, the controller 55 described above with reference to FIGS. 1 to 26 is applied as master slave setting means for, on the basis of a master setting request inputted via the setting request input means and master setting declaration data received by the setting declaration data receiving means, when a master setting request is inputted at a point earlier than a slave photographing apparatus is set as a master, setting a photographing apparatus as a master of photographing for a subject by respective slave apparatuses and, when a slave photographing apparatus is set as a master at a point earlier than a master setting request is inputted, setting a photographing apparatus as a slave of the slave photographing apparatus set as a master so as to photograph the subject subordinately. However, the invention is not limited to this. It is possible to apply a wide variety of other master slave setting means such as a CPU and a microprocessor.

In the first to the third embodiments described above, the slave digital still cameras 4A to 4N and 62A to 62N and the digital still cameras 51A to 51N described above with reference to FIGS. 1 to 26 are applied as slave photographing apparatus that make connection with a photographing master apparatus serving as a master of photographing for a subject by communication and photograph the subject as a slave of the photographing master apparatus. However, the invention is not limited to this. It is possible to apply a wide variety of other slave photographing apparatuses such as a digital video camera, a personal computer with camera, a cellular phone with camera, and a PDA with camera.

In the first to the third embodiments described above, the transmission/reception processing unit 26 and the antenna 27 described above with reference to FIGS. 1 to 26 are applied as photographing instruction data receiving means for receiving photographing instruction data transmitted from a photographing master apparatus according to a photographing instruction for a subject inputted at an arbitrary point. However, the invention is not limited to this. It is possible to apply a wide variety of other photographing instruction data receiving means such as an interface circuit for wire connection.

In the first to the third embodiments described above, the lens 11, the solid state imaging device 28, the data generating unit 29, the data extracting units 30 and 81, the slave controllers 40 and 80, and the controller 55 are applied as slave photographed image data generating means for photographing a subject according to photographing instruction data received by the photographing instruction data receiving means to thereby generate slave photographed image data corresponding to a photographed image of the subject. However, the invention is not limited to this. It is possible to apply a wide variety of other slave photographed image data generating means as long as the slave photographed image data generating means can photograph a subject to thereby generate slave photographed image data corresponding to a photographed image of the subject.

In the first to the third embodiments described above, the recording/reproduction control unit 35 and the recording medium 36 described above with reference to FIGS. 1 to 26 are applied as slave recording means for recording slave photographed image data generated by the slave photographed image data generating means. However, the invention is not limited to this. It is possible to apply a wide variety of other slave recording means such as a magneto-optical disk and a built-in semiconductor memory.

In the first to the third embodiments described above, the transmission/reception processing unit 26 and the antenna 27 described above with reference to FIGS. 1 to 26 are applied as photographed image data transmitting means for transmitting slave photographed image data, which is generated by the slave photographed image data generating means, to a photographing master apparatus in order to record the slave photographed image data in the photographing master apparatus. However, the invention is not limited to this. It is possible to apply a wide variety of other photographed image data transmitting means such as an interface circuit for wire connection.

In the first to the third embodiments described above, the transmission/reception processing unit 26 and the antenna 27 described above with reference to FIGS. 1 to 26 are applied as image data group receiving means for receiving a photographed image data group for sharing obtained by consolidating other slave photographed image data, transmitted from a photographing master apparatus, corresponding to photographed images of a subject generated by photographing the subject with other slave photographing apparatus and master photographed image data corresponding to a photographed image of the subject generated by photographing the subject at a photographing instruction input point when a photographing instruction is inputted in the photographing master apparatus. However, the invention is not limited to this. It is possible to apply a wide variety of other image data group receiving means such as an interface circuit for wire connection.

In the first to the third embodiments described above, the shutter button 14, which can be pressed halfway, described above with reference to FIGS. 1 to 26 is applied as setting request input means for inputting a master setting request to set a master of photographing for a subject instead of a photographing master apparatus. However, the invention is not limited to this. It is possible to apply a wide variety of other setting request input means such as a dedicated button or a touch panel for inputting a master setting request.

In the first to the third embodiments described above, the transmission/reception processing unit 26 and the antenna 27 described above with reference to FIGS. 1 to 26 are applied as setting declaration data receiving means for receiving master setting declaration data that is transmitted from a photographing master apparatus and other slave photographing apparatuses in order to set the photographing master apparatus and the other slave photographing apparatuses themselves as a master of photographing for a subject and declare the setting of a master. However, the invention is not limited to this. It is possible to apply a wide variety of other setting declaration data receiving means such as an interface circuit for wire connection.

Moreover, in the first to the third embodiments described above, the controller 55 described above with reference to FIGS. 1 to 26 is applied as master slave setting means for, on the basis of a master setting request inputted via the setting request input means and master setting declaration data received by the setting declaration data receiving means, when a master setting request is inputted at a point earlier than a photographing master apparatus and other slave photographing apparatuses are set as a master, setting a photographing apparatus as a master of photographing for a subject by the photographing master apparatus and the other slave photographing apparatuses and, when a photographing master apparatus and other slave photographing apparatuses are set as a master at a point earlier than a master setting request is inputted, setting a photographing apparatus as a slave of the photographing master apparatus and the other slave photographing apparatuses set as a master so as to photograph the subject subordinately. However, the invention is not limited to this. It is possible to apply a wide variety of other master slave setting means such as a CPU and a microprocessor.

As described above, according to the invention, in the photographing system established by connecting plural photographing apparatuses by communication, a photographing apparatus set as a master of photographing for a subject among the plural photographing apparatus transmits, when a photographing instruction for the subject is inputted, photographing instruction data to the remaining photographing apparatuses set as slaves to the photographing apparatus set as a master. The remaining photographing apparatuses set as slaves receive the photographing instruction data transmitted from the photographing apparatus set as a master and photograph the subject according to the received photographing instruction data to thereby generate and record slave photographed image data corresponding to a photographed image of the subject. Consequently, it is possible to photograph the subject in photographing directions different from one another collectively with the remaining photographing apparatuses set as slaves according to simple operation of inputting a photographing instruction to the photographing apparatus set as a master. As a result, it is possible to realize a photographing system that can easily photograph a subject from plural directions collectively.

INDUSTRIAL APPLICABILITY

It is possible to use the invention for a photographing system in which a digital still camera, a digital video camera, a cellular phone with camera, a personal computer with camera, and the like are used independently or in combination.

The invention claimed is:

1. A photographing system established by connecting plural photographing apparatuses, that photograph a subject as slaves to a photographing master apparatus by communication, the photographing master apparatus serving as a master of photographing for the subject, wherein:
   when a photographing instruction for the subject is inputted on the photographing master apparatus, the photographing system transmits photographing instruction data to the plural photographing apparatuses;
   the plural photographing apparatuses receive the photographing instruction data transmitted from the photographing master apparatus and photograph the subject according to the received photographing instruction data to thereby generate and record slave photographed image data corresponding to a photographed image of the subject; and
   when the photographing master apparatus and at least one of the photographing apparatuses, or at least two of the photographing apparatuses are requested to be set as the master simultaneously in photographing of the subject, the photographing master apparatus or one of the photographing apparatuses is set as the master preferentially in accordance with a priority for master setting set in advance.

2. The photographing system according to claim 1, wherein:
   the plural photographing apparatuses transmit the slave photographed image data, which is generated by photographing the subject, to the photographing master apparatus; and
   the photographing master apparatus receives and records the slave photographed image data transmitted from the plural photographing apparatuses.

3. The photographing system according to claim 2, wherein
   the plural photographing apparatuses receive the photographing instruction data transmitted from the photographing master apparatus and photograph the subject according to the received photographing instruction data substantially simultaneously with a photographing instruction input point when the photographing instruction is inputted in the photographing master apparatus or at a delayed point after elapse of predetermined delay time from the photographing instruction input point to thereby generate and record the slave photographed image data corresponding to a photographed image of the subject.

4. The photographing system according to claim 3, wherein,
   when the photographing instruction is inputted in the photographing master apparatus, the photographing master apparatus generates and records master photographed image data corresponding to a photographed image of the subject by photographing the subject.

5. The photographing system according to claim 4, wherein:
   the photographing master apparatus transmits slave photographed image data excluding only the slave photographed image data generated by one of the plural photographing apparatuses, which is a transmission partner of at least one other photographing apparatus of the plural photographing apparatuses, to at least one of the plural photographing apparatuses as a photographed image data group for sharing together with the master photographed image data; and
   the plural photographing apparatuses receive and record the photographed image data group for sharing transmitted from the photographing master apparatus.

6. The photographing system according to claim 5, wherein
   one photographing master apparatus or one of the plural photographing apparatuses, which is requested to be set as the master at an earlier point in photographing for the subject, among the photographing master apparatus and the plural photographing apparatuses is set as the master such that any one of the photographing master apparatus and the plural photographing apparatuses can be set as the master of photographing for the subject.

7. A photographing master apparatus that makes connection with plural slave photographing apparatuses, which photograph a subject subordinately, by communication and serves as a master of photographing for the subject, the photographing master apparatus comprising:
   photographing instruction input means for causing a user to input a photographing instruction for the subject at an arbitrary point;
   photographing instruction data transmitting means for transmitting, when the photographing instruction is inputted via the photographing instruction input means, photographing instruction data for causing the respective slave photographing apparatuses to photograph the subject to thereby generate and record slave photographed image data corresponding to a photographed image of the subject to the respective slave photographing apparatuses;

image data group generating means that consolidates the slave photographed image data to generate a photographed image data group for sharing; and image data group transmitting means that transmits the photographed image data group to at least one of the slave photographing apparatuses.

8. The photographing master apparatus according to claim 7, comprising:

photographed image data receiving means that receives the slave photographed image data transmitted from the respective slave photographing apparatuses; and master recording means that records the slave photographed image data received by the photographed image data receiving means.

9. The photographing master apparatus according to claim 8, wherein the photographing instruction data transmitting means transmits the photographing instruction data, in which photographing condition information indicating photographing points selected in advance for the respective slave photographing apparatuses is stored, to the respective slave photographing apparatuses at a photographing instruction input point when the photographing instruction is inputted via the photographing instruction input means.

10. The photographing master apparatus according to claim 9, comprising master photographed image data generating means that generates master photographed image data corresponding to a photographed image of the subject by photographing the subject at the photographing instruction input point when the photographing instruction is inputted via the photographing instruction input means, wherein the master recording means records the master photographed image data generated by the master photographed image data generating means.

11. The photographing master apparatus according to claim 10, wherein when the image data group generating means consolidates the slave photographed image data, the image data group generating means excludes the slave photographed image data generated by the slave photographing apparatus that are a transmission partner.

12. The photographing master apparatus according to claim 10, comprising:

setting request input means for inputting a master setting request so as to set as the master of photographing for the subject by the respective slave photographing apparatuses;

setting declaration data receiving means that receives master setting declaration data sent from the respective slave photographing apparatuses in order to set themselves as the master of photographing for the subject and declare the setting of the master; and master slave setting means that, on the basis of the master setting request inputted via the setting request input means and the master setting declaration data received by the setting declaration data receiving means, when the master setting request is inputted at a point earlier than the slave photographing apparatuses are set as the master, sets the photographing apparatus as the master of photographing for the subject by the respective slave photographing apparatus, and when the slave photographing apparatuses are set as the master at a point earlier than the master setting request is inputted, sets the photographing apparatus as a slave of the slave photographing apparatuses set as the master so as to photograph the subject subordinately.

13. The photographing master apparatus according to claim 12, wherein, on the basis of the master setting request inputted via the setting request input means and the master setting declaration data received by the setting declaration data receiving means, when the slave photographing apparatuses are set as the master simultaneously with a point when the master setting request is inputted, the master slave setting means selects and sets one of the master of photographing for the subject by the respective slave photographing apparatuses or the slave of the slave photographing apparatuses set as the master preferentially.

14. The photographing master apparatus according to claim 8, wherein the photographing instruction data transmitting means transmits, when the photographing instruction is inputted via the photographing instruction input means, the photographing instruction data to the respective slave photographing apparatuses in accordance with photographing condition information indicating photographing points selected in advance for the respective slave photographing apparatuses at a photographing instruction input point when the photographing instruction is inputted or a delayed point after elapse of predetermined delay time from the photographing instruction input point.

15. A slave photographing apparatus that makes connection with a photographing master apparatus to be a master of photographing for a subject by communication and photographs the subject as a slave of the photographing master apparatus, the slave photographing apparatus comprising:

photographing instruction data receiving means that receives photographing instruction data transmitted according to a photographing instruction for the subject inputted from the photographing master apparatus at an arbitrary point;

slave photographed image data generating means that generates slave photographed image data corresponding to a photographed image of the subject by photographing the subject according to the photographing instruction data received by the photographing instruction data receiving means; and slave recording means that records the slave photographed image data generated by the slave photographed image data generating means; and image data group receiving means that receives a photographed image data group from a photographing master apparatus, the photographed image data group having been consolidated from photographed images of a subject generated by photographing the subject with other slave photographing apparatus and master photographed image data corresponding to a photographed image of the subject generated by photographing the subject at the photographing instruction input point when the photographing instruction is inputted in the photographing master apparatus, wherein the slave recording means records the photographed image data group for sharing received by the image data group receiving means.

16. The slave photographing apparatus according to claim 15, comprising
photographed image data transmitting means that transmits the slave photographed image data generated by the slave photographed image data generating means to the photographing master apparatus in order to record the slave photographed image data in the photographing master apparatus.

17. The slave photographing apparatus according to claim 16, wherein
the slave photographed image data generating means generates the slave photographed image data corresponding to a photographed image of the subject by photographing the subject according to the photographing instruction data received by the photographing instruction data receiving means and in accordance with photographing condition information indicating a photographing point held in advance or the photographing condition information stored in the photographing instruction data at a photographing instruction input point when the photographing instruction is inputted in the photographing master apparatus or a delayed point after elapse of predetermined delay time from the photographing instruction input point.

18. The slave photographing apparatus according to claim 16, wherein:
the photographing instruction data receiving means receives the photographing instruction data transmitted in accordance with photographing condition information indicating a photographing point, which is selected in advance when the photographing instruction is inputted from the photographing master apparatus, at a photographing instruction input point when the photographing instruction is inputted or a delayed point after elapse of predetermined delayed time from the photographing instruction input point; and
the slave photographed image data generating means generates the slave photographed image data corresponding to a photographed image of the subject by photographing the subject at a point when the photographing instruction data is received by the photographing instruction data receiving means.

19. The slave photographing apparatus according to claim 18, comprising:
setting request input means that inputs a master setting request so as to set a photographing apparatus as a master of photographing for the subject instead of the photographing master apparatus;
setting declaration data receiving means that receives master setting declaration data transmitted from the photographing master apparatus and the other slave photographing apparatuses in order to set the photographing master apparatus and the slave photographing apparatuses themselves as the master of photographing for the subject and declare setting of the master; and
master slave setting means that, on the basis of the master setting request inputted via the setting request input means and the master setting declaration data received by the setting declaration data receiving means, when the master setting request is inputted at a point earlier than the photographing master apparatus and the other slave photographing apparatuses are set as the master, sets a photographing apparatus as the master of photographing for the subject by the photographing master apparatus and the other slave photographing apparatuses and, when the photographing master apparatus and the other slave photographing apparatuses are set as the master at a point earlier than the master setting request is inputted, sets a photographing apparatus as the slave of the photographing master apparatus and the other slave photographing apparatuses set as the master so as to photograph the subject subordinately.

20. The slave photographing apparatus according to claim 19, wherein,
on the basis of the master setting request inputted via the setting request input means and the master setting declaration data received by the setting declaration data receiving means, when the photographing master apparatus and the other slave photographing apparatuses are set as the master simultaneously with a point when the master setting request is inputted, the master slave setting means selects and sets either of the master of photographing for the subject by the photographing master apparatus and the other slave photographing apparatuses, or the slave of the photographing master apparatus and the other slave photographing apparatuses set as the master preferentially in accordance with a priority for master setting set in advance.

21. A photographing master method serving as a master of photographing for a subject by plural slave photographing apparatuses that photograph the subject subordinately, the photographing master method comprising:
a photographing instruction data transmitting step of transmitting, when a photographing instruction for the subject is inputted at an arbitrary point, photographing instruction data for causing the respective slave photographing apparatuses to generate and record slave photographed image data corresponding to a photographed image of the subject by causing the respective slave photographing apparatuses to photograph the subject to the respective slave photographing apparatuses;
an image data group generating step of consolidating the slave photographed image data to generate a photographed image data group for sharing; and
a transmitting step of transmitting the photographed image data group to at least one of the slave photographing apparatuses.

22. A slave photographing method of photographing a subject as a slave of a photographing master apparatus serving as a master for photographing for the subject, the slave photographing method comprising:
a photographing instruction data receiving step of receiving photographing instruction data that is transmitted according to a photographing instruction for the subject inputted from the photographing master apparatus at an arbitrary point;
a slave photographed image data generating step of generating slave photographed image data corresponding to a photographed image of the subject by photographing the subject according to the received photographing instruction data; and
a slave photographed image data recording step of recording the generated slave photographed image data in a recording medium; and
an image data group receiving step of receiving a photographed image data group from a photographing master apparatus, the photographed image data group having been consolidated from photographed images of a subject generated by photographing the subject with other slave photographing apparatus and master photographed image data corresponding to a photographed image of the subject generated by photographing the subject at the photographing instruction input point when the photographing instruction is inputted in the photographing master apparatus, wherein the image data recording step also records the photographed image data group for sharing received by the image data group receiving means.

23. A method for photographing a subject wherein plural photographing apparatuses photograph the subject as slaves to a photographing master apparatus, a method comprising:

sending photographing instruction data to the plural photographing apparatuses when a photographing instruction for the subject is inputted on the photographing master apparatus, wherein the plural photographing apparatuses receive the photographing instruction data transmitted from the photographing master apparatus and photograph the subject according to the received photographing instruction data to thereby generate and record slave photographed image data corresponding to a photographed image of the subject; and setting the photographing master apparatus or one of the photographing apparatuses as the master preferentially in accordance with a priority for master setting set in advance, when the photographing master apparatus and at least one of the photographing apparatuses, or at least two of the photographing apparatuses are requested to be set as the master simultaneously in photographing of the subject.

* * * * *